United States Patent
Altberg et al.

(10) Patent No.: US 9,118,778 B2
(45) Date of Patent: *Aug. 25, 2015

(54) METHODS AND APPARATUSES FOR PAY FOR DEAL ADVERTISEMENTS

(75) Inventors: Ebbe Altberg, Mill Valley, CA (US); Scott Faber, San Francisco, CA (US); Ron Hirson, San Francisco, CA (US); Sean Van Der Linden, Berkeley, CA (US); Ben Harris Lyon, San Francisco, CA (US); Paul G. Manca, Oakland, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 68 days.

This patent is subject to a terminal disclaimer.

(21) Appl. No.: 13/421,785

(22) Filed: Mar. 15, 2012

(65) Prior Publication Data
US 2012/0179524 A1 Jul. 12, 2012

Related U.S. Application Data

(63) Continuation of application No. 11/624,613, filed on Jan. 18, 2007, now Pat. No. 8,140,389.

(60) Provisional application No. 60/761,972, filed on Jan. 24, 2006.

(51) Int. Cl.
*G06Q 30/00* (2012.01)
*H04M 15/00* (2006.01)
(Continued)

(52) U.S. Cl.
CPC .............. *H04M 15/00* (2013.01); *G06Q 30/02* (2013.01); *G06Q 30/0242* (2013.01); *G06Q 30/0273* (2013.01); *G06Q 30/0274* (2013.01);
(Continued)

(58) Field of Classification Search
None
See application file for complete search history.

(56) References Cited

U.S. PATENT DOCUMENTS

| 4,604,686 A | 8/1986 | Reiter et al. |
| 4,653,090 A | 3/1987 | Hayden |

(Continued)

FOREIGN PATENT DOCUMENTS

| KR | 20010086595 | 9/2001 |
| WO | 9847295 | 10/1998 |

(Continued)

OTHER PUBLICATIONS

"Consumer Electronic Publishing in the Competitive Environment", Walter S. Baer and Martin Greenberger, Journal of Telecommunications, Volume and Issue No. 37, pp. 49-63, 1987.*

(Continued)

*Primary Examiner* — Victoria Vanderhorst
(74) *Attorney, Agent, or Firm* — Kilpatrick Townsend & Stockton LLP

(57) ABSTRACT

Methods and apparatuses for advertising where the advertisement performance is determined via tracking the deals made as a result of communication leads generated from the advertisements. One embodiment includes: providing an advertisement containing a communication reference to a customer on behalf of a party; providing a connection via the reference for real time communications between the customer and the party; and charging an advertisement fee in response to an action of a predetermined type being performed by the customer (or an agreement between the customer and the party being reached) as a result of the real time communications.

23 Claims, 44 Drawing Sheets

(51) Int. Cl.
*G06Q 30/02* (2012.01)
*G05B 19/418* (2006.01)
*H04M 3/22* (2006.01)
*H04M 3/487* (2006.01)

(52) U.S. Cl.
CPC ......... *G06Q30/0275* (2013.01); *H04M 3/2218* (2013.01); *H04M 3/4878* (2013.01)

(56) References Cited

U.S. PATENT DOCUMENTS

| | | | |
|---|---|---|---|
| 4,677,659 A | 6/1987 | Dargan | |
| 4,757,267 A | 7/1988 | Riskin | |
| 4,788,718 A | 11/1988 | McNabb et al. | |
| 4,817,129 A | 3/1989 | Riskin | |
| 4,847,890 A | 7/1989 | Solomon et al. | |
| 4,850,007 A | 7/1989 | Marino et al. | |
| 4,963,995 A | 10/1990 | Lang | |
| 5,057,932 A | 10/1991 | Lang | |
| 5,058,152 A | 10/1991 | Solomon et al. | |
| 5,164,839 A | 11/1992 | Lang | |
| 5,262,875 A | 11/1993 | Mincer et al. | |
| 5,319,542 A | 6/1994 | King, Jr. et al. | |
| 5,339,358 A | 8/1994 | Danish et al. | |
| 5,359,508 A | 10/1994 | Rossides | |
| 5,440,334 A | 8/1995 | Walters et al. | |
| 5,469,497 A | 11/1995 | Pierce et al. | |
| 5,524,146 A | 6/1996 | Morrisey et al. | |
| 5,574,780 A | 11/1996 | Andruska et al. | |
| 5,596,634 A | 1/1997 | Fernandez et al. | |
| 5,602,905 A | 2/1997 | Mettke | |
| 5,615,213 A | 3/1997 | Griefer | |
| 5,659,742 A | 8/1997 | Beattie et al. | |
| 5,694,549 A | 12/1997 | Carlin et al. | |
| 5,696,965 A | 12/1997 | Dedrick | |
| 5,710,970 A | 1/1998 | Walters et al. | |
| 5,724,521 A | 3/1998 | Dedrick | |
| 5,751,956 A | 5/1998 | Kirsch | |
| 5,774,534 A | 6/1998 | Mayer | |
| 5,781,894 A | 7/1998 | Petrecca et al. | |
| 5,793,851 A | 8/1998 | Albertson | |
| 5,794,210 A | 8/1998 | Goldhaber et al. | |
| 5,802,502 A | 9/1998 | Gell et al. | |
| 5,819,092 A | 10/1998 | Ferguson et al. | |
| 5,850,433 A | 12/1998 | Rondeau | |
| 5,862,223 A | 1/1999 | Walker et al. | |
| RE36,111 E | 2/1999 | Neville | |
| 5,870,546 A | 2/1999 | Kirsch | |
| 5,884,032 A | 3/1999 | Bateman et al. | |
| 5,901,214 A | 5/1999 | Shaffer et al. | |
| 5,903,635 A | 5/1999 | Kaplan | |
| 5,914,951 A | 6/1999 | Bentley et al. | |
| 5,937,390 A | 8/1999 | Hyodo | |
| 5,940,471 A | 8/1999 | Homayoun | |
| 5,943,416 A | 8/1999 | Gisby | |
| 5,960,416 A | 9/1999 | Block | |
| 5,963,202 A | 10/1999 | Polish | |
| 5,963,861 A | 10/1999 | Hanson | |
| 5,978,567 A | 11/1999 | Rebane et al. | |
| 5,982,863 A | 11/1999 | Smiley et al. | |
| 5,987,118 A | 11/1999 | Dickerman et al. | |
| 5,995,705 A | 11/1999 | Lang | |
| 5,999,611 A | 12/1999 | Tatchell et al. | |
| 5,999,965 A | 12/1999 | Kelly | |
| 6,026,375 A | 2/2000 | Hall et al. | |
| 6,028,601 A | 2/2000 | Machiraju et al. | |
| 6,029,141 A | 2/2000 | Bezos et al. | |
| 6,055,513 A | 4/2000 | Katz et al. | |
| 6,108,493 A | 8/2000 | Miller et al. | |
| 6,108,704 A | 8/2000 | Hutton et al. | |
| 6,167,449 A | 12/2000 | Arnold et al. | |
| 6,173,279 B1 | 1/2001 | Levin et al. | |
| 6,188,761 B1 | 2/2001 | Dickerman et al. | |
| 6,189,030 B1 | 2/2001 | Kirsch et al. | |
| 6,208,713 B1 | 3/2001 | Rahrer et al. | |
| 6,216,111 B1 | 4/2001 | Walker et al. | |
| 6,223,165 B1 | 4/2001 | Lauffer | |
| 6,243,684 B1 | 6/2001 | Stuart et al. | |
| 6,269,336 B1 | 7/2001 | Ladd et al. | |
| 6,269,361 B1 | 7/2001 | Davis et al. | |
| 6,275,490 B1 | 8/2001 | Mattaway et al. | |
| 6,292,799 B1 | 9/2001 | Peek et al. | |
| 6,314,402 B1 | 11/2001 | Monaco et al. | |
| 6,323,894 B1 | 11/2001 | Katz | |
| 6,327,572 B1 | 12/2001 | Morton et al. | |
| 6,381,325 B1 | 4/2002 | Hanson | |
| 6,385,583 B1 | 5/2002 | Ladd et al. | |
| 6,393,117 B1 | 5/2002 | Trell | |
| 6,400,806 B1 | 6/2002 | Uppaluru | |
| 6,404,864 B1 | 6/2002 | Evslin et al. | |
| 6,404,877 B1 | 6/2002 | Bolduc et al. | |
| 6,404,884 B1 | 6/2002 | Marwell et al. | |
| 6,408,278 B1 | 6/2002 | Carney et al. | |
| 6,418,214 B1 | 7/2002 | Smythe et al. | |
| 6,430,276 B1 | 8/2002 | Bouvier et al. | |
| 6,434,527 B1 | 8/2002 | Horvitz | |
| 6,442,529 B1 | 8/2002 | Krishan et al. | |
| 6,460,036 B1 | 10/2002 | Herz | |
| 6,461,162 B1 | 10/2002 | Reitman et al. | |
| 6,466,966 B1 | 10/2002 | Kirsch et al. | |
| 6,470,079 B1 | 10/2002 | Benson | |
| 6,470,181 B1 | 10/2002 | Maxwell | |
| 6,470,317 B1 | 10/2002 | Ladd et al. | |
| 6,493,671 B1 | 12/2002 | Ladd et al. | |
| 6,493,673 B1 | 12/2002 | Ladd et al. | |
| 6,501,832 B1 | 12/2002 | Saylor et al. | |
| 6,504,920 B1 | 1/2003 | Okon et al. | |
| 6,510,417 B1 | 1/2003 | Woods et al. | |
| 6,510,434 B1 | 1/2003 | Anderson et al. | |
| 6,513,013 B1 | 1/2003 | Stephanou | |
| 6,516,057 B2 | 2/2003 | Meek et al. | |
| 6,529,878 B2 | 3/2003 | De Rafael et al. | |
| 6,539,359 B1 | 3/2003 | Ladd et al. | |
| 6,560,576 B1 | 5/2003 | Cohen et al. | |
| 6,570,870 B1 | 5/2003 | Berstis | |
| 6,625,595 B1 | 9/2003 | Anderson et al. | |
| 6,636,590 B1 | 10/2003 | Jacob et al. | |
| 6,658,389 B1 | 12/2003 | Alpdemir | |
| 6,691,093 B2 | 2/2004 | Shell | |
| 6,704,403 B2 | 3/2004 | Lurie et al. | |
| 6,707,889 B1 | 3/2004 | Saylor et al. | |
| 6,731,736 B2 | 5/2004 | Meek et al. | |
| 6,732,183 B2 | 5/2004 | Graham | |
| 6,735,588 B2 | 5/2004 | Kim et al. | |
| 6,757,364 B2 | 6/2004 | Newkirk | |
| 6,760,537 B2 | 7/2004 | Mankovitz | |
| 6,769,020 B2 | 7/2004 | Miyazaki et al. | |
| 6,801,899 B2 | 10/2004 | Lauffer | |
| 6,807,532 B1 | 10/2004 | Kolls | |
| 6,807,571 B2 | 10/2004 | Hatano et al. | |
| 6,813,346 B2 | 11/2004 | Gruchala et al. | |
| 6,836,225 B2 | 12/2004 | Lee et al. | |
| 6,839,737 B1 | 1/2005 | Friskel | |
| 6,847,992 B1 | 1/2005 | Haitsuka et al. | |
| 6,850,965 B2 | 2/2005 | Allen | |
| 6,856,809 B2 | 2/2005 | Fostick | |
| 6,859,833 B2 | 2/2005 | Kirsch et al. | |
| 6,910,035 B2 | 6/2005 | Hoekman et al. | |
| 6,968,174 B1 | 11/2005 | Trandal et al. | |
| 7,013,280 B2 | 3/2006 | Davis et al. | |
| 7,028,012 B2 | 4/2006 | St. Vrain | |
| 7,035,381 B2 | 4/2006 | D'Ascenzo et al. | |
| 7,035,468 B2 | 4/2006 | Yogeshwar et al. | |
| 7,076,037 B1 | 7/2006 | Gonen et al. | |
| 7,092,091 B2 | 8/2006 | Itoh et al. | |
| 7,092,901 B2 | 8/2006 | Davis et al. | |
| 7,103,010 B2 | 9/2006 | Melideo | |
| 7,120,235 B2 | 10/2006 | Altberg et al. | |
| 7,181,415 B2 | 2/2007 | Blaser et al. | |
| 7,187,761 B2 | 3/2007 | Bookstaff | |
| 7,200,413 B2 | 4/2007 | Montemer | |
| 7,212,615 B2 | 5/2007 | Wolmuth | |
| 7,224,781 B2 | 5/2007 | Jacob et al. | |
| 7,227,936 B2 | 6/2007 | Bookstaff | |

(56) References Cited

U.S. PATENT DOCUMENTS

| | | |
|---|---|---|
| 7,231,405 B2 | 6/2007 | Xia |
| 7,240,110 B2 | 7/2007 | Haitsuka et al. |
| 7,240,290 B2 | 7/2007 | Melideo |
| 7,249,045 B2 | 7/2007 | Lauffer |
| 7,363,254 B2 | 4/2008 | Skinner |
| 7,366,683 B2 | 4/2008 | Altberg et al. |
| 7,369,996 B2 | 5/2008 | Sladden |
| 7,401,053 B2 | 7/2008 | Kamimura et al. |
| 7,428,497 B2 | 9/2008 | Agarwal et al. |
| 7,434,175 B2 | 10/2008 | Melideo |
| 7,453,998 B2 | 11/2008 | Jacob et al. |
| 7,475,149 B2 | 1/2009 | Jacob et al. |
| 7,505,920 B2 | 3/2009 | Agarwal et al. |
| 7,555,110 B2 * | 6/2009 | Dolan et al. ............. 379/211.02 |
| 7,668,725 B2 | 2/2010 | Alston |
| 7,668,950 B2 | 2/2010 | Horowitz et al. |
| 7,792,257 B1 | 9/2010 | Vanier et al. |
| 7,876,886 B2 | 1/2011 | Altberg et al. |
| 7,995,723 B2 | 8/2011 | Jacob et al. |
| 8,027,878 B2 | 9/2011 | Wong et al. |
| 8,140,389 B2 | 3/2012 | Altberg et al. |
| 8,140,392 B2 | 3/2012 | Altberg et al. |
| 8,209,225 B2 | 6/2012 | Altberg et al. |
| 8,260,777 B1 | 9/2012 | Manber |
| 8,280,018 B2 | 10/2012 | Altberg et al. |
| 8,468,050 B2 | 6/2013 | Faber et al. |
| 8,521,596 B2 | 8/2013 | Altberg et al. |
| 8,687,783 B2 | 4/2014 | Altberg et al. |
| 2001/0027481 A1 | 10/2001 | Whyel |
| 2001/0029482 A1 | 10/2001 | Tealdi et al. |
| 2001/0048737 A1 | 12/2001 | Goldberg et al. |
| 2002/0002552 A1 | 1/2002 | Schultz et al. |
| 2002/0003867 A1 | 1/2002 | Rothschild et al. |
| 2002/0010616 A1 | 1/2002 | Itzhaki |
| 2002/0026457 A1 | 2/2002 | Jensen |
| 2002/0057776 A1 | 5/2002 | Dyer |
| 2002/0062393 A1 | 5/2002 | Borger et al. |
| 2002/0069105 A1 | 6/2002 | do Rosario Botelho |
| 2002/0095331 A1 | 7/2002 | Osman et al. |
| 2002/0103746 A1 | 8/2002 | Moffett, Jr. |
| 2002/0107697 A1 | 8/2002 | Jensen |
| 2002/0116256 A1 | 8/2002 | De Rafael et al. |
| 2002/0116266 A1 | 8/2002 | Marshall |
| 2002/0120554 A1 | 8/2002 | Vega |
| 2002/0122547 A1 | 9/2002 | Hinchey et al. |
| 2002/0133402 A1 | 9/2002 | Faber et al. |
| 2002/0191762 A1 | 12/2002 | Benson |
| 2002/0193094 A1 | 12/2002 | Lawless et al. |
| 2003/0026397 A1 | 2/2003 | McCroskey |
| 2003/0046161 A1 | 3/2003 | Kamanger et al. |
| 2003/0046198 A1 | 3/2003 | Knapp et al. |
| 2003/0083042 A1 | 5/2003 | Abuhamdeh |
| 2003/0086556 A1 * | 5/2003 | Welch et al. ............. 379/265.09 |
| 2003/0105824 A1 | 6/2003 | Brechner et al. |
| 2003/0191693 A1 | 10/2003 | Aphek |
| 2003/0195787 A1 | 10/2003 | Brunk et al. |
| 2003/0212600 A1 | 11/2003 | Hood et al. |
| 2003/0212759 A1 | 11/2003 | Wu |
| 2003/0220866 A1 * | 11/2003 | Pisaris-Henderson et al. . 705/37 |
| 2003/0223565 A1 | 12/2003 | Montemer |
| 2003/0225682 A1 | 12/2003 | Montemer |
| 2003/0231754 A1 | 12/2003 | Stein et al. |
| 2004/0003041 A1 | 1/2004 | Moore et al. |
| 2004/0006511 A1 | 1/2004 | Montemer |
| 2004/0010518 A1 | 1/2004 | Montemer |
| 2004/0076403 A1 | 4/2004 | Mankovitz |
| 2004/0083133 A1 | 4/2004 | Nicholas et al. |
| 2004/0098226 A1 | 5/2004 | Odachi et al. |
| 2004/0103024 A1 | 5/2004 | Patel et al. |
| 2004/0103041 A1 | 5/2004 | Alston |
| 2004/0174965 A1 | 9/2004 | Brahm et al. |
| 2004/0174974 A1 | 9/2004 | Meek et al. |
| 2004/0193488 A1 | 9/2004 | Khoo et al. |
| 2004/0193740 A1 | 9/2004 | Kasmirsky et al. |
| 2004/0196833 A1 | 10/2004 | Dahan et al. |
| 2004/0199494 A1 | 10/2004 | Bhatt |
| 2004/0234049 A1 | 11/2004 | Melideo |
| 2004/0235524 A1 | 11/2004 | Abuhamdeh |
| 2004/0247092 A1 | 12/2004 | Timmins et al. |
| 2004/0249649 A1 | 12/2004 | Stratton et al. |
| 2004/0254859 A1 | 12/2004 | Aslanian |
| 2004/0260413 A1 | 12/2004 | Melideo |
| 2005/0018829 A1 | 1/2005 | Baker |
| 2005/0041647 A1 | 2/2005 | Stinnie |
| 2005/0044238 A1 | 2/2005 | Jacob et al. |
| 2005/0074100 A1 | 4/2005 | Lederman |
| 2005/0074102 A1 | 4/2005 | Altberg et al. |
| 2005/0076100 A1 | 4/2005 | Armstrong |
| 2005/0080878 A1 | 4/2005 | Cunningham et al. |
| 2005/0086104 A1 | 4/2005 | McFadden |
| 2005/0096980 A1 | 5/2005 | Koningstein |
| 2005/0100153 A1 | 5/2005 | Pines et al. |
| 2005/0105881 A1 | 5/2005 | Mankovitz |
| 2005/0114208 A1 | 5/2005 | Arbuckle et al. |
| 2005/0114210 A1 | 5/2005 | Faber et al. |
| 2005/0125416 A1 | 6/2005 | Kirsch et al. |
| 2005/0135387 A1 | 6/2005 | Rychener et al. |
| 2005/0165666 A1 | 7/2005 | Wong et al. |
| 2005/0171838 A1 | 8/2005 | Eglinton |
| 2005/0209874 A1 | 9/2005 | Rossini |
| 2005/0216341 A1 | 9/2005 | Agarwal et al. |
| 2005/0216345 A1 | 9/2005 | Altberg et al. |
| 2005/0222908 A1 | 10/2005 | Altberg et al. |
| 2005/0240432 A1 | 10/2005 | Jensen |
| 2005/0245241 A1 | 11/2005 | Durand et al. |
| 2005/0251445 A1 | 11/2005 | Wong et al. |
| 2005/0256769 A1 * | 11/2005 | Rossides ........................ 705/14 |
| 2005/0261964 A1 | 11/2005 | Fang |
| 2005/0286688 A1 | 12/2005 | Scherer |
| 2005/0289015 A1 | 12/2005 | Hunter et al. |
| 2006/0003735 A1 | 1/2006 | Trandal et al. |
| 2006/0004627 A1 | 1/2006 | Baluja |
| 2006/0069610 A1 | 3/2006 | Rossini |
| 2006/0095343 A1 | 5/2006 | Clarke et al. |
| 2006/0106711 A1 | 5/2006 | Melideo |
| 2006/0109969 A1 | 5/2006 | Oh |
| 2006/0136310 A1 | 6/2006 | Gonen et al. |
| 2006/0159063 A1 | 7/2006 | Kumar |
| 2006/0166655 A1 | 7/2006 | Montemer |
| 2006/0171520 A1 | 8/2006 | Kliger |
| 2006/0173827 A1 | 8/2006 | Kliger |
| 2006/0173915 A1 | 8/2006 | Kliger |
| 2006/0182250 A1 | 8/2006 | Melideo |
| 2006/0247999 A1 | 11/2006 | Gonen et al. |
| 2006/0259365 A1 | 11/2006 | Agarwal et al. |
| 2006/0277108 A1 | 12/2006 | Altberg et al. |
| 2007/0038507 A1 | 2/2007 | Kumar |
| 2007/0070980 A1 | 3/2007 | Phelps et al. |
| 2007/0100799 A1 | 5/2007 | Rose et al. |
| 2007/0100956 A1 | 5/2007 | Kumar |
| 2007/0116217 A1 | 5/2007 | Altberg et al. |
| 2007/0127650 A1 | 6/2007 | Altberg et al. |
| 2007/0129054 A1 | 6/2007 | Andronikov et al. |
| 2007/0140451 A1 | 6/2007 | Altberg et al. |
| 2007/0165805 A1 | 7/2007 | Altberg et al. |
| 2007/0168354 A1 | 7/2007 | Ramer et al. |
| 2007/0269038 A1 | 11/2007 | Gonen et al. |
| 2008/0046324 A1 | 2/2008 | Bailey et al. |
| 2008/0170676 A1 | 7/2008 | Douma et al. |
| 2008/0187114 A1 | 8/2008 | Altberg et al. |
| 2008/0242279 A1 | 10/2008 | Ramer et al. |
| 2009/0010408 A1 | 1/2009 | Altberg et al. |
| 2009/0016507 A1 | 1/2009 | Altberg et al. |
| 2009/0030755 A1 | 1/2009 | Altberg et al. |
| 2009/0060148 A1 | 3/2009 | Jacob et al. |
| 2009/0067599 A1 | 3/2009 | Agarwal et al. |
| 2009/0070205 A1 | 3/2009 | Altberg et al. |
| 2009/0240561 A1 | 9/2009 | Altberg et al. |
| 2009/0260022 A1 | 10/2009 | Louch et al. |
| 2010/0082431 A1 | 4/2010 | Ramer et al. |
| 2010/0287202 A1 | 11/2010 | Inoue et al. |
| 2011/0137754 A1 | 6/2011 | Fernandez |
| 2012/0021728 A1 | 1/2012 | Davis |
| 2013/0012158 A1 | 1/2013 | Altberg et al. |

(56) References Cited

U.S. PATENT DOCUMENTS

| | | | |
|---|---|---|---|
| 2013/0044870 A1 | 2/2013 | Altberg et al. | |
| 2013/0103503 A1 | 4/2013 | Zhang et al. | |
| 2013/0311261 A1 | 11/2013 | Faber et al. | |
| 2013/0325635 A1 | 12/2013 | Altberg et al. | |

FOREIGN PATENT DOCUMENTS

| | | |
|---|---|---|
| WO | 9955066 | 10/1999 |
| WO | 0057326 | 9/2000 |
| WO | 0127825 | 4/2001 |
| WO | 0128141 | 4/2001 |
| WO | 02088880 | 11/2002 |
| WO | 2005040962 | 5/2005 |
| WO | 2005101269 | 10/2005 |
| WO | 2005109287 | 11/2005 |
| WO | 2005109288 | 11/2005 |

OTHER PUBLICATIONS

"AtOnce Talks Up E-mail Marketing Campaigns with ITXC Push to Talk Service," Business Wire, Feb. 26, 2001.
"ITXC Corp and Doubleclick Energize Banner Ads with Web Telephony; Companies Voice-Enable Banner Advertisements Using ITXC Push to Talk Service," Business Wire, Dec. 12, 2000.
ADS-Click, "ADS-click Adds Skype-Based Pay-Per-Call Advertising Capabilities to Its Private-Labeled Solution, which will be Unveiled at ad:tech New York," Market Wire, Oct. 10, 2005.
Business Wire, "GoTo.com Teams With Netscape as Premier Search Provider for Popular Netscape Net Search Program," Jul. 1, 1999, p. 1356. Available at: http://www.thefreelibrary.com/_/print/PrintArticle.aspx?id=55045194.
CCBN, Inc. "Full Year 2003 and Q4 Ebookers PLC Earnings Conference Call—Part 2," Fair Disclosure Wire, Mar. 22, 2004.
EP Application No. 05745704.6, Examination Report, Feb. 1, 2010.
EP Application No. 05745756.6, Examination Report, Jan. 28, 2010.
Greenberg, Ken, "Jambo Launches to Connect People and Businesses from the Internet to the Phone," Market Wire, May 3, 2005.
Greenberg, Ken, "Jambo Names Netzero Co-founder Stacy Haitsuka to New Post of Chief Information Officer," Business Wire, Jul. 5, 2005.
Greenberg, Ken, "Jambo Receives $5 Million in Financing from Kline Hawkes & Co., Westlake Venture Partners, Others," Business Wire, Oct. 17, 2005.
Ingenio, Inc., "FindWhat.com Enters Agreement with Ingenio to Offer Pay Per Call Advertising Platform," press release available at http://www.ingenio.com, Apr. 7, 2004.
International Application No. PCT/US04/15238, Written Opinion and International Search Report, Aug. 29, 2005.
International Application No. PCT/US05/12061, Written Opinion and International Search Report, Nov. 17, 2006.
International Application No. PCT/US05/15645, Written Opinion and International Search Report, Feb. 5, 2007.
International Application No. PCT/US05/15646, Written Opinion and International Search Report, Jan. 29, 2007.
Jambo, "Welcome to Jambo—The Leader in Pay-Per-Call Solutions," company information retrieved from http://www.jambo.com, available at least by Oct. 17, 2005.
Jingle Networks, Inc., "1-800-FREE411 Provides Two Great Opportunities to Acquire New Customers," available at least by Oct. 20, 2005.
Jingle Networks, Inc., "Introducing 1-800 FREE411: First Nationwide Free Telephone Directory Assistance Service," Sep. 20, 2005.
"Keen.com raises $60 Million from Prestigious Investors and Strategic Partners Just 60 Days After Launch of Its Live Answer Community," Business Wire, Jan. 11, 2000.
"Sell and Buy Advice Online," The Ottawa Citizen, p. D7, Nov. 29, 1999.
Clark, Don, "Keen.com Plans Web Service Allowing Customers to Hold Private Phone Chats," Wall Street Journal, Nov. 8, 1999.
Ingenio, Inc., "Keen: Your Personal Advisor," retrieved from http://www.keen.com, available at least by Feb. 4, 2006.
International Application No. PCT/US01/48284, International Preliminary Examination Report, Aug. 9, 2002.
International Application No. PCT/US01/48284, International Search Report, May 13, 2002.
Rose, D.E. et al., "Understanding User Goals in Web Search," Proceedings of the 13th Int'l Conference on World Wide Web, pp. 13-19, May 17-20, 2004.

\* cited by examiner

CALL HANDLING MODULE
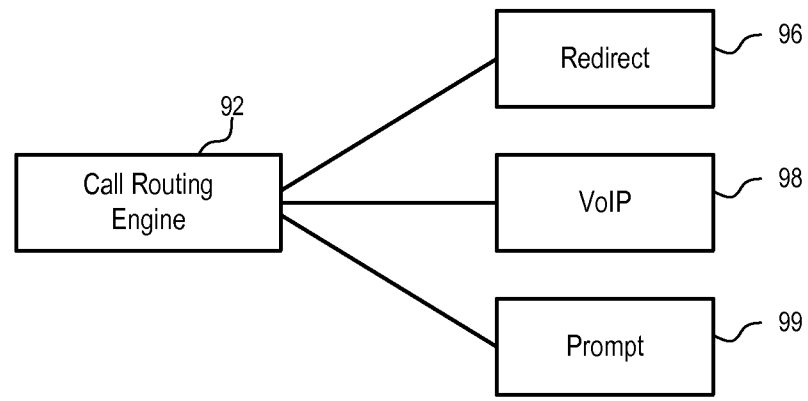
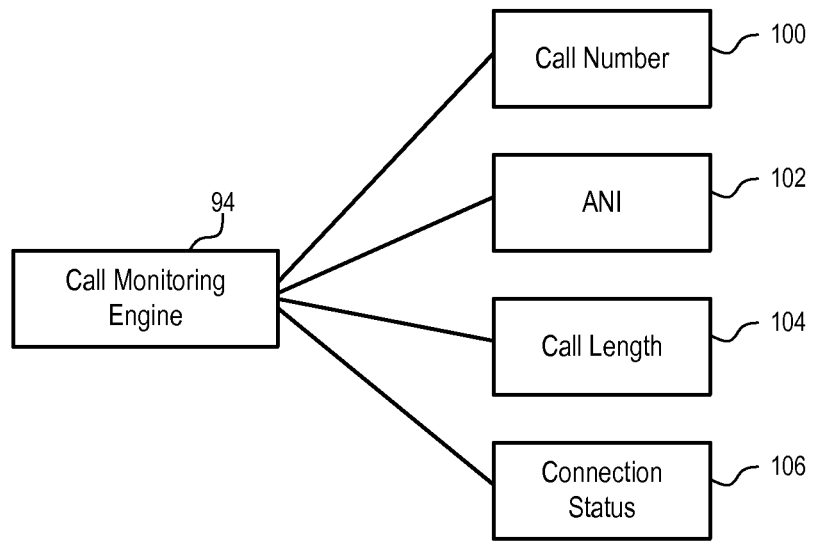
FIG. 7

← 114

SCROLL DOWN to see more listings    Refine your search by Zip Code:

Your search found 105 listings, Listings 1 to 15 listed below ...

Thinking of buying a new car?
Fill out iMotors' simple online form and receive a free new car quote from a local dealer by email within 24 hours. There is no obligation and no hassle. Serious buyers only please.

FEATURED DIRECTORY LISTINGS     scroll down for more listings

Dream Car Rentals                                            Cite Gold
3734 Las Vegas Blvd.
LAS VEGAS, NV
Phone: (702) 555-6661
Fax: (702) 555-6665
We Specialize in Excitement! Ferrari's. Viper's
Porsche's & Hummers. Harley-Davidson's
and SUV's "DRIVE THE DREAM"

Cite Gold

RENT-A-VETTE
5021 SWENSON STREET
LAS VEGAS, NV 89119
Phone: (702) 555-2692
Fax: (702) 555-2044

ONLINE LISTINGS                  scroll down for more listings

<u>Expedia: For All Your Car Rental Needs</u>  http://www.expedia.com
Save with Expedia.com, your one-stop source for flights, hotels, vacation packages, cruises, and rental

```
✉ You just received a call through yellowpages.com – Message (HTML)        _ □ ×
File   Edit   View   Insert   Format   Tools   Actions   Help
🕮 Reply    🕮 Reply to All   🕮 Forward   | 🔒 | ! ↓ | × | ② ▾

From: Yellow Pages.com [customerservices@yellowpages.com]      Sent Mon 9/8/2003 3:16PM
To: Darik Wong
CC:
Subject: You just received a call through yellowpages.com
┌─────────────────────────────────────────────────────────────────────────┐
│ Dear Davis Law Offices,                                                 │
│                                                                         │
│ We are pleased to inform you that the customer call you just received from 770-894-1231 was generated │
│ from your Yellowpages.com listing. We are pleased to play a part in growing your business and are │
│ standing by to offer you a wide range of valuable services to help you achieve your goals. Please contact │
│ us at 999-999-9999 if we can be of any further assistance.              │
│                                                                         │
│ Best regards,                                                           │
│                                                                         │
│ The Team at Yellowpages.com                                             │
└─────────────────────────────────────────────────────────────────────────┘
```

| Create Ad | [?] Help |

Your ad is very important. Tell customers exactly what you're selling and why they should call you. Please review our Pay Per Call Ad Guidelines to ensure your ad is accepted and gets new customers calling your business today.

Ad Location Info

Business Name: [          ] (Sorry, no phone numbers)

☐ Use my Account Information

Address 1: [          ]

Address 2: [          ] (Optional)

City: [          ]

State: [-Select State- ▽]

Zip Code: [   ]-[   ]

Phone Number: ( [   ] ) [   ]-[   ]   Enter the number where you'd like to receive calls Fax: ( [   ] ) [   ]-[   ]

Ad Marketing Message

Millions of people online will see your ad. So, in line 1 write a strong headline explaining what you're selling. To get people calling your business, include a promotional offer in line 2. This encourages buyers to call you now! Please note: Line 1 and Line 2 must each a complete sentence. Tips for success
Examples of Promotional Offers:
 - Call today and get $5 off.
 - Free consultation – limited time.
 - Call now and save 10%.
You'll be able to include more information about your offer on the business profile page. Learn more Marketing Message Line 1: [                    ] (35 characters)

Marketing Message Line 2: [                    ] (35 characters)

Define a Deal  [?] Help

You pay for your advertisement for each deal you get from the customer's call generated from your advertisement. You can define what you deem as a deal event.

Deal Event:

☐ The customer agrees to pay

☐ The customer places an order

☐ The customer places a bid

☐ The customer visits my web page at this URL: [_____]

☐ The customer presses the submit button in the above web page

☐ The customer agrees to provide an address to me

☐ The customer answers the following question(s)
   Question 1: [_____]        > More Questions ☐ I/We say there is a deal by dialing this sequence: [_____]

| Your Offer of Advertisement Fee | ? Help |

You pay for your advertisement for each deal you get from the customer's call generated from your advertisement. You can define how much you offer to pay for each deal.

Advertisement Fee:

☐ This percentage of what the customer pays: [ ] %

☐ A lump sum of: [$ ] per deal

☐ This percentage of what I pay the customer: [ ] %

☐ A subscription fee of: [$ ] per month if I/we get more than [ ] deals per month

METHODS AND APPARATUSES FOR PAY FOR DEAL ADVERTISEMENTS

CROSS REFERENCE TO RELATED APPLICATIONS

The present application is a continuation application of U.S. patent application Ser. No. 11/624,613 filed Jan. 18, 2007, now U.S. Pat. No. 8,140,389, which claims priority to Provisional U.S. Patent Application Ser. No. 60/761,972 filed Jan. 24, 2006, the disclosures of which applications are incorporated herein by reference in their entirety.

The present application is related to: U.S. patent application Ser. No. 11/077,655 filed Mar. 10, 2005, now U.S. Pat. No. 7,428,497, which claims priority to Provisional U.S. Patent Application Ser. No. 60/653,708 filed Feb. 16, 2005, Provisional U.S. Patent Application Ser. No. 60/568,156 filed May 4, 2004, Provisional U.S. Patent Application Ser. No. 60/560,926 filed Apr. 9, 2004 and Provisional U.S. Patent Application Ser. No. 60/552,124 filed Mar. 10, 2004; U.S. patent application Ser. No. 11/092,309 filed Mar. 28, 2005, now U.S. Pat. No. 7,366,683, which claims priority to Provisional U.S. Patent Application Ser. No. 60/653,660 filed Feb. 16, 2005; U.S. patent application Ser. No. 11/095,853 filed Mar. 30, 2005, now U.S. Pat. No. 8,121,898, which claims priority to Provisional U.S. Patent Application Ser. No. 60/653,661 filed Feb. 16, 2005; U.S. patent application Ser. No. 11/014,073 filed Dec. 15, 2004, now U.S. Pat. No. 7,424,442; U.S. patent application Ser. No. 10/872,117 filed Jun. 17, 2004, now U.S. Pat. No. 8,024,224; U.S. patent application Ser. No. 11/021,939 filed Dec. 23, 2004, now U.S. Pat. No. 8,027,878; and U.S. patent application Ser. No. 10/679,982 filed Oct. 6, 2003, now U.S. Pat. No. 7,120,235. The disclosures of the above referenced applications are incorporated herein by reference in their entirety.

TECHNOLOGY FIELD

At least some embodiments of the present invention relate to communication connections and advertising in general and performance-based advertising in particular.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page. However, there are advertisers that either (a) do not have web pages, or (b) have web pages that are not effective at capturing the value of a web visitor, and are therefore unable, or unwilling, to participate in the traditional performance-based advertising, as described above.

SUMMARY OF THE DESCRIPTION

Methods and apparatuses for advertising are described here, where the advertisement performance is determined via tracking the deals made as a result of communication leads generated from the advertisements. Some embodiments are summarized in this section.

One embodiment includes: providing an advertisement containing a communication reference to a customer on behalf of a party; providing a connection via the reference for real time communications between the customer and the party; and charging an advertisement fee in response to an action of a predetermined type being performed by the customer (or an agreement between the customer and the party being reached) as a result of the real time communications The present disclosure includes methods and apparatuses which perform these methods, including data processing systems which perform these methods, and computer readable media which when executed on data processing systems cause the systems to perform these methods.

Other features will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

FIG. 7 illustrates the Call Handling Module of the system, in greater detail.

FIG. 9 shows an example of a search engine result page, which includes an advertisement generated, in accordance with one embodiment of the present invention.

FIG. 10 shows an example of an email alert that is sent to an advertiser, when a call is generated, in accordance with one embodiment of the invention.

FIG. 34 illustrates a user interface for the creation of an advertisement according to one embodiment of the present invention.

FIG. 42 shows an example of a user interface which allows an advertiser to define a deal for a pay per deal advertisement process according to one embodiment.

FIG. 43 shows an example of a user interface which allows an advertiser to specify an offer of an advertisement fee for a pay per deal advertisement process according to one embodiment.

DETAILED DESCRIPTION

In the following description, for purposes of explanation, numerous specific details are set forth in order to provide a thorough understanding of the description. It will be apparent, however, to one skilled in the art that the invention can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

Figure 1:
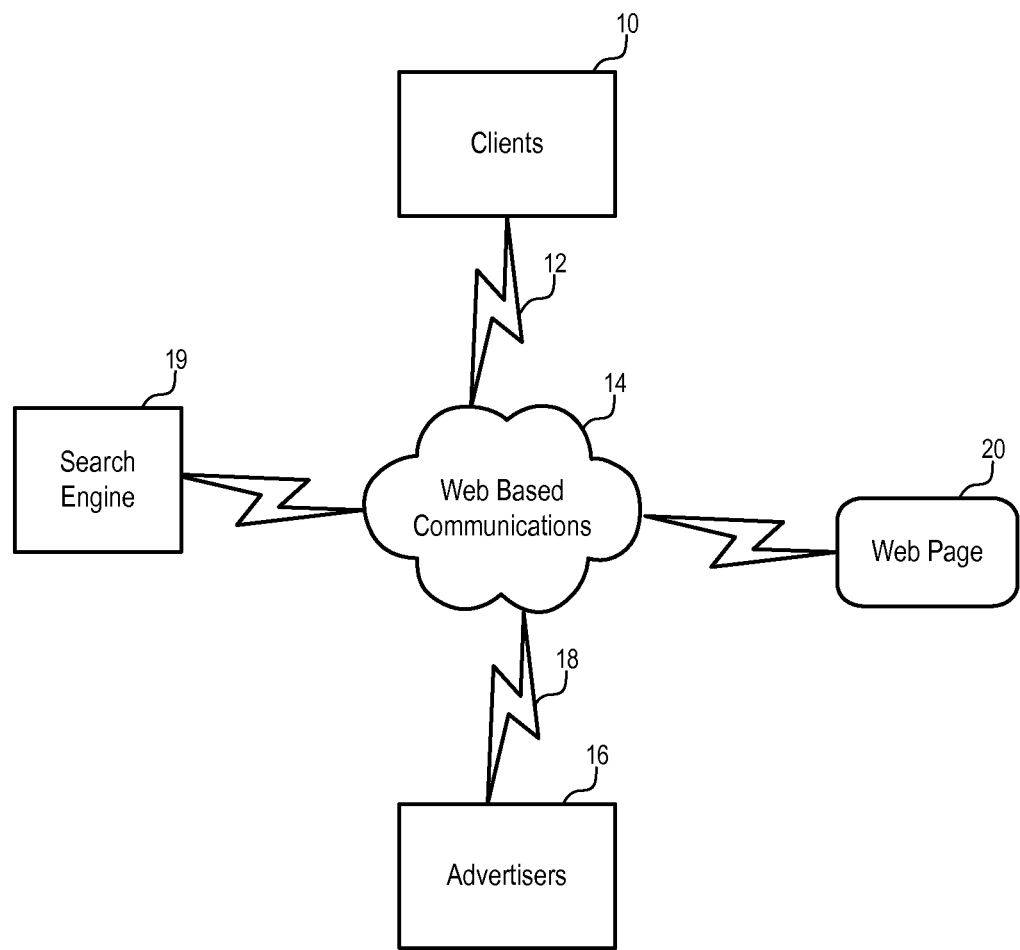
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
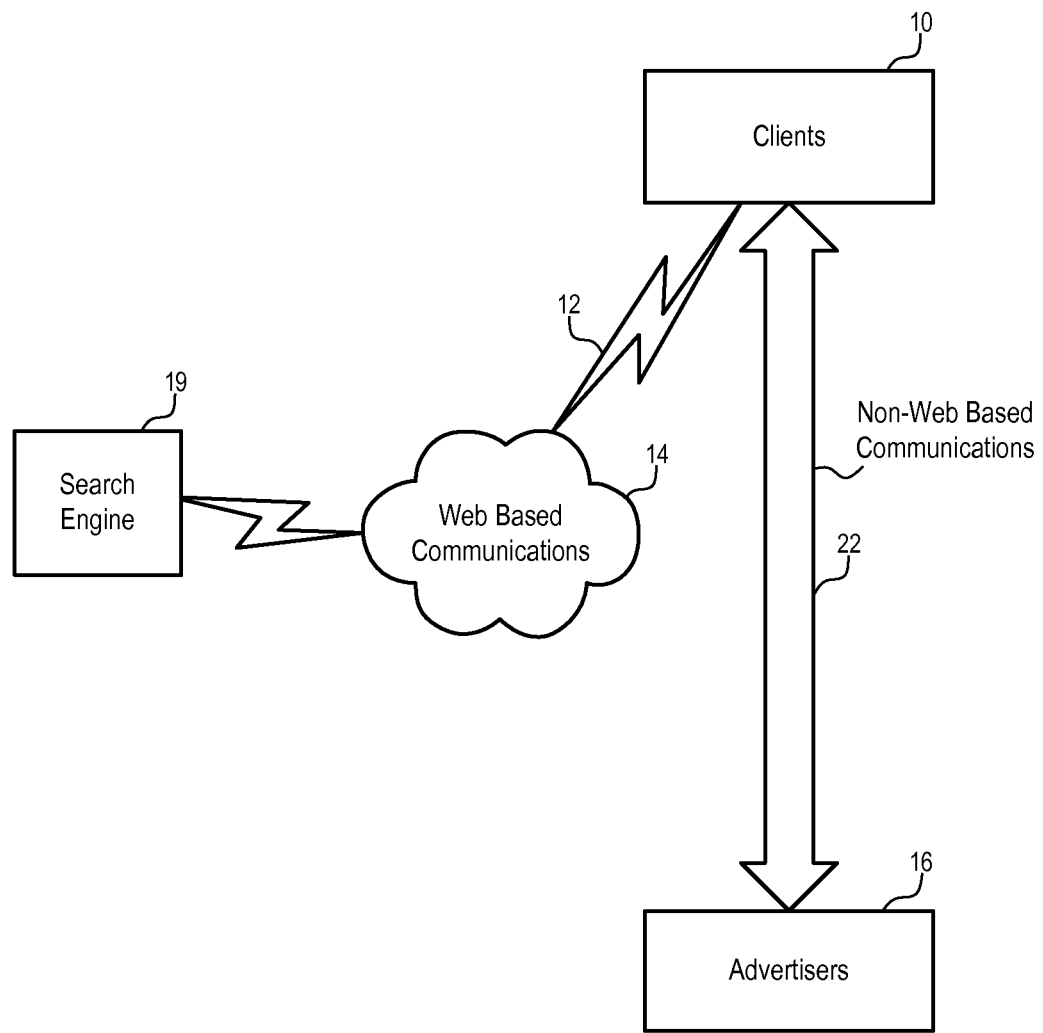
FIG. 2 shows an interaction between clients and advertisers, in accordance with one embodiment of the present invention.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path between the advertisers 16 and the WAN 14 is purely optional. In other words, the techniques of the present invention, allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages. Instead, in accordance with the techniques disclosed herein, an alternative non-web based communications path 22 is provided between the clients 10 and the advertisers 16. According to embodiments of the present invention, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, VoIP clients, etc.

Figure 3:
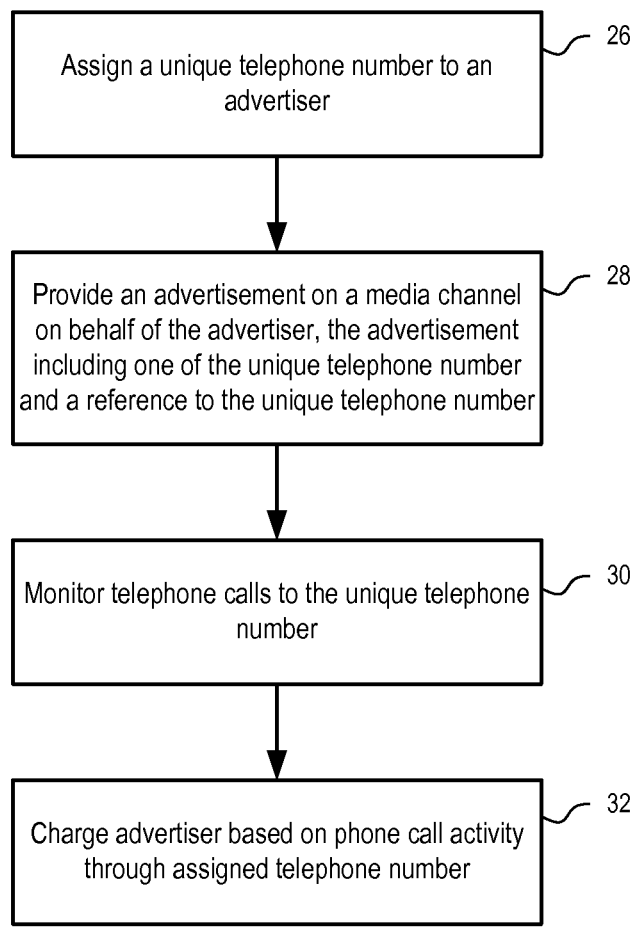
FIG. 3 shows a flowchart of operations performed in accordance with one embodiment of the present invention.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
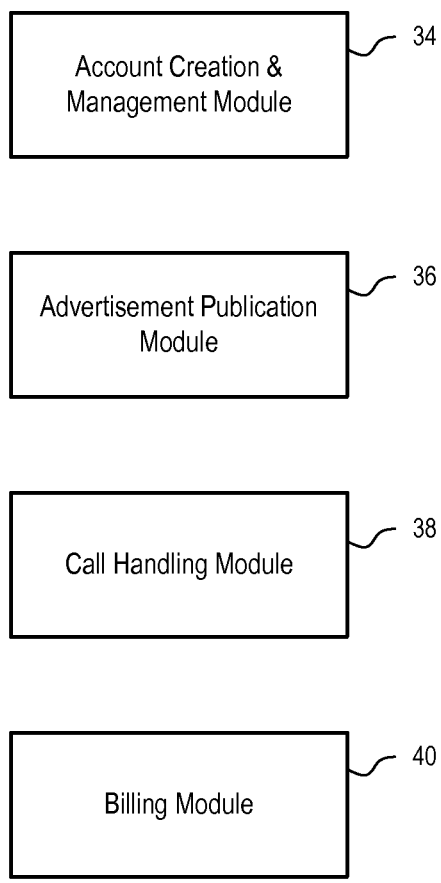
FIG. 4 shows a high level functional description of a system in accordance with one embodiment of the present invention.

FIG. 4 of the drawings shows a functional description of a system to implement the method of FIG. 3. Referring to FIG. 4, the system includes account creation and management module 34, advertisement publication module 36, call handling module 38, and billing module 40. In alternative embodiments, additional, less, or different modules may be included in the system without departing from the invention.

Figure 5:
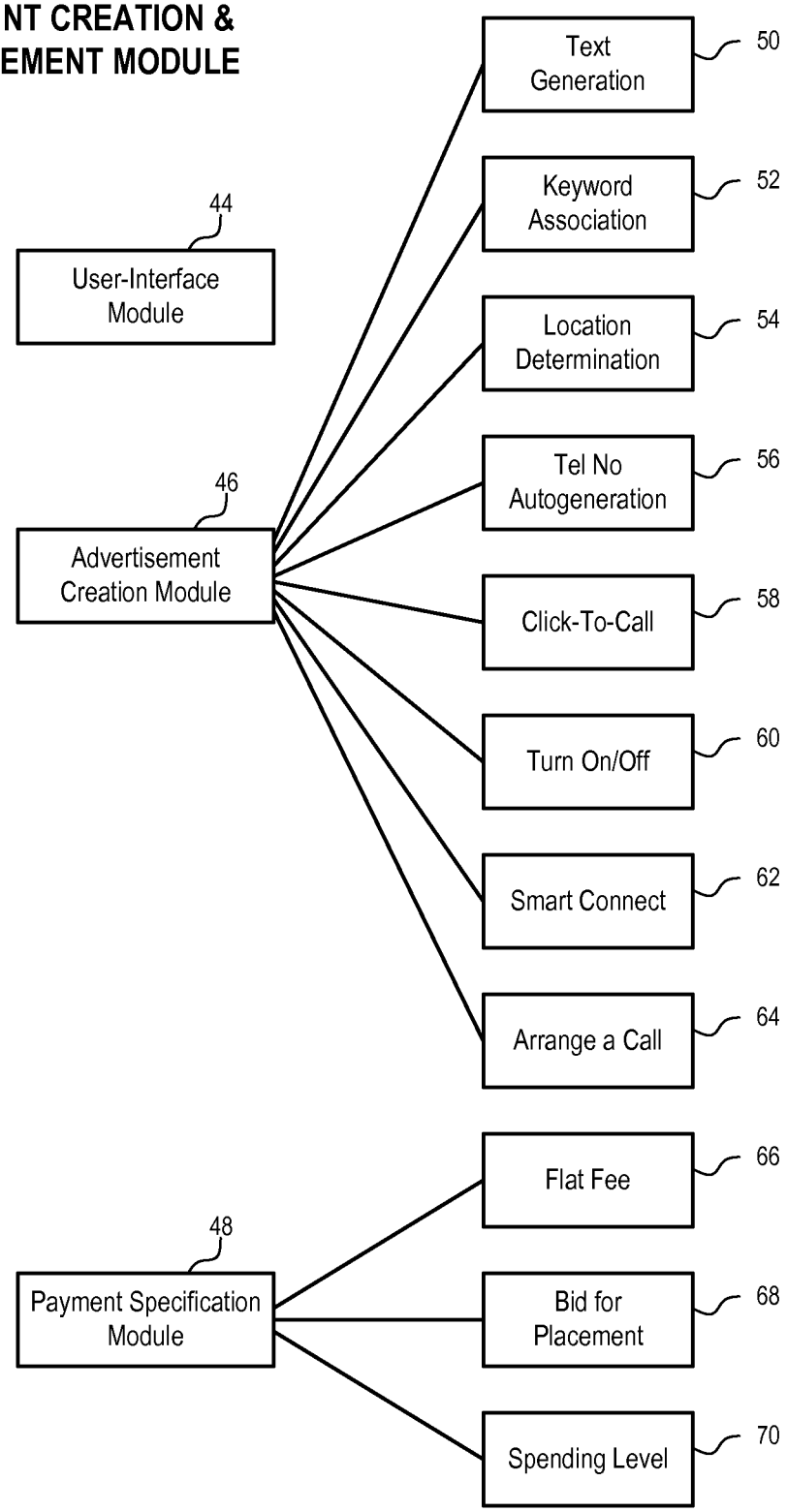
FIG. 5 illustrates the Account Creation and Management module of the system, in greater detail.
Figure 8A:
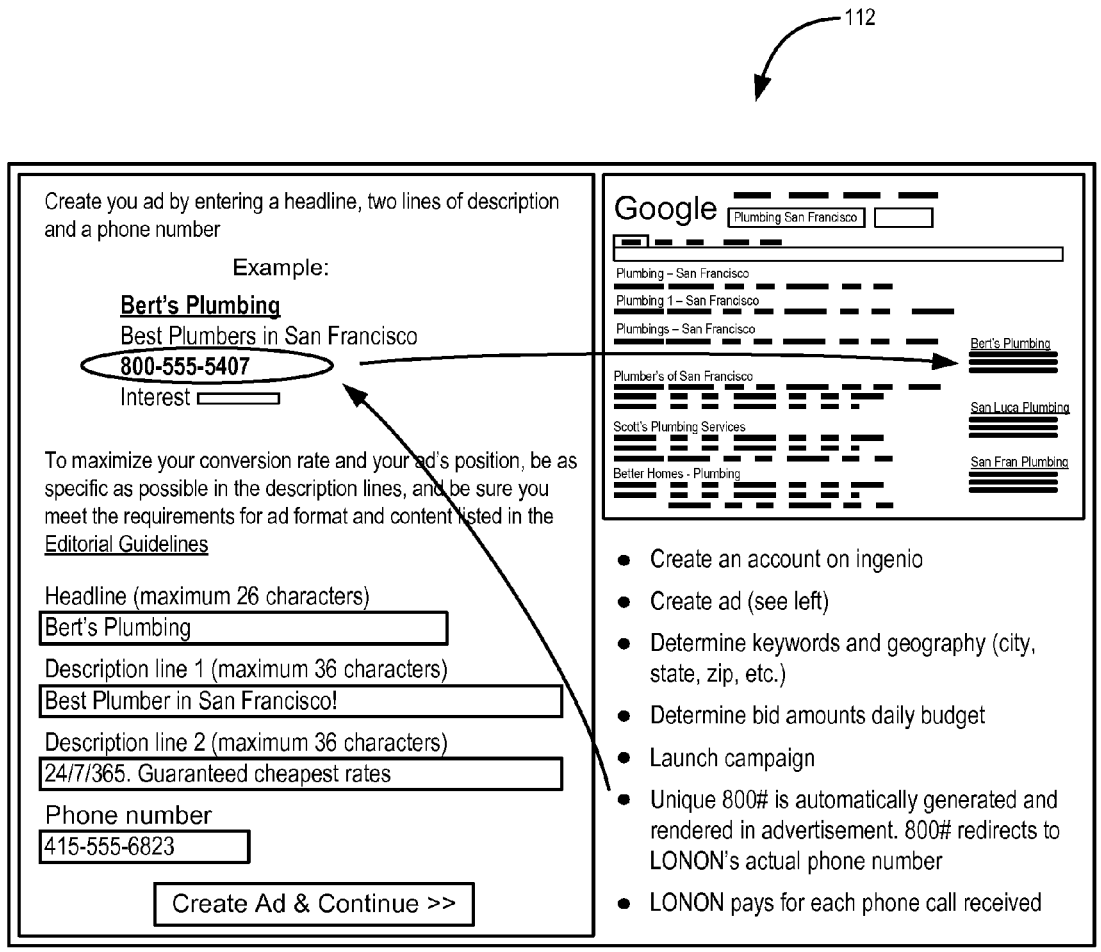
FIG. 8A shows an example of a user interface that may be presented to a user during advertisement creation, in accordance with one embodiment of the present invention.
Figure 8B:
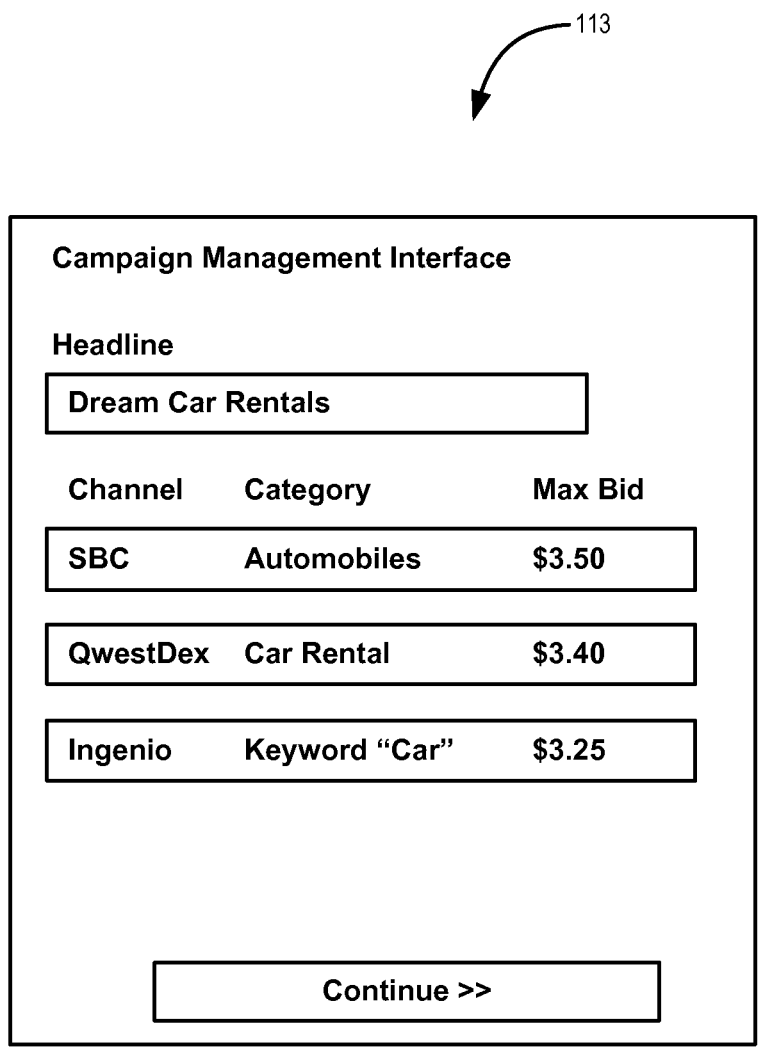
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client.

The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding of the present invention, for the remainder of this description, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will be displayed to clients searching within the San Francisco area.

In one embodiment, the module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number is generated or selected from a pool of numbers at the time the advertisement is created; alternatively, the telephone number is generated or selected at the time the advertisement is being requested for display. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1 800 YEL PAGES-1234, the call will be automatically routed to Burt's telephone as will be described in more detail below.

In one embodiment, the telephone number (e.g., a traditional telephone number with or without an extension, or a VoIP-based telephone reference, such as a Session Initiation Protocol (SIP) address) is automatically generated or selected at the time the advertisement is being requested for display. Alternatively, the telephone number assigned to the advertiser is generated or selected at the time the system accepts the submission of the advertisement from the advertiser. Alternatively, the telephone number assigned to the advertiser is generated or selected at the time the advertisement is being activated for publication via the system.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then tries cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module without departing from the invention.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory, or keyword. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account. Alternatively, Burt may provide payment information (e.g., a credit card number or bank account) to the system such that the system can automatically transfer additional funds, when needed, to his account according to the payment information.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system of the present invention may be configured to waive the charges on leads from customers who have already called a particular advertiser within a specified number of days. In alternative embodiments, additional, less, or different logic may be included in the system.

Figure 6:
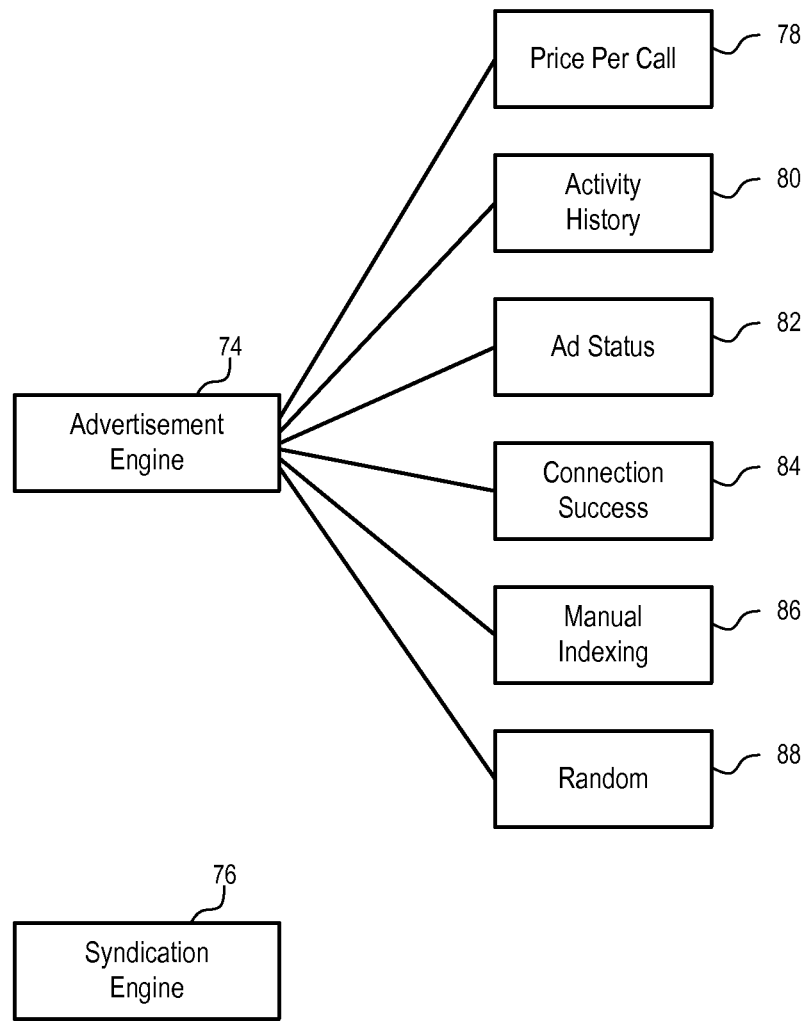
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement engine 74, and an advertisement syndication engine 76. The purpose of the advertisement engine 74 is to automatically provide Burt's advertisement on a particular channel. In some embodiments, the advertisement engine 74 causes a campaign management interface 113 (see FIG. 8B of the drawings) to be displayed to an advertiser. The interface 113 allows the advertiser to optionally choose a channel, e.g., Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the present invention.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately provided. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser   | (Bid Amount per call) |
|-----------|--------------|-----------------------|
| 1         | 800-349-2398 | ($3.88)               |
| 2         | 866-324-3242 | ($3.22)               |
| 3         | 800-323-5321 | ($2.01)               |

The activity history logic 80 analyzes the number of calls Burt received in a give time period, for example, the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement engine 74 without departing from the invention.

In one embodiment, an advertisement engine 74 further includes one or more modules for searching advertisements according to a query request, sorting advertisements, allocating real time communication references (e.g., traditional telephone numbers, SIP address, user ID of instant messaging system, etc.).

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92 without departing from the invention.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100 106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. In one embodiment, the report provides additional information based on an address lookup of the ANI, including but not limited to demographic, socioeconomic, and psychometric information. The report may be used by Burt in order to monitor the effectiveness of an advertisement campaign, and to optimize the campaign. In alternative embodiments, additional, less, or different logic may be included in the call monitoring engine 94 without departing from the invention.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
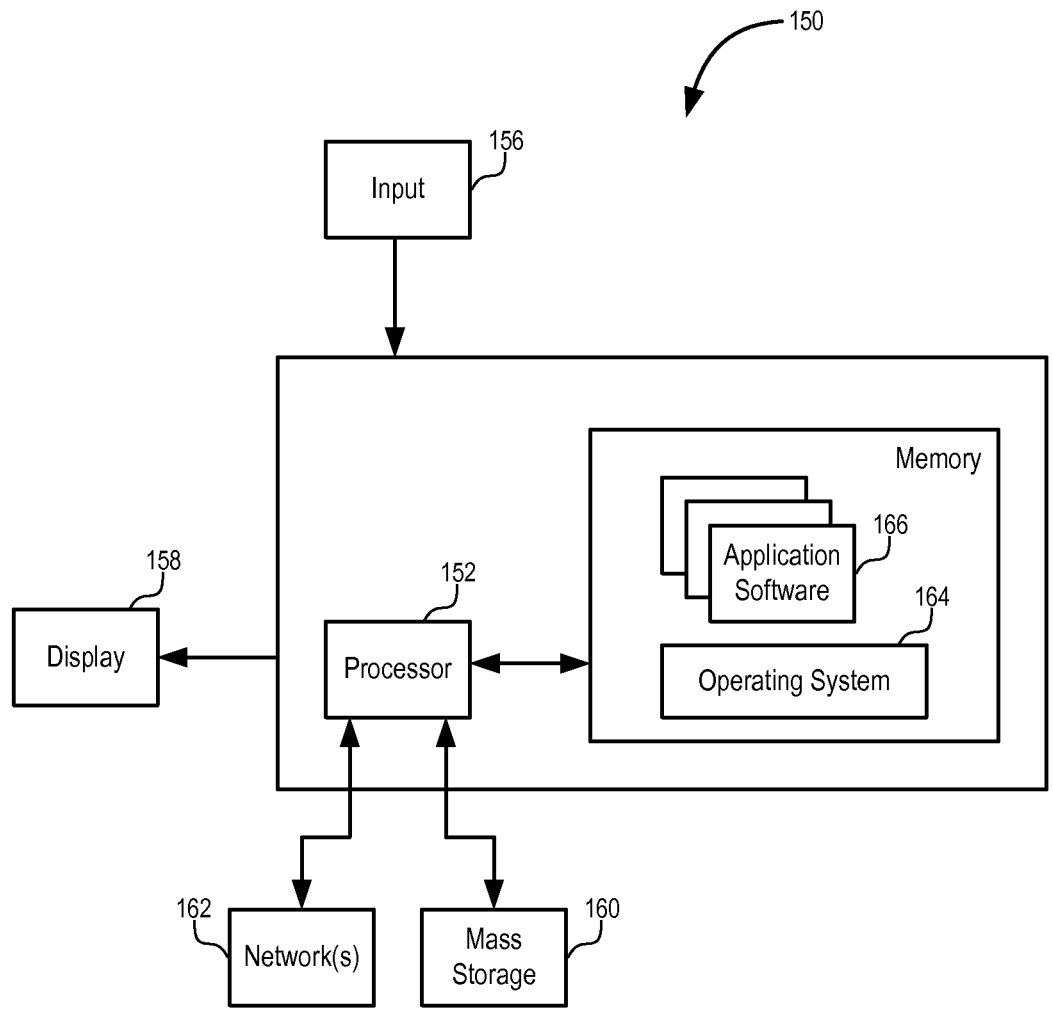
FIG. 11 shows a high level hardware block diagram of a system that may be used to implement the system, in accordance with one embodiment of the invention.

Referring to FIG. 11 of the drawings, reference numeral 150 generally indicates hardware that may be used to implement the above-described system. The hardware 150 typically includes at least one processor 152 coupled to the memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. These demand partners (also referred to herein as syndication partners) can receive a percentage of the advertising revenue generated via the pay-per-call method and system described, herein. Thus, as in the example of the table above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
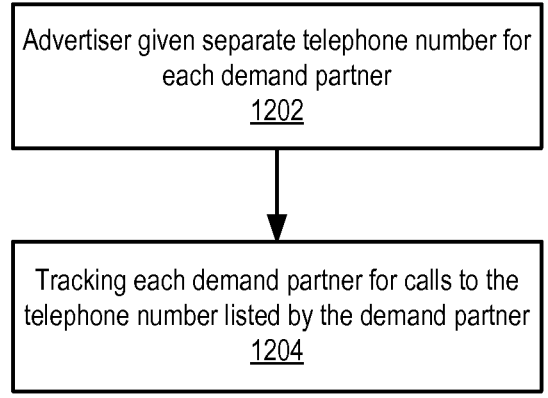
FIGS. 12-18 describe processes in accordance with embodiments of the invention to track/credit demand partners.

In one embodiment, described in the flow diagram of FIG. 12, in process 1202 an advertiser (also referred to herein as a merchant or listing) is given a separate telephone number for each separate demand partner that is posting the merchant's advertisement. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
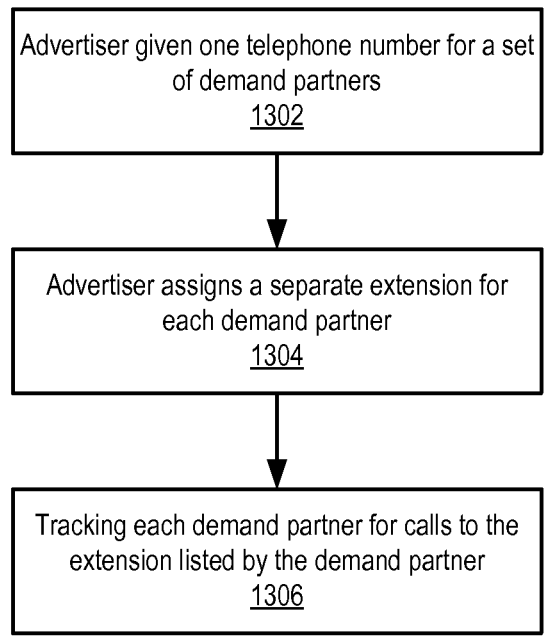

In another embodiment, described in the flow diagram of FIG. 13, in process 1302 an advertiser receives a single/base (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new—cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
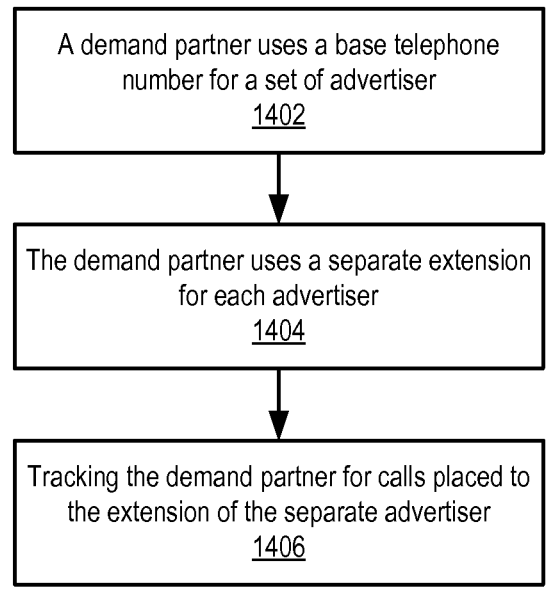

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
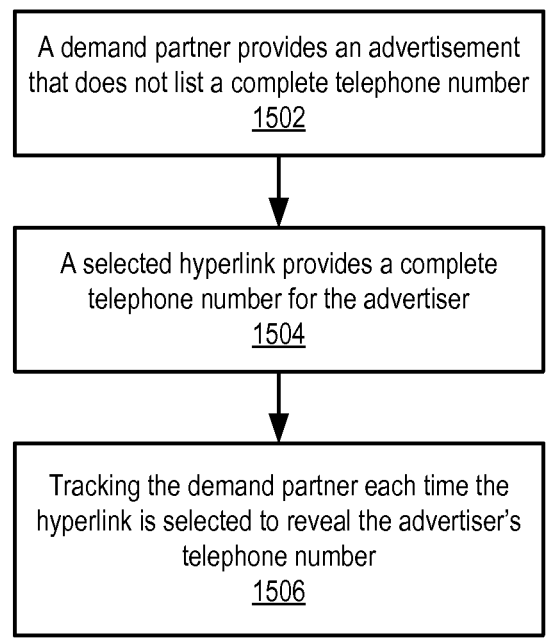

According to another embodiment, a click-to-reveal method is proposed, as described in co-pending U.S. Patent Application No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the advertisement engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
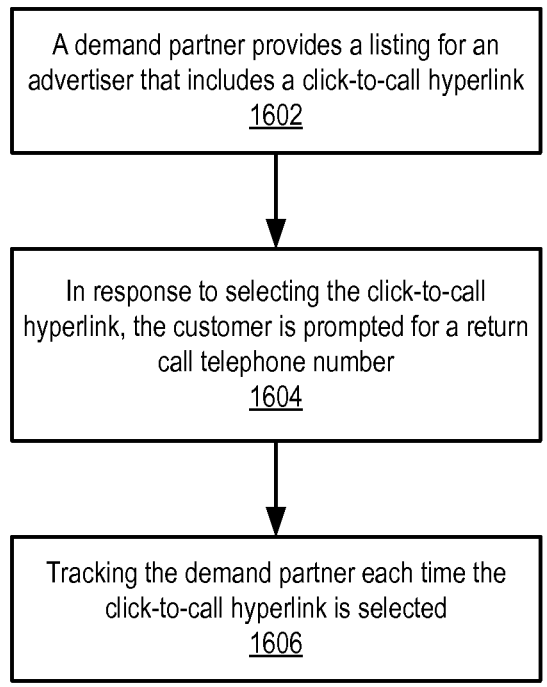

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link (e.g., a hyperlink, or an icon, or a button) is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
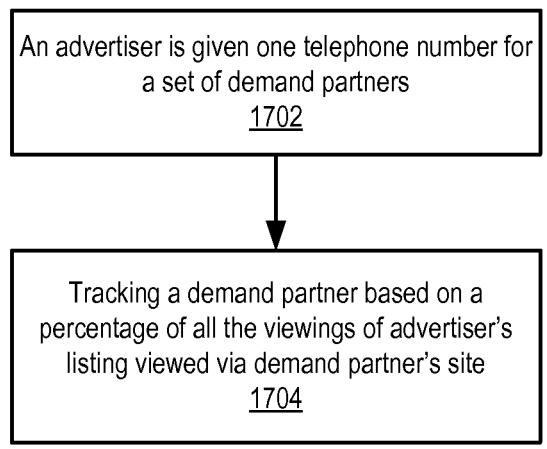

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
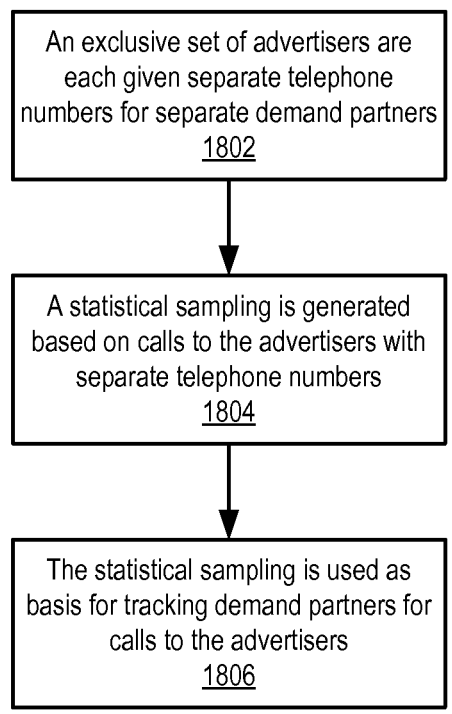

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are each give a unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers. By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for consumers to call. By counting the number of telephone calls such advertisements receive, the campaign's effectiveness can be measured. This is of benefit both to the advertiser and to the directory/publisher.

Telephone-call tracking can be also used as such in directories that are online, such as an online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that described in U.S. patent application Ser. No. 10/872,117, filed Jun. 17, 2004, an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

In one embodiment, not only is it designed to track the number of calls and precise time of calls, but the demand source at which the caller viewed the advertisement may also be tracked. Online directories can have many different external web sites through which they syndicate the same advertisers, and it can be useful to know from which web site the phone call originated so that, in some cases, the directory can compensate the external web site for having brought customers. Provisional U.S. Patent Application Ser. No. 60/560,926, filed on Apr. 9, 2004, outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time/duration of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers.

By monitoring which unique phone number was dialed, it can be determined which demand source deserves the credit for producing the call.

In one embodiment, the unique telephone numbers assigned to an advertiser and or a demand partner is for a short period of time after the listing of the advertiser containing the unique telephone numbers is presented. After the time period, the telephone numbers can be re-assigned to other advertisers.

Figure 19:
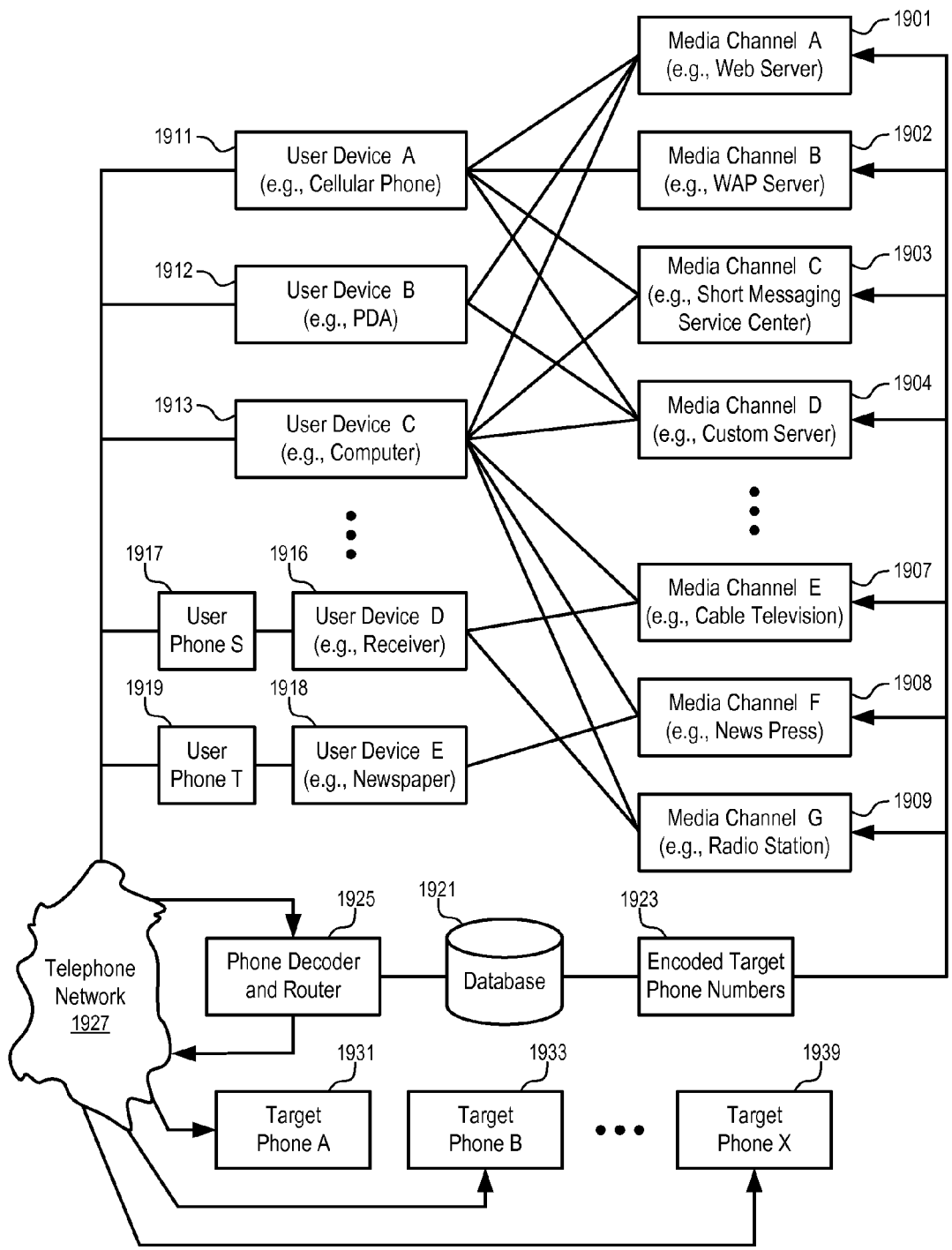
FIG. 19 shows a diagram of a system to make and track phone connections according to one embodiment of the present invention.

FIG. 19 shows a diagram of a system to make and track phone connections according to one embodiment of the present invention.

In FIG. 19, a database (1921) may contain the phone numbers of target phone A (1931), target phone B (1933), . . . , target phone X (1939), etc. Typically, the target phones belong to the institutions, businesses, individuals, etc, which seek for publicity through various media channels, such as media channel A (1901) (e.g., web server), media channel B (1902) (e.g., WAP server), media channel C (1903) (e.g., short messaging service center), media channel D (1904) (e.g., custom server), media channel E (1907) (e.g., cable television), media channel E (1908) (e.g., news press), media channel G (1909) (e.g., radio station), etc.

In one embodiment of the present invention, the phone numbers of the target phones are not directly publicized over the media channels. Instead, encoded target phone numbers (1923) are used. Using the encoded target phone numbers (1923), a user cannot reach target phones directly. The encoded target phone numbers (1923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (1911) (e.g., cellular phone), user device B (1912) (e.g., personal digital assistant (PDA)), user device C (1913) (e.g., computer), user device D (1916) (e.g., receiver), user device E (1918) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (1917) or user phone T (1919).

In one embodiment of the present invention, dialing at least a portion of an encoded target phone number connects the phone call to a phone decoder and router (1925) first. According to the encoded target phone number dialed, the phone decoder and router (1925) determines the corresponding target phone number using the database (1921) and connects the phone call to the corresponding target phone (e.g., one of target phones 1931-1939) through the telephone network (1927).

Note the telephone network (1927) may be circuit switched, packet switched, or partially circuit switched and partially packet switched. For example, the telephone network may partially use the Internet to carry the phone call (e.g., through VoIP). For example, the connection between the user phone/device and the phone decoder and router (1925) may be carried using VoIP; and the connection between the phone decoder and router (1925) may be carried using a land-line based, circuit switched telephone network.

In one embodiment of the present invention, the information associated with the encoded target phone number, such as the media channel used to provide the encoded target phone number to the users, is also decoded/retrieved using the database (1921). Thus, the information associated with the encoded target phone number can be tracked/stored.

In one embodiment, the phone decoder and router (1925) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (1925). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (1925) through the telephone network (1927); and a second portion of the encoded target phone number is to be decoded by the phone decoder and router (1925). For example, the Dual Tone Multi-Frequency (DTMF) decoder can be installed in the phone decoder and router (1925) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment of the present invention, a single telephone number is used to reach the phone decoder and router (1925) for different target phone numbers; and the portion of the encoded target phone number that is used to reach the phone decoder and router (1925) is not used in determining the information associated with the encoded target phone number.

Alternatively, multiple telephone numbers can be used to reach the phone decoder and router (1925); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (1921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (1925). When such a mapping scheme is used, a look up table is not necessary. For example, an encoded target phone number may include a first portion that is the phone number of the phone decoder and router (1925), a second portion that is the target phone number appended with a number mapped from an identifier of the media channel. To prevent the user from dialing the target phone number directly, an encryption/scrambling scheme can be used to encode the second portion, which is decoded at the phone decoder and router (1925).

In one embodiment of the present invention, the phone decoder and router (1925) determines the target phone number from the encoded target phone number dialed by the user and then dials the target phone number for the user and joins/bridges the phone calls so that the user can talk to the target phone.

In one embodiment of the present invention, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (1925), pauses for a short period of time for the phone decoder and router (1925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 19, the user device initiates the phone call. Alternatively, a phone router may be used to initiate phone calls both to the user device (or a separate user phone) and the target phone and then join/bridge the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment of the present invention, an advertisement is presented to end users around the globe without geographical area limitations. For example, an advertiser may provide services and/or products to customers around the globe. The advertisement may be delivered to the worldwide users of the Internet.

In one embodiment of the present invention, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment of the present invention, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment of the present invention, an advertisement presented in a media channel is for a single advertiser. The end user selects an advertiser according to the advertisements presented on behalf of individual advertisers; and the phone decoder and router connects the end user and the selected advertiser according to the encoded target phone number individually publicized in the advertisement for the advertiser. When the user views the online advertisements, the selection of the advertiser is based on the online information.

In one embodiment of the present invention, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the phone decoder and router.

For example, a toll-free number is published to advertise mortgage brokers in a particular geographic area. When a consumer dials the toll-free number, the call is routed to the highest bidding mortgage broker who is available in that market.

The phone decoder and router may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Figure 20:
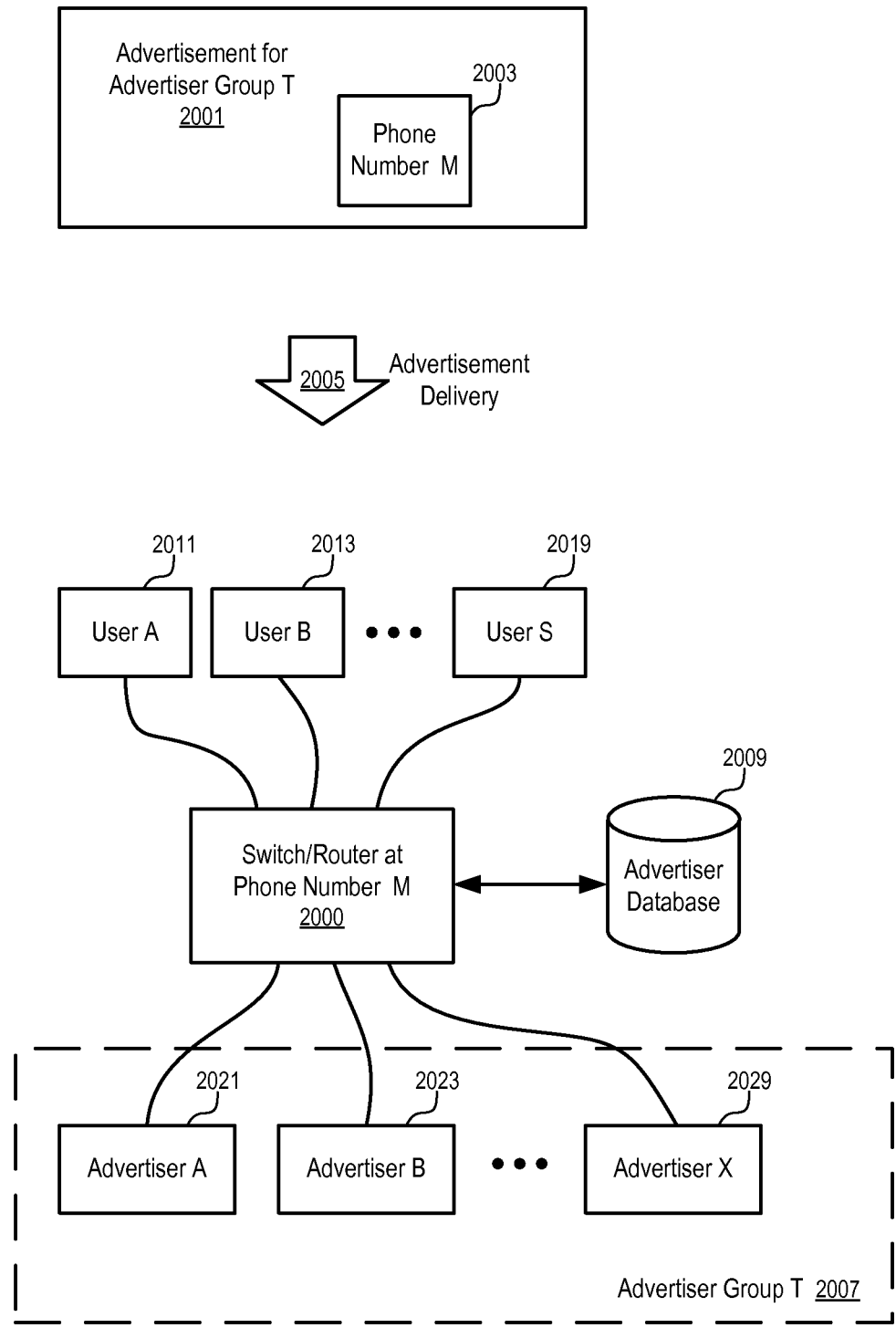
FIG. 20 shows a diagram of a system to make offline selection of advertisers according to one embodiment of the present invention.

FIG. 20 shows a diagram of a system to make offline selection of advertisers according to one embodiment of the present invention.

In FIG. 20, the advertisement (2001) is for an advertiser group T (2007) which includes a number of different advertisers, such as advertiser A (2021), advertiser B (2023), advertiser X (2029), etc. For example, the advertisers of the group may offer the same types of services or products under similar terms and/or prices. Thus, a unified advertisement can be presented on behalf of the entire group. The advertisement delivery (2005) can be in any of the forms known in the art. For example, the advertisement can be delivered through newspaper, radio, television, yellow book, listing service, web search engine, web site banner, WAP, SMS, etc. The advertisement contains phone number M (2003) for the users to initiate a phone call to reach one of the advertisers.

In one embodiment, the advertised phone number (e.g., 2003) can also contain extension digits in addition to toll-free digits. In one embodiment, the extension digits are used to convey additional information such as geography, category, or the ability to trace specific advertising creative (e.g., the call resulted from the advertisement on the billboard on Second Street). In one embodiment, dialing of the extension digits (or some of the extension digits) is optional; if the extension digits are not dialed, the call goes through anyway; and the information corresponding to the extension digits is not collected (or, similar information is extracted/extrapolated from other data sources, such as the phone number from which the call is initiated, etc.).

In one embodiment of the present invention, the phone number M (2003) is not specifically for a particular advertiser at the time the advertisement is presented. Thus, at the time the user initiates the phone call, the target advertiser is yet to be determined The selection of a particular target advertiser is after the initiation of the phone call.

In one embodiment of the present invention, a switch/router (2000) at the phone number M is used to connect the users to the advertisers dynamically according to the information in the advertiser database (2009). When a user, such as user A (2011), user B (2013), user S (2019), etc., calls the phone number M (2003), the user is connected to the switch/router (2000) first. With or without further user input, the switch/router (2000) connects the call to an advertiser, such as advertiser A (2021), advertiser B (2023), advertiser X (2029), etc. The advertiser is charged based on the telephone calls generated for the advertiser. In one embodiment, the selection of the advertiser is made at the switch/router after the user phone call is received. The switch/router may operate via switching circuits or changing communication data packets.

Alternatively, information about the user phone number and the desire to make the phone call according to the advertised phone number can be transmitted to the switch/router through a communication link other than a phone connection. For example, an email, a fax, an HTTP (HyperText Transfer Protocol)/WAP (Wireless Application Protocol) request, etc., can be used to submit the request for the phone connection. The switch/router then initiates the phone call to the user and the phone call to the selected winning advertiser and bridges the two calls.

Note that the phone number M (2003) may also be encoded in a way so that the information about the media channel which provides the phone number to the user can be decoded, as discussed above. For example, different media channels may be assigned different phone numbers for reaching the same group of advertisers through the switch/router (2000). According to the phone number in the advertisement, the switch/router (2000) can determine the media channel that is creditable for the delivery of the phone number to the users.

In one embodiment of the present invention, a winning advertiser is selected according to the bidding for advertisement. The highest bidder wins the telephone call. The advertisers may adjust their bids anytime through any communication media to balance their chances to get a call resulting from the advertisement and the cost for the advertisement. For example, the advertisers may change their bids through a web site that is connected to the advertiser database, through an email to representatives or automatic email gateways of the advertiser database, through a phone call, a fax, a letter, etc.

Alternatively, the set of highest bidders may be determined; and the calls resulting from the advertisement are distributed to the set of highest bidders in frequencies that are proportional to their bid amounts. Alternatively, one from the set of highest bidders is further selected according other criteria, such as the geographic distance from the advertisers to the callers. Alternatively, other criteria, such as the matching of geographic service area to the location of the callers, are used to select a set of candidates; and the candidates are then ranked according to the prices specified by the advertisers for the pay for performance advertisement, where the performance is measured in terms of phone calls resulting from the advertisement.

In one embodiment, the availability of the advertisers to answer the call is also considered. In one embodiment, if the top-ranking (e.g., according to the bidding) advertiser receives a call and doesn't pick up after a certain amount of time (e.g. 30 seconds), the call is automatically routed to the second-highest ranking advertiser, and so on. In another embodiment, the missed call is routed to a human concierge who transfers the call to the appropriate available advertiser or information source.

In one embodiment, the advertiser group includes subgroups of advertisers for different geographic areas. Indications of geographic areas of interest to the callers can be used in the selection process.

In one embodiment, the selection of the geographic area is made when the user selects the phone number from the advertisements. The phone number is encoded with geographic area information such that, when the phone number is dialed, the geographic area information can be automatically decoded from the phone number dialed; and the geographic area information can be used to rank the advertisers and/or eliminate the advertisers that are not for the corresponding geographic areas.

In one embodiment, the geographic area information is determined from the location of the user phone. Alternatively, the user may specify the geographic area in the phone call to the switch/router (2000), through an automated system or through human concierges. Further, the user may specify requirements other than geographic areas for selecting the winning advertiser. Further details are provided below.

Figure 21:
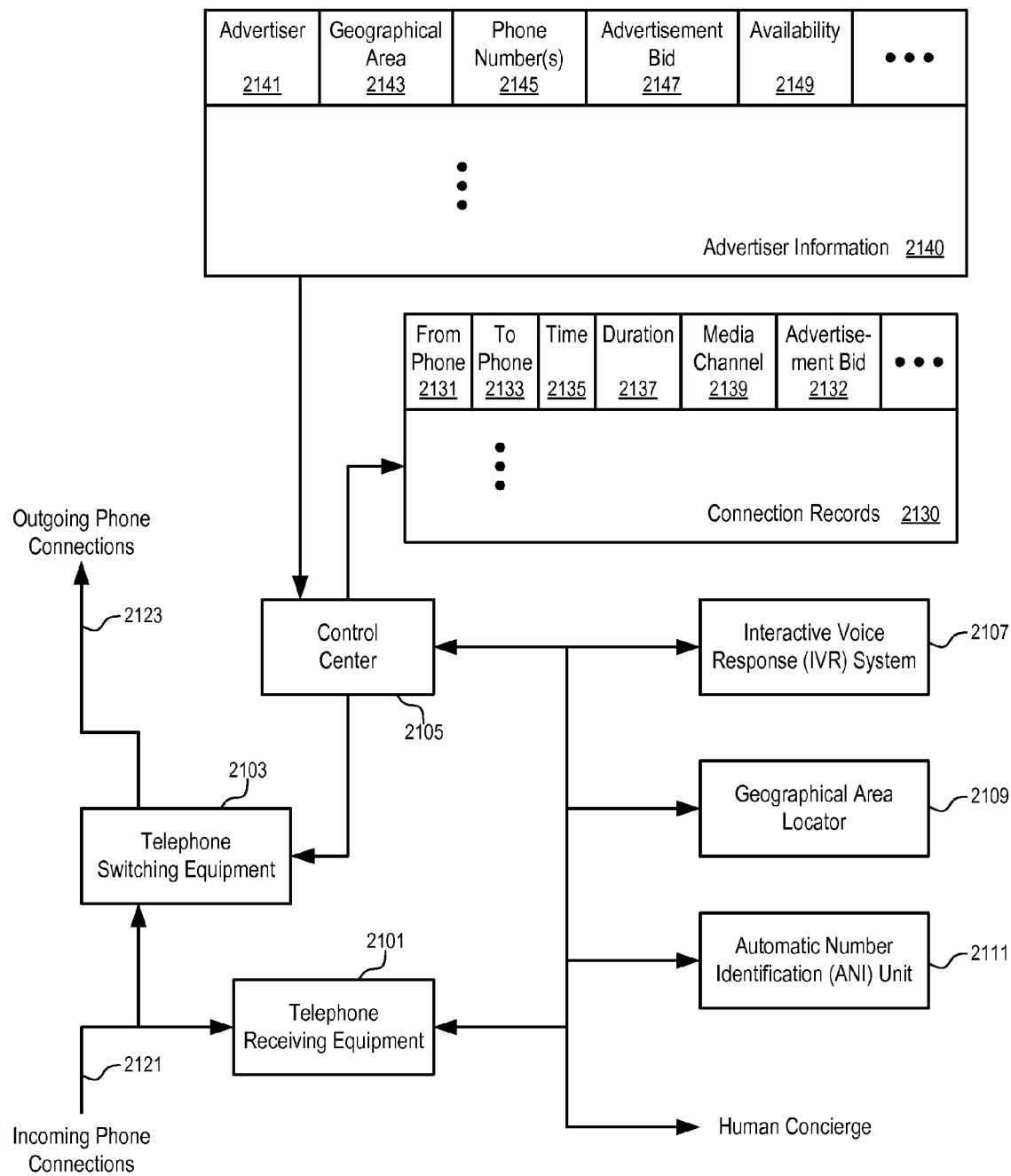
FIG. 21 shows a diagram of a telephone connection system for offline selection of advertisers according to one embodiment of the present invention.

FIG. 21 shows a diagram of a telephone connection system for offline selection of advertisers according to one embodiment of the present invention.

In FIG. 21, when a user calls an advertised telephone number, the phone call is connected to the telephone receiving equipment (2101). The telephone receiving equipment (2101) is connected to the control center (2105) to operate the telephone switching equipment (2103), which selectively connects incoming phone connections (2121) from the users and outgoing phone connections (2123) to the winning advertisers.

In one embodiment, the telephone receiving equipment (2101) and the telephone switching equipment (2103) are circuit switched, including Private Branch Exchange (PBX) and a dedicated voice network. Alternatively, the telephone receiving equipment (2101) and the telephone switching equipment (2103) may be packet switched, including Internet Protocol (IP) based PBX, a data communication network and a gateway. In general, various telephonic techniques known in the art can be used.

When the telephone receiving equipment (2101) picks up a phone call, the control center (2105) determines whether or not further information is needed and/or can be obtained from the caller. For example, to determine a geographical area of interest, the control center (2105) can instruct the interactive voice response (IVR) system (2107) to prompt the caller to key in the desired zip code. In one embodiment, Interactive Voice Response (IVR) is a telephony technology in which one may use a touch-tone telephone to interact with a database to acquire information from or enter data into the database without the help of a human concierge.

Further, the control center may direct the IVR system (2107) to prompt the caller to specify further criteria based on the advertiser information (2140). For example, when the phone number is for a group of mortgage brokers, the user may be directed to select loan sizes, loan types, etc.

Alternatively, the control center (2105) may instruct the geographic area locator (2109) to determine a geographic area from which the call is initiated. For example, the geographic area locator may use the cellular position system to determine the location of a cellular phone, or use a satellite/pseudolite positioning system to determine the location of a mobile device. Pseudolites are ground-based transmitters signals similar to a Global Positioning System (GPS). Pseudolites are useful in situations where signals from an orbiting satellite might be unavailable, such as tunnels, mines, buildings or other enclosed areas. A satellite/pseudolite signal receiver may determine its location and transmit the location through the cellular phone to a cellular communication system, or transmit the received signals to a location server which computes the location.

A cellular communication system may also determine the location of a cellular phone. For example, the location of a cellular phone can be determined using a method known as Time Difference of Arrival (TDOA) in which the reception times of a cellular signal from a mobile station are measured at several base stations to determine the position of the cellular phone. Alternatively, a method known as Advanced Forward Link Trilateration (AFLT), or Enhanced Observed Time Difference (EOTD), can be used, which measures the reception times of cellular signals from several base stations to the cellular phone. Alternatively, the cellular site, in which the mobile device can communicate to a based station, can be used to determine a rough position of the cellular phone. In general, any method used by a cellular phone provider to get location information (e.g., for emergency service) can be used.

The control center (2105) may also instruct the automatic number identification (ANI) unit (2111) to determine the phone number of the incoming call and look up the geographic area information from the database for the phone numbers.

Alternatively, the control center (2105) may connect the phone call temporally to a human concierge who can help the caller to specify a selection criterion (or criteria).

In one embodiment of the present invention, the control center (2105) uses a number of different types of information to select the winning advertiser based on the advertiser information (2140).

In one embodiment, the advertiser information (2140) include the identities of the advertisers (e.g., 2141), the geographic areas (e.g., 2143) of the advertisers, the phone number(s) (e.g., 2145) of the advertisers, the placement bids (e.g., 2147) of the advertisers, the availability statuses (e.g., 2149) of the advertisers, etc. In an alternative embodiment, more or less fields can be used for the advertiser information. For example, keywords of the advertisements and/or categories of the products and/or services advertised in the advertisements can be included in the database of advertiser information.

The availability may include the information about the projected waiting time for a caller to get through. The availability may also depend on the advertisement budget specified by the advertiser. For example, the advertiser may specify the advertisement budget in terms of the maximum number of calls in a day, the minimum time intervals between two calls, working hours, etc.

In one embodiment, in view of the caller's implicitly or explicitly specified requirements (e.g., the geographic area, the loan type, loan size, etc., if there is any), the control center ranks the advertisers according to the current advertiser information. For example, the control center may eliminate the advertisers that are not available or do not meet the caller's requirements and sort the remaining candidates according to the bid for advertisement. The highest bidder in the remaining candidates is the winner. Alternatively, other types of sorting criteria can be used. For example, an indicator of the degree of matching between the caller's requirements can be weighted according to the advertisement bid to generate an indicator for selecting the winner.

After the winning advertiser is determined, the control center (2105) can instruct the telephone switching equipment (2103) to connect the incoming phone call to the phone number of the winning advertiser. The control center (2105) then creates a record entry in connection records (2130) to indicate the connection made for the advertiser. For example, a record entry may include information such as the from phone number (2131), the to phone number (2133), the time the connection is made (2135), the duration of the connection (2137), the media channel (2139) responsible for delivering the advertisement to the caller, the advertisement bid (2132) of the advertiser at the time of the connection, etc. Other information, such as whether or not a human concierge is involved, can also be recorded. In an alternative embodiment, more or less fields can be used for the connection records.

In one embodiment, the recorded connection information is used to generate invoice to bill the advertisers. An account of the advertiser may be debited automatically for the connection. Alternatively, a payment for the advertisement is collected automatically through an electronic system for the connection.

Figure 22:
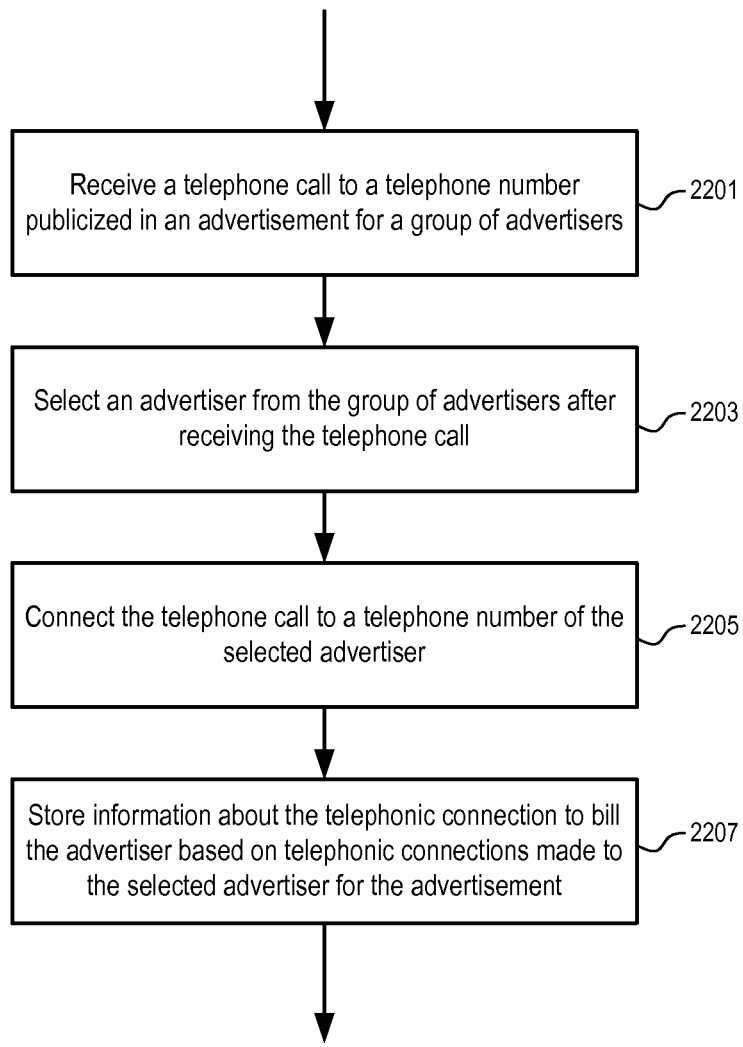
FIGS. 22-25 show flow diagrams of making and tracking phone connections according to embodiments of the present invention.
Figure 23:
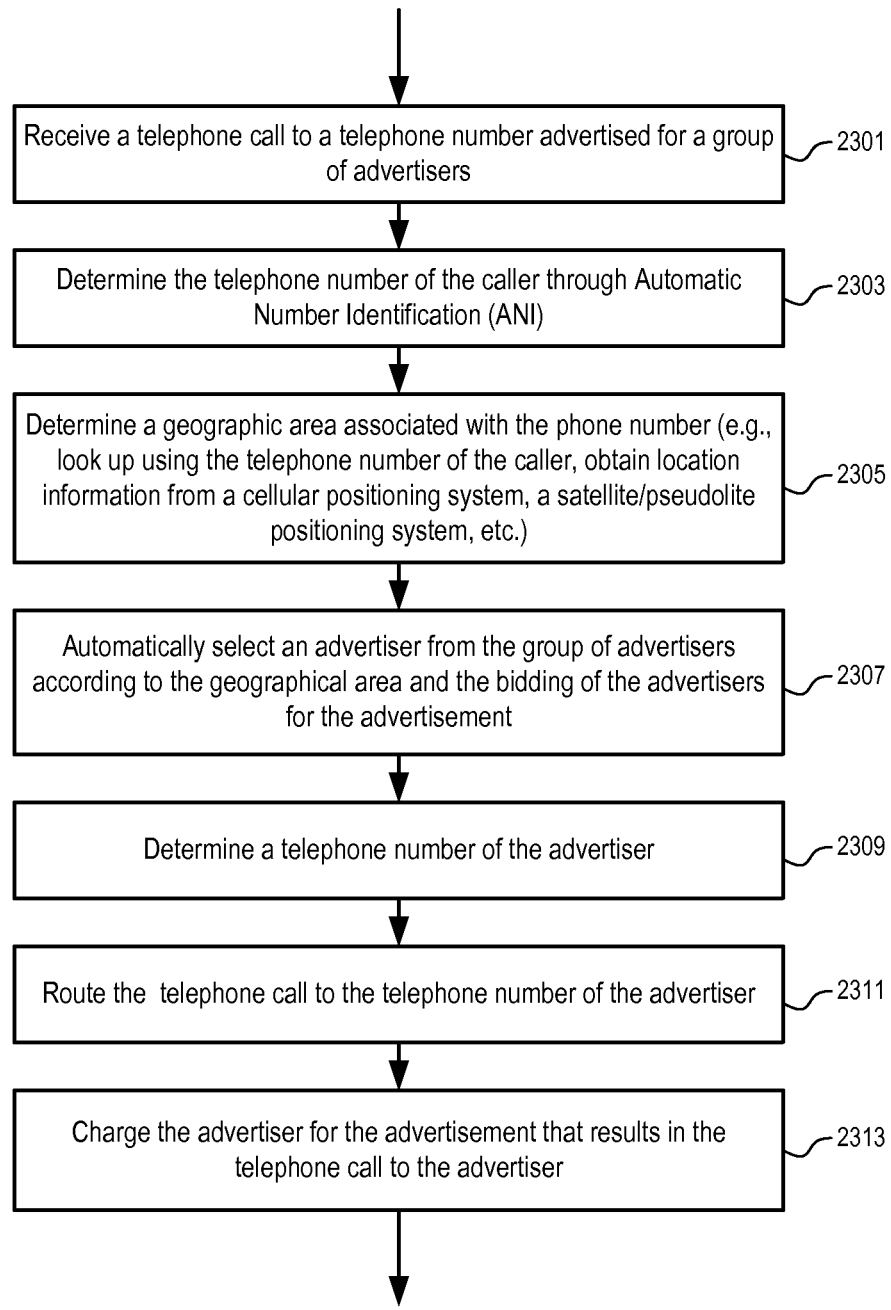
Figure 24:
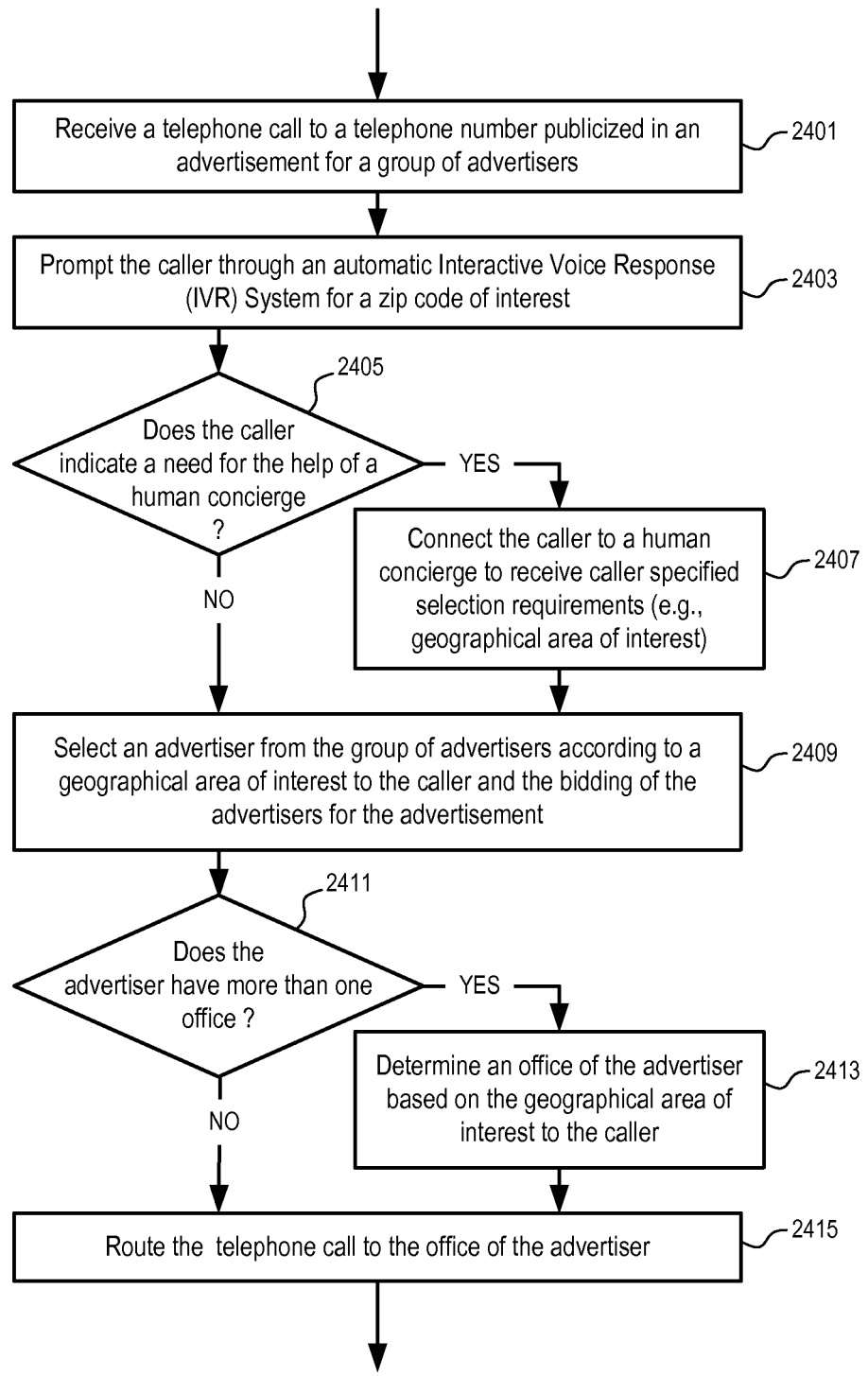

FIGS. 22-24 show flow diagrams of making and tracking phone connections according to embodiments of the present invention.

In FIG. 22, operation 2201 receives a telephone call to a telephone number publicized in an advertisement for a group of advertisers. Operation 2203 selects an advertiser from the group of advertisers after receiving the telephone call. Operation 2205 connects the telephone call to a telephone number of the selected advertiser. Operation 2207 stores information about the telephonic connection to bill the advertiser based on telephonic connections made to the selected advertiser for the advertisement. In one embodiment, the geographic area of interest to the caller is determined, which is used in selecting the advertiser as the receiver of the telephone call.

In FIG. 23, after operation 2301 receives a telephone call to a telephone number advertised for a group of advertisers, operation 2303 determines the telephone number of the caller through Automatic Number Identification (ANI). Operation 2305 determines a geographic area associated with the phone number (e.g., look up using the telephone number of the caller, obtain location information from a cellular positioning system, a satellite/pseudolite positioning system, etc.). Operation 2307 automatically selects an advertiser from the group of advertisers according to the geographical area and the bidding of the advertisers for the advertisement. Operation 2309 determines a telephone number of the advertiser. Operation 2311 routes the telephone call to the telephone number of the advertiser. Operation 2313 charges the advertiser for the advertisement that results in the telephone call to the advertiser.

For example, in one embodiment, the system looks at the phone number (obtained through ANI) of the incoming call and automatically routes it to the highest bidding mortgage broker in the geographic area of the phone number.

In FIG. 24, after operation 2401 receives a telephone call to a telephone number publicized in an advertisement for a group of advertisers, operation 2403 prompts the caller through an automatic Interactive Voice Response (IVR) System for a zip code of interest.

If operation 2405 determines that the caller indicates a need for the help of a human concierge, operation 2407 connects the caller to a human concierge to receive caller specified selection requirements (e.g., geographical area of interest, loan type, loan size, etc.).

Operation 2409 selects an advertiser from the group of advertisers according to a geographical area of interest to the caller and the bidding of the advertisers for the advertisement.

If operation 2411 determines that the advertiser has more than one office, operation 2413 determines an office of the advertiser based on the geographical area of interest to the caller.

Operation 2415 routes the telephone call to the office of the advertiser.

For example, in one embodiment, a customer is prompted on the telephone by an automatic IVR to key in the desired zip code. The system then routes the call to the highest bidding mortgage broker in that geographic area.

For example, in one embodiment, the customer is connected to a human concierge who asks for the desired geographic area and routes the call to the highest bidding mortgage broker in the desired geographic area.

For example, in one embodiment, a large national account which has local regional offices around the country, geography is ascertained using one of the above discussed methods and the call is then routed to the local office that best matches the geography.

In one embodiment of the present invention, an advertisement is for one single advertiser that has a number of different locations. The selection of the location of the advertiser and the corresponding target phone number is made at the time a phone call is received at a switch/router; and the selection may be automatic based on ANI or location information determined from a positioning system, or semi-automatic based on user interaction with an automated IVR, or non-automatic based on the user interaction with a human concierge. Alternatively, the advertisement can be for a group of different advertisers, some of which have different locations/branches in a large geographic area (e.g., a country, around the world, etc.).

In one embodiment, before an incoming call is connected to a selected advertiser (e.g., selected according to price bids of the advertisers for the phone lead, and/or a geographic location/area, and/or other criteria which may be explicitly or implicitly specified by the caller, etc.), no further advertisement information is presented in the telephone call to the caller. In one embodiment, no input is required from the caller to connect the incoming call, which is connected by the server to the highest bidding advertiser of the group associated with the telephone number that the caller dialed.

Alternatively, in one embodiment, further advertisement information may be presented to the caller on behalf of the individual advertisers, after the phone call from the caller is received and before the phone call is forwarded/routed/connected/bridged to an advertiser, to assist the caller in selecting an advertiser from a set of candidates. In one embodiment, detailed, differentiating advertisements are delivered to the callers who are already in the process of making a telephonic connection to one of the advertisers (e.g., service providers).

In one embodiment, advertisements for the individual advertisers are to be presented as voice/audio messages transmitted over the telephonic connection between the server and the caller, before the server further connects the call to a selected advertiser. For example, one or more advertisements as in the form of a pre-recorded voice message, and/or the output of a speech synthesizer using a text-to-speech system, can be presented to the caller over the telephonic connection.

Alternatively, in one embodiment, advertisements for the individual advertisers are presented in a visual form to the caller through the telephone connection, or through a separate data connection.

For example, through the telephone connection, a data stream can be provided from the server to the user device of the caller to present a document, or a user interface, that shows one or more listings of advertisers so that the user can select one to connect. For example, when the telephonic connection between the caller and the server is based on a Voice over Internet Protocol (VoIP) system, the server can provide the data stream to the terminal used by the caller to show advertisements, such as displaying the advertisements within a window of the VoIP client application, or within a separate web browser window.

In one embodiment, a VoIP phone is designed to display messages in additional to transmitting the voice/audio messages. For example, the VoIP phone is designed to receive and display video images or still images during the phone connection. Advertisements/listings can be presented as video images or still images. For example, the VoIP phone can be designed to receive and display data (e.g., text message, web page, WAP page, or data of a custom application). The server can stream the advertisement data to the VoIP phone over the connection for display.

In one embodiment, the selection of the caller is transmitted to the server as a voice/audio message. For example, according to the visual and/or the voice/audio presentation of the advertisements/listings, the caller can make the selection using a voice command (e.g., say an ID number of the advertisements/listings, or the name of the listings), or pressing a key to generate an audio signal (e.g., a Dual Tone Multi-Frequency (DTMF) signal) to indicate the selection.

Alternatively, in one embodiment, the selection of the caller is transmitted in a digital form, such as a text message, a web request, a WAP request, or a request in a custom communication protocol (e.g., SIP) when a custom application is used to display the advertisements/listings.

For example, a VoIP phone is designed to transmit data generated according to user input received at the input device of the phone (e.g., a touch screen, a keyboard, a keypad, etc.) After the caller views the advertisements/listings during the phone call, the caller can make a selection (e.g., click) to request the connection to the corresponding advertiser.

Further, a phone designed for a circuit switched network can also be designed to have at least some of the communications capabilities via the telephonic connection discussed above. For example, a phone for a circuit switched network can have a circuitry to detect audio signals that represents data transmitted over the phone connection and display the advertisements/listings according to the data received.

In one embodiment, the advertisements/listings are presented over a data connection separate from the telephonic connection. For example, a data-enabled phone (e.g., a cellular phone, a mobile phone, a Bluetooth phone, a software phone, etc.) can establish a separate data connection with the server to allow the display of the advertisements/listings. For example, the data-enable phone can have an application designed to display the advertisements/listings when the phone number of the server is dialed. The advertisements/listings may be pre-loaded, or downloaded after the dialing of the phone number of the server. In one embodiment, the data connection is a two-way communication channel, which allows the phone to transmit the user selection and/or other user input (e.g., search criteria) in a digital format.

In one embodiment, the server selectively determines one or more candidates. A representation of the candidates is then presented to the caller for selection/confirmation. The representation can be delivered for visual and/or audio presentation.

In one embodiment, the candidates are selected at least partially based on the price bids of the advertisers. In one embodiment, the selection of the candidates is further based on a search request of the caller. For example, the caller may ask for a particular advertiser by name; and the server can then determine the requested advertiser and one or more alternative advertisers that are similar to the requested advertiser. For example, the caller may specify a price range charged by the service providers; and the server can then determine one or more candidates based on the price range and price bides of the advertisers.

In one embodiment, the telephone number of the server is advertised for a group of advertisers (e.g., "Call 1-800-PLUMBER for plumbers in your area", "Call 1-800-MYLOCAL for top local merchants in your neighborhood: plumbing, roofing, taxi, pizza, etc."), and/or for the capability of the server to determine an advertiser requested over the phone.

For example, after the caller calls the telephone number of the server, the caller may specify one or more criteria to search for a suitable advertiser/service provider. After the search is performed, the server presents one or more listings/advertisements of the candidates to the phone of the caller for display. The caller can select a desired one to connect or request more candidates. Alternatively, the candidates can be read out to the caller one at a time for the user to select. In one embodiment, the presentation sequence, or position, of the candidates are at least partially determined by the price bids of the candidates for the phone lead.

Figure 25:
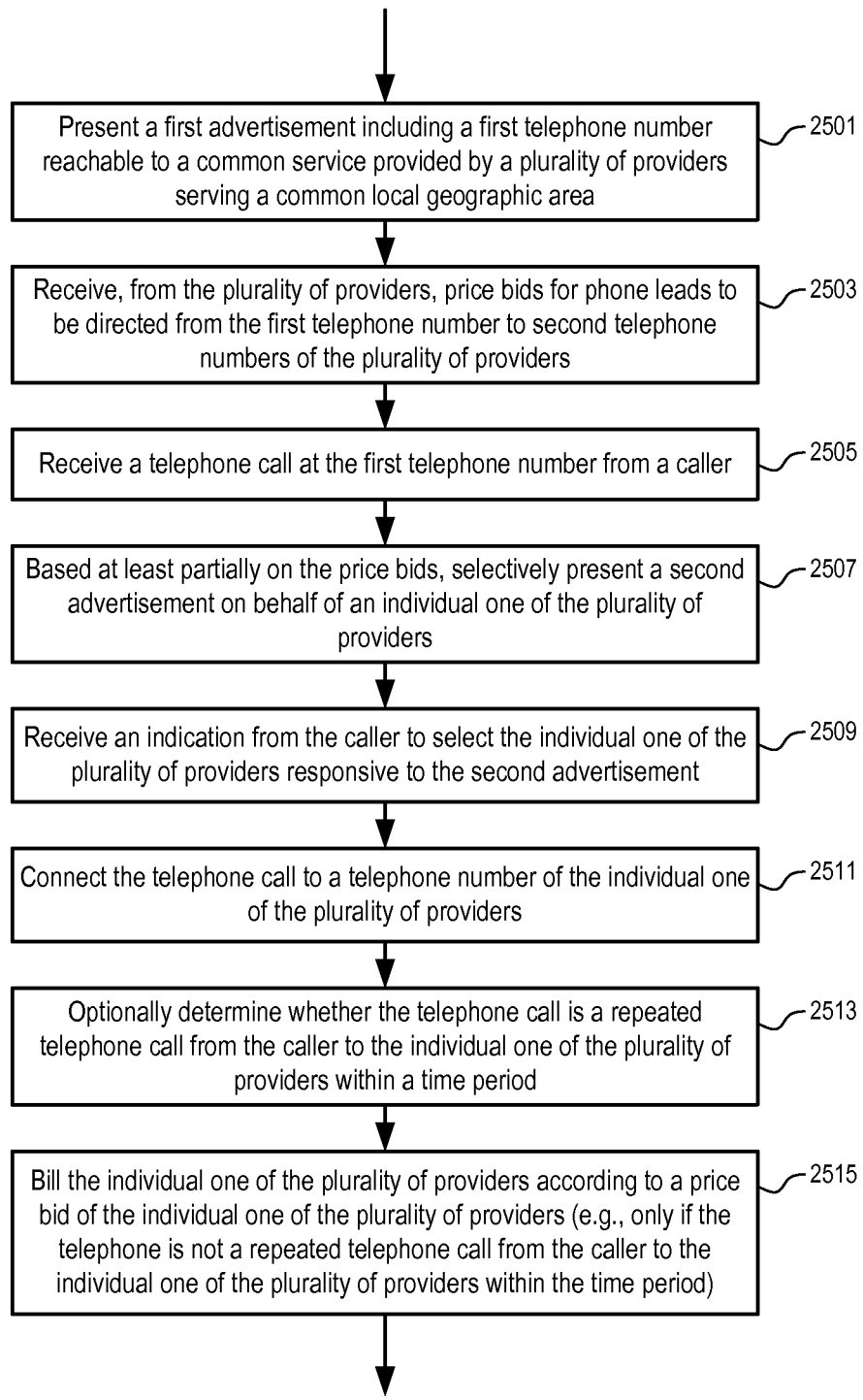

FIG. 25 shows a flow diagram of making phone connections according to one embodiment of the present invention. In FIG. 25, operation 2501 presents a first advertisement including a first telephone number reachable to a common service provided by a plurality of providers serving a common local geographic area. The advertisement may be presented in a variety of media channels, such as web pages, emails, books, magazines, newspapers, television programs, text messages, multi-media messages, instant messages, billboards, refrigerator magnets, etc. In one embodiment, the first advertisement does not specifically identify any individual of the providers. In one embodiment, the first advertisement does not specifically represent any individual providers. In one embodiment, the first advertisement identifies a portion of the providers as examples. In one embodiment, the first advertisement identifies and describes the providers as a whole.

In one embodiment, the first telephone number is designed to reach a variety of callees based on a search request presented by the caller after telephonic connection between the caller and the server is established.

From the plurality of providers, operation 2503 receives price bids for phone leads to be directed from the first telephone number to second telephone numbers of the plurality of providers. In one embodiment, the price bids are used to rank the similar advertisers selective presentation to the caller of the first telephone number. For example, the price bids may be used to select the top one or two of currently available providers for presentation to the caller. The providers who are not currently available to talk to the caller may be excluded from the list, or be presented after a further request from the caller.

In one embodiment, the availability information of the providers to talk to the caller is collected from the providers. For example, the providers may specify the schedule (e.g., hours and days) for taking the calls and/or specify the current availability information through a communication channel (e.g., a phone line, a web page, a short message/SMS message, etc.).

In one embodiment, the price bids are used to compute a ranking indicator to sort and select the top candidates for the caller.

For example, after operation 2505 receives a telephone call at the first telephone number from a caller, operation 2507 selectively presents a second advertisement on behalf of an individual one of the plurality of providers, based at least partially on the price bids. In one embodiment, the second advertisement is specific for an individual provider. In one embodiment, the server may provide more or less advertisement/listing information depending on the preference of the caller. For example, the server may present a list of names of the providers, or present a list of names with brief descriptions, or present a list of names with discount offers from the corresponding providers, or a present a list of names with detailed advertisements of the corresponding providers.

In one embodiment, the advertisements for multiple providers are presented sequentially (e.g., as output of a speech synthesizer one after another, or as flash cards one after another, or as a scrolling list), or substantially simultaneously with different positions on a display (e.g., as a text listing, a web page, a WAP page, etc.).

After operation 2509 receives an indication from the caller to select the individual one of the plurality of providers responsive to the second advertisement, operation 2511 connects the telephone call to a telephone number of the individual one of the plurality of providers.

Optionally, operation 2513 determines whether the telephone call is a repeated telephone call from the caller to the individual one of the plurality of providers within a time period. In one embodiment, the provider is waived charges for leads (calls) from searchers/customers who have called recently (e.g., within an hour, a day, a week, etc.).

Operation 2517 bills the individual one of the plurality of providers according to a price bid of the individual one of the plurality of providers (e.g., only if the telephone is not a repeated telephone call from the caller to the individual one of the plurality of providers within the time period).

In one embodiment, after a telephone call is received at a second telephone number from a caller, the telephone call is connected to a first telephone number of a first entity who provides a price bid for a phone lead to be directed to the first telephone number of the first entity. The first entity is then billed for the telephone call connected to the first telephone number according to the price bid in response to a determination that the telephone is not a repeated telephone call from the caller to the first entity within a time period.

In one embodiment, after an input is received from the caller during the telephone call, the first telephone number of the first entity is determined based at least partially on the input from the caller. For example, the input from the caller can specify one or more criteria which can be used to select the first telephone number from a plurality of telephone numbers of different entities.

In one embodiment, options are displayed to the caller for the selection of one from the plurality of telephone numbers of different entities during the telephone call. For example, a list of advertisements/listings are transmitted to the caller for selection during the telephone call. The transmission may be through the same telephonic connection between the caller and the server or a separate data connection.

In one embodiment, one or more advertisements, including an advertisement of the first entity, are presented individually for one or more advertisers during the telephone call and prior to connecting, such that the caller has the opportunity to select one.

In one embodiment, prior to the telephone call, an advertisement including the second telephone number is presented on behalf of a plurality of entities as a whole on a media channel, such as in a web page, email, book, magazine, newspaper, television program, text message, multi-media message, instant message, or on a billboard, refrigerator magnet, etc.

In one embodiment, the second telephone number is presented in an advertisement on behalf of a plurality of entities. A plurality of price bids are received from the plurality of entities, which can be used to rank the advertisers in making individual presentations for the advertisers during the telephone call. After the call is successfully connected to the first telephone number of the first entity, the first entity is billed for the telephone call connected to the first telephone number according to the price bid, in response to the determination that the telephone is not a repeated telephone call from the caller to the first entity within the time period. In one embodiment, the time period is predetermined and in the order of hour, day, or week.

In one embodiment, the caller can specify an indication of a geographical area of interest to the caller so that the server can select the plurality of entities that service the geographical area of interest to the caller. For example, the caller can provide a zip code over the telephone connection to indicate the geographical area to the server.

In one embodiment, a geographical location of the caller from the telephone call is determined to determine a geographical area of interest to the caller. The geographical location of the caller can be determined based on an Automatic Number Identification (ANI) service, a cellular positioning system, or a satellite positioning system.

In one embodiment, the advertisement advertises a common service provided by a plurality of entities in a specific geographic area, such as Los Angeles.

In one embodiment, information, such as brief description, discount information, qualification summary, etc., is received from the first entity and presented to the caller during the telephone call on behalf of the first entity. The caller can provide a selection indication in response to receiving such information.

In one embodiment, a search request is received from the caller during the telephone call and before the telephone call is connected to the first telephone number. After a search is performed according to the search request, the search result is selectively presented to the caller. When the user selects an item in the search result which corresponds to the first telephone number, the telephone call is connected to the first telephone number. In one embodiment, the search result is selectively presented on behalf of the first entity based at least partially on the price bid.

In one embodiment, the telephone call is connected to the first telephone number without revealing the first telephone number to the caller. For example, the server makes a separate phone call to the first telephone number and then joins the call from the caller with the separate phone call to connect the caller and the first entity. Alternatively, the first telephone number can be provided to the caller during the phone call so that the caller may avoid calling the second telephone number to reach the first entity.

Figure 26:
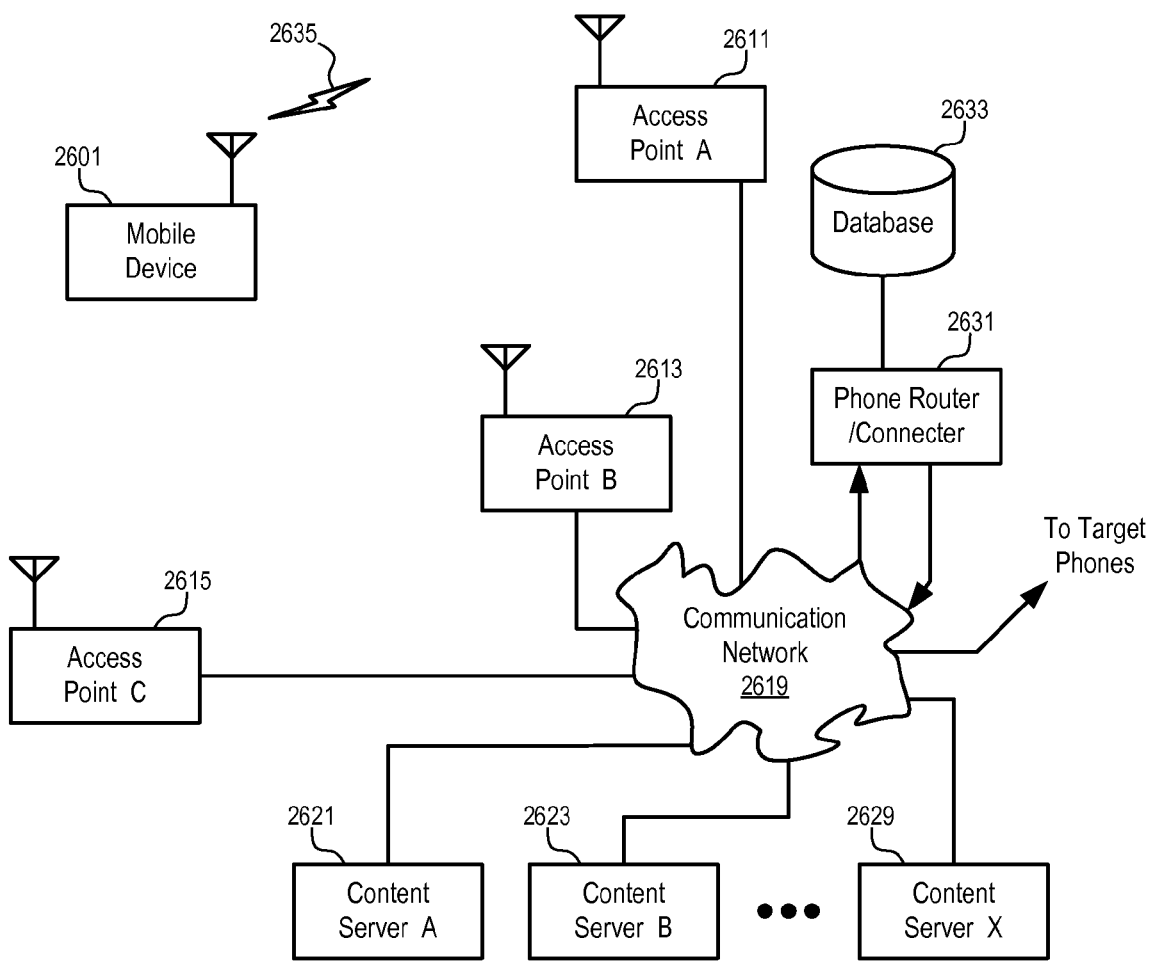
FIG. 26 shows a diagram of a system to make and track phone connections from a mobile device according to one embodiment of the present invention.

FIG. 26 shows a diagram of a system to make and track phone connections from a mobile device according to one embodiment of the present invention.

In FIG. 26, a mobile device (2601) accesses content server A (2621), content server B (2623), content server X (2629), etc., through a wireless link (2635) to a access point, such as access point A (2611), access point B (2613), and access point C (2615). In general, the access points may be of different types. For example, the access point may be a cellular base station, an access point for wireless local area network (e.g., a WiFi access point), an access point for wireless personal area network (e.g., a Bluetooth access point), etc. The access point connects the mobile device to the content servers through a communication network (2619), which may include the Internet, an intranet, a local area network, a public switched telephone network (PSTN), private communication networks, etc.

In one embodiment, the content servers provide encoded target phone numbers, which when dialed connect the mobile device to the phone router/connecter (2631) which used the database (2633) to decode the encoded information and/or store the information about the phone call in the database (2633). The router/connecter (2631) further connects the mobile device to the target phones. Alternatively, the router/connecter (2631) may dial phone calls to the mobile device and the corresponding target phone and then join/bridge the phone calls to connect the mobile device and the target phone.

In one embodiment of the present invention, location-dependent content information is delivered from a content server to the mobile device. The user may enter the location manually (e.g., through text input or voice input which is processed through a speech recognition system). The content information may be presented on a display screen or using an audio channel by playing prompts or audio files or through a text to speech system.

Alternatively, the location of the mobile device may be determined automatically, which is then used to determine the location-dependent content information. For example, the location of the mobile device may be determined through a Global Positioning System (GPS) receiver that is connected to, or built within, the mobile device.

A location of a cellular phone can also be determined using a method known as Time Difference of Arrival (TDOA) in which the reception times of a cellular signal from a mobile station are measured at several base stations to determine the position of the cellular phone. Alternatively, a method known as Advanced Forward Link Trilateration (AFLT), or Enhanced Observed Time Difference (EOTD), can be used, which measures the reception times of cellular signals from several base stations to the cellular phone. Alternatively, the cellular site in which the mobile device can communicate to a based station can be used to determine a rough position of the cellular phone. In general, any method used by a cellular phone provider to get location information (e.g., for emergency service) can be used.

An access point for a wireless local area network or a wireless personal area network typically has a small coverage area. Based on the location of the access point, location information (e.g., the city, or more precise location information, such as latitude and longitude) can be obtained.

Further, ANI can also be used to determine the location information. Although the location information determined from ANI may not represent a correct position of a mobile device, content information about the location determined from ANI may still be of interest to the user.

In one embodiment of the present invention, when the user performs a search for information which may be location dependent, the location automatically determined for the mobile device is used with the search request. For example, when the user search for "hotels" without specifying a location using an SMS-based search, the city in which the mobile device is located is determined; and a pay-per-call list of hotels in the city is sent via SMS to the mobile device.

In one example, the user may search for "dentists" in a custom client application; and a custom server application provides a pay-per-call list of "dentists" close to the current position of the mobile device.

In one example, the user may search in a web page or a WAP page for a particular subject. The return results include one or more pay-per-call advertisements to be presented in a browser running in the mobile device.

In one embodiment of the present invention, certain content information is automatically channeled into the mobile device when the mobile device enters into a wireless access zone. For example, when the mobile device enters into a commercial district, pay-per-call lists of various nearby points of interest, such as hotels, movie theaters, restaurants, etc., can be automatically presented on the mobile device, according to user preferences.

In one embodiment of the present invention, a user may search for particular types of experts, businesses, institutions, persons, etc. When the user is interested in calling one selected entity (e.g., an expert, a doctor, a restaurant), the mobile device can automatically dial the encoded phone number of the entity without the user manually dialing the number; and the phone router/connecter decodes the information and connects the mobile device to the phone of the selected entity. Alternatively, the phone number of the mobile device may be determined (e.g., through ANI, or user input, or user preference setting); and the phone connector connects phone calls to both the mobile device and the phone of the selected entity to connect the user to the selected entity. In such a process, the identity of the mobile device may be kept anonymous from the selected entity; and/or the identity of the selected entity may be kept anonymous from the user of the mobile device.

Figure 27:
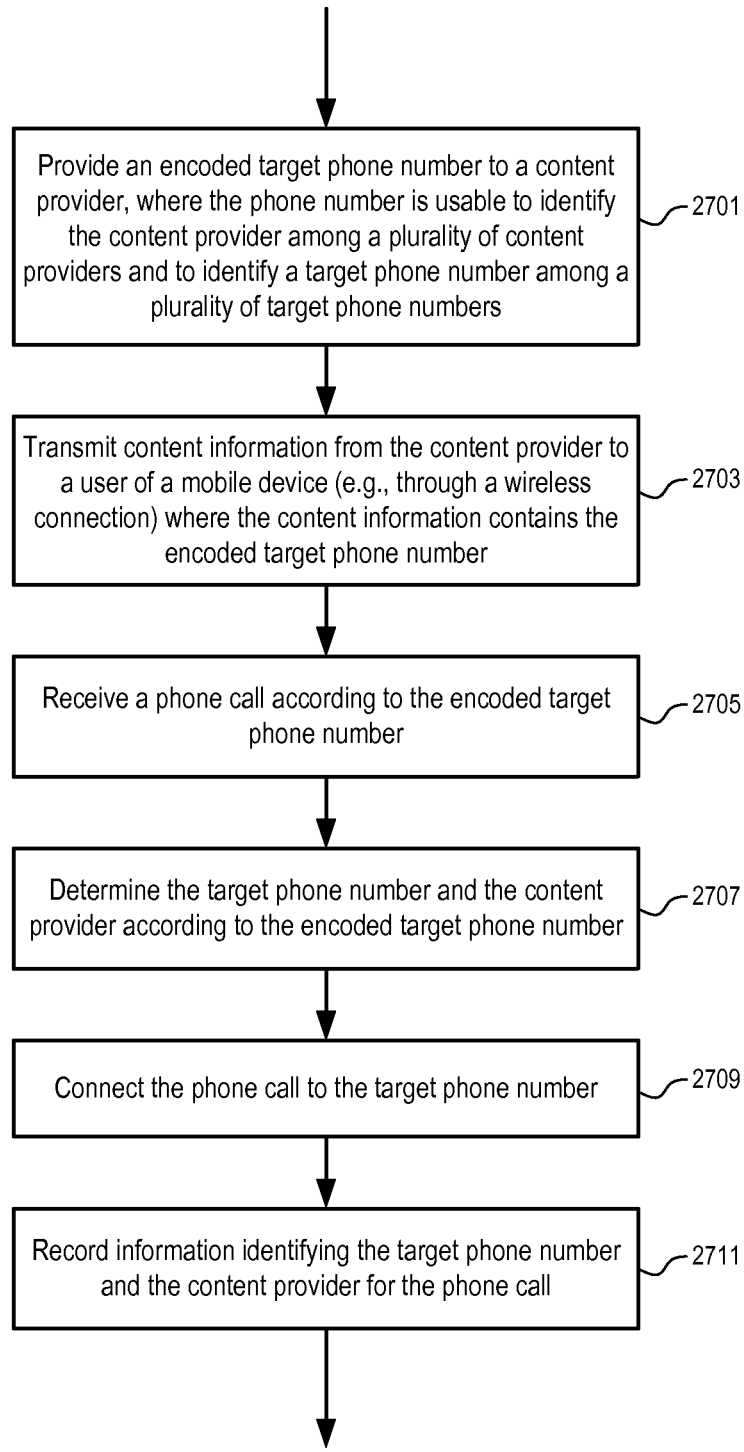
FIGS. 27-28 show flow diagrams of making and tracking phone connections according to embodiments of the present invention.
Figure 28:
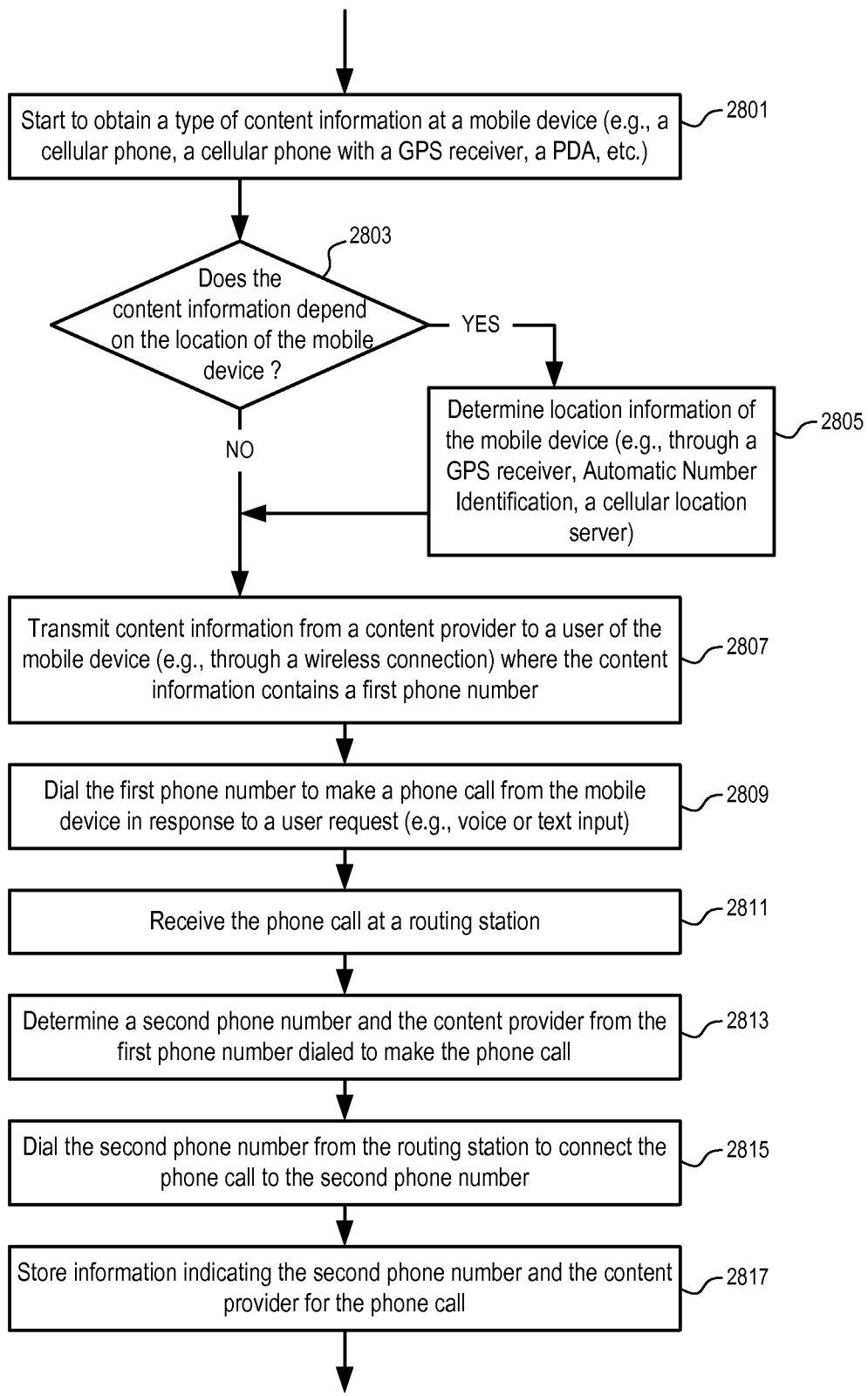

FIGS. 27-28 show flow diagrams of making and tracking phone connections according to embodiments of the present invention.

In FIG. 27, operation 2701 provides an encoded target phone number to a content provider, where the phone number is usable to identify the content provider among a plurality of content providers and to identify a target phone number among a plurality of target phone numbers.

Operation 2703 transmits content information from the content provider to a user of a mobile device (e.g., through a wireless connection) where the content information contains the encoded target phone number. The content information may include, pay-per-call advertisements, lists of experts, lists of points of interests, etc.

After operation 2705 receives a phone call according to the encoded target phone number, operation 2707 determines the target phone number and the content provider according to the encoded target phone number; and operation 2709 connect the phone call to the target phone number.

Operation 2711 records information identifying the target phone number and the content provider for the phone call. The recorded information can be used to bill for advertisements and/or for making phone connections, provide credit/compensation for the content provider, and provide information for fine-tuning advertisement operations.

In FIG. 28, operation 2801 starts to obtain a type of content information at a mobile device (e.g., a cellular phone, a cellular phone with a GPS receiver, a PDA, etc.)

If operation 2803 determines the content information depends on the location of the mobile device, operation 2805 determines location information of the mobile device (e.g., through a GPS receiver, Automatic Number Identification, a cellular location server). The location may be determined at the mobile station or determined at a server station.

Operation 2807 transmits content information from a content provider to a user of the mobile device (e.g., through a wireless connection) where the content information contains a first phone number.

Operation 2809 dials the first phone number to make a phone call from the mobile device in response to a user request (e.g., voice or text input or click). In one embodiment the mobile device dials the first phone number without the user manually dialing the individual digits of the first phone number.

After operation 2811 receives the phone call at a routing station, operation 2813 determines a second phone number and the content provider from the first phone number dialed to make the phone call. Operation 2815 dials the second phone number from the routing station to connect the phone call to the second phone number.

Operation 2817 stores information indicating the second phone number and the content provider for the phone call. The second phone number can be used to bill for the connection; and the content provider can be credited/compensated for providing the first phone number to the mobile device.

Figure 29:
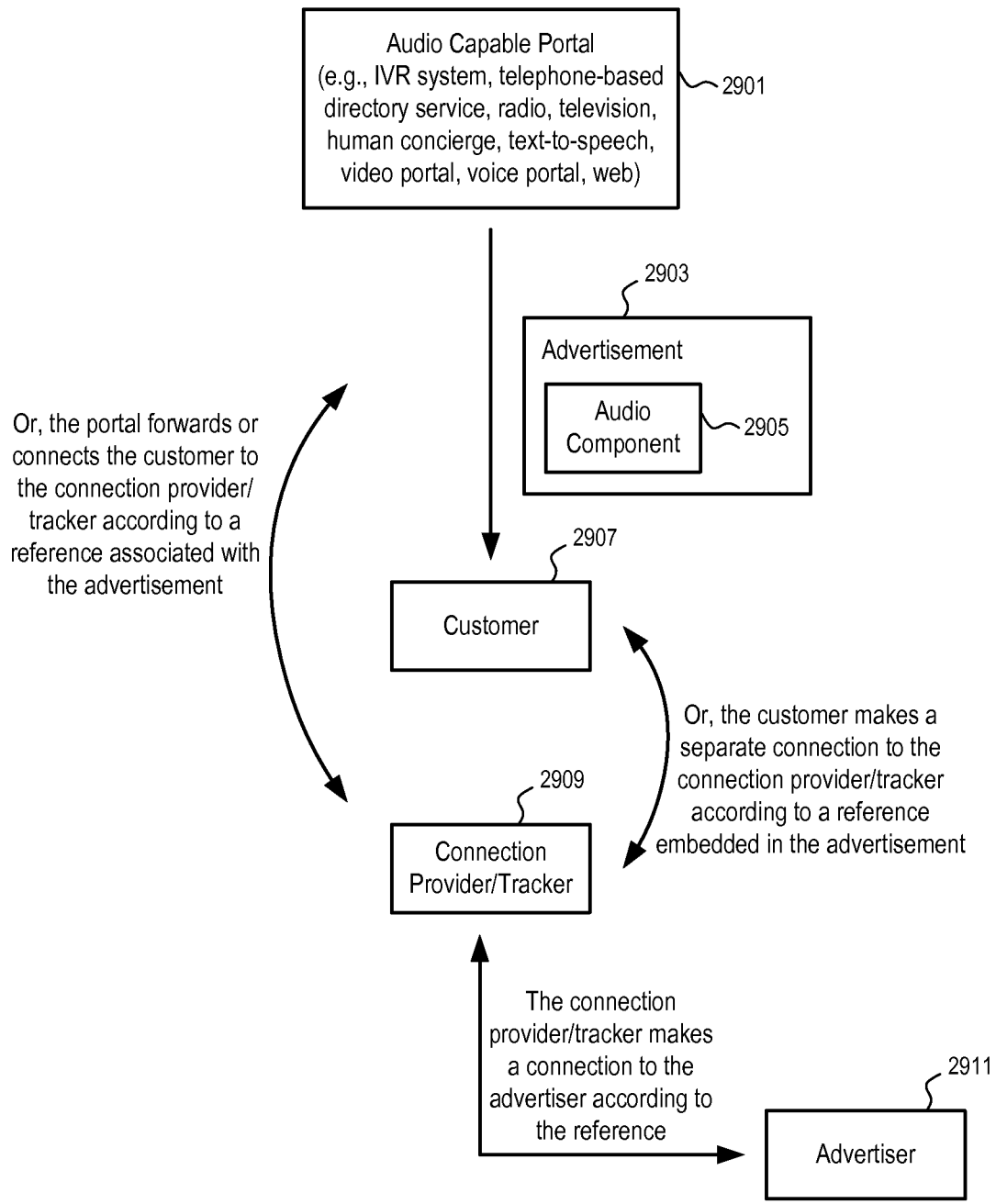
FIG. 29 illustrates ways to provide advertisements via an audio capable portal according to embodiments of the present invention.

FIG. 29 illustrates ways to provide advertisements via an audio capable portal according to embodiments of the present invention. In FIG. 29, an audio capable portal (2901) is used to provide an advertisement (2903) to a customer (2907). The audio capable portal (2901) can be an interactive voice response (IVR) system, a telephone based directory service such as a 411 telephone directory, a radio broadcasting system, a television system, a human concierge, a text-to-speech synthesizer, a video portal, a voice portal, a web site, etc. In one embodiment, the audio capable portal (2901) includes an interactive voice response (IVR) tree that can be used to decide which advertisers to present. For example, after the customer makes a VoIP-based call to a portal, the IVR system may prompt the customer to press 1 for hotels, 2 for restaurants, etc. After the customer specifies the category of products or services, the system can perform a search of advertisements that are relevant to the interest of the customer. In one embodiment, the IVR system can further collect information such as price range, sub-categories, keywords, and/or the geographic area of interest (e.g., via the customer specifying a zip code or selecting a city or metropolitan region). In one embodiment, a human concierge can further assist the customer in providing the answers to the IVR tree.

In one embodiment, the advertisement (2903) includes at least an audio component (2905). In another embodiment, the advertisement (2903) is primarily a voice or audio message. The advertisement (2903) may also include a visual component, such as a text message, a video image, an animation, a still image, etc.

In one embodiment, the advertisement (2903) includes a reference that can be used to ask the connection provider/tracker (2909) to provide a connection between the customer (2907) and the advertiser (2911) of the advertisement (2903).

For example, the reference can be a telephone number of the connection provider/tracker (2909). The telephone number may or may not have an extension. The telephone number may be presented in the audio component and/or the video component of the advertisement. The telephone number is associated with the advertiser (2911) such that when the customer calls the connection provider/tracker (2909) at the telephone number given in the advertisement (2903), the connection provider/tracker (2909) can determine the phone number of the advertiser (2911) based on the telephone number that the customer used to call the connection provider/tracker (2909). The connection provider/tracker (2909) can then connect the call to the advertiser (2911), providing a communication lead to the advertiser (2911). In one embodiment, the advertiser (2911) pays for the advertisement based on the communication leads received from the connection provider/tracker. For example, the advertisement can be charged for in a pay per call format, where the call represents a communication lead, such as a telephone call, or other types of calls for the establishment of real time communication connections.

Alternatively or in combination, the reference can include a SIP address for the initiation of VoIP calls to the connection provider/tracker (2909), or user names in an instant messaging system, or a reference to request a callback to the customer in relation with the advertisement, or a reference to request a dynamically assigned phone number for the advertisement. In one embodiment, multiple types of references can be provided; and the customer can choose one to request for a connection to the advertiser.

In one embodiment, the customer makes a separate connection to the provider/tracker (2909), in response to the advertisement, to request a connection with the advertiser (2911).

Alternatively, the customer (2907) may request the audio capable portal (2901) to arrange the connection. For example, in response to the advertisement, the customer may communicate a request to the audio capable portal (2901) via a voice command (e.g., "connect me to this advertiser") or an audio signal. For example, the customer (2907) can press the "#" key on the dial pad of a phone that is connected to the audio capable portal (2901) to generate the corresponding DTMF signal to indicate the request for a connect to the advertiser (2911). The customer (2907) may also implicitly request the connection by not providing a specific input within a period of time. For example, within a pre-determined period of time (e.g., 5 second), if the customer (2907) does not press the "*" key on the dial pad of the phone, it can be determined that the customer wants the connection to the advertiser (2911).

Alternatively, the customer (2907) may send the request via a button or link on a graphical user interface of a software phone (or a data enabled phone) that is used to connect to the audio capable portal.

In one embodiment, in response to the request from the customer, the audio capable portal (2901) connects the customer to the connection provider/tracker (2909) according to the reference associated with the advertisement. For example, the audio capable portal (2901) can forward the call from the customer (2907) to the connection provider/tracker (2909). Alternatively, the audio capable portal (2901) can make a separate call to the connection provider/tracker (2909) according to the reference and then bridge, conference, or join the calls to connect the customer (2907) to the connection provider/tracker (2909).

In one embodiment, the advertisements are presented as a "switch pitch." For example, the customer may ask for "Hilton Hotel" (e.g., in a directory assistance request). The system determines whether it has other advertisements in this same category (e.g., hotel), and if so, presents one or more of the advertisements selected from this category. For instance, the presentation may include an offer, such as: "Sheraton Hotels is offering a 20% discount this week. Would you like to be connected to them instead?"

In one embodiment, such advertisements are triggered by certain keywords detected in the conversation, such as "hotel." Alternatively or in combination, the advertisements can be selected according to category. For example, the customer may have pressed #3 to request directory assistance in the category of travel accommodations. In one embodiment, the voice request made by the customer and/or the response of a human concierge is converted into text via speech recognition; and based on the text, the system automatically determines the context of the conversation and selects one or more advertisements for presentation according to the determined context. In one embodiment, a number of advertisements are selected and presented to the human concierge (e.g., in a visual form on a display device in front of the human concierge); and the human concierge can then select one for presentation via the audio capable channel to the customer.

In one embodiment the advertisements are cross-sells. The system determines whether it has advertisements in a category related to the category of interest to the customer, and if so, presents one or more of the advertisements selected from the related category. For instance, if the customer asks for airlines, advertisements for rental cars can be selected for presentation. In one embodiment, the system determines the context of the conversation (e.g., based on text generated via speech recognition) and selects one or more related context for the selection of advertisements.

In one embodiment, the system automatically sets limits to the cross-selling or switch-pitch that may occur. For instance, if the customer asks for directory assistance in the category of "hotels," the system is configured not to play advertisements for a set of hotels that are not in the economic level indicated by the customer. The system can determine an economic level according to the explicit input from the user, or derived based on an example provided by the customer.

In one embodiment, the system can automatically exclude certain advertising partners. For example, if one audio capable portal has a relationship with Hilton Hotels, they may want to exclude advertisements for "Sheraton Hotels" from being played in their context when querying for advertisements from a database (e.g., a database maintained by a partner but not by the audio-capable portal). One or more filters can be applied when selecting from the advertisements that are received from the database as a query result.

In one embodiment, the system uses one or more pre-determined rules to select the advertisements based on one or more parameters derived specific from the context. The parameters may be explicitly specified by the customer (e.g., via an IVR tree), or implicitly derived from the communications received from the customer. For example, when the customer asks for a specific hotel, the system can implicitly derive the economic level based on the mentioned hotel (e.g., using a look up table that pre-categorize the economic level of known hotels); and the economic level determined based on the hotel can be applied to the selection of rental car advertisements in cross selling, or the selection of hotel advertisements in pitch switching.

In one embodiment, the advertisements are selected according to at least the pay per call price bids. For example, the system can sort the candidate list and select the advertisement that has the highest pay per call price bid. In one embodiment, the system can also consider the yield of advertisements in the past in making the selection. For example, a conversion rate, such as the ratio between a count of presentations made in a past period of time and a count of communication leads resulting from the presentations, can be used to evaluate the yield of the advertisements. Thus, if many consumers decide to connect to the advertiser in response to the advertisement, it would positively affect that advertisement's place in the rank order.

In one embodiment, the key factors used to rank the advertisements include the pay per call price bid and yield; and an overall assessment of "value" (e.g., the product of the conversion rate and the price bid, which indicates the expected return from presenting the advertisement) can be determined for the selection of an advertisement for presentation. Using such an approach of overall value assessment, the best advertisements (e.g., those that earn the audio-capable portal the most money) can be selected for presentation to the customers.

In one embodiment, the ranking system can also take into account yield on different audio-capable portals, or website, differently. For instance, a rental-car advertisement may have a very high yield on a travel-oriented audio-capable portal but a low yield on a dining-oriented portal. The system can automatically keep track of the yield rates of an advertisement in different contexts (e.g., different demand partners, different searching keywords, different search strategies, such as cross-selling or pitch-switching, etc.) and use the tracked information in determining which advertisement to present in individual context. For example, in one embodiment, the system tracks not only the demand partners who are responsible for delivering the advertisement but also the context of the presentation of the advertisement, such as the keywords used in a search which results in the selection of the advertisement for presentation, one or more keywords that describe the environment in which the advertisement is presented in (e.g., travel or dining oriented context), and/or the target of the directory assistance request. From the tracked information, the system can determine a conversion rate that is specific to a demand partner, a set of searching keywords, and/or a specific search strategy.

In FIG. 29, based on the reference that is used to establish the connection between the connection provider/tracker (2909) and the customer (2907), the connection provider/tracker (2909) counts the communication leads provided to the advertiser (2911); and the advertiser (2911) is charged for the advertisement based on the communication leads delivered.

In one embodiment, the audio capable portal (2901) receives the advertisement, together with the reference, from an advertisement provider via an application programming interface (API). For example, an audio advertisement can be transmitted to the audio capable portal (2901) in one of a number of formats, such as way, mp3, Ogg Vorbis, AC-3, MPEG-4, RealAudio, etc. The advertisement provider may be the same entity as the connection provider/tracker (2909). Alternatively, the advertisement provider and the connection provider/tracker (2909) can be separate, cooperative entities.

In one example, when the audio capable portal (2901) has an opportunity to present an advertisement to the customer (2907), the audio capable portal (2901) can query the connection provider/tracker (2909) via an API to obtain an advertisement according to one or more criteria. The API may be provided via a web service (e.g., via an HTTP protocol). For example, when the customer asks for a phone number of a plumber, an advertisement of a different plumber, or an advertisement related to plumbing, can be requested from the connection provider/tracker (2909) (e.g., via a HTTP request). The advertisement and the reference can be provided to the audio capable portal (2901) (e.g., via a HTTP response).

The reference can be presented to the customer (2907) by the audio capable portal (2901) as part of the advertisement (2903). Using the reference, the customer (2907) can directly ask the connection provider/tracker (2909) to provide a connection to the advertiser (2911). For example, a telephone number assigned to the advertiser (2911) can be read to the customer (2907) as part of the audio component (2905) of the advertisement (2903). Further, the audio capable portal (2901) can further offer to SMS or email the telephone number to the customer (2907).

In one embodiment, the audio capable portal (2901) may not present the reference to the customer (2907). The customer (2907) requests for the connection to the advertiser (2911) through the audio capable portal (2901). For example, within a time period of the advertisement, the customer (2907) can say "connect me" or press "#" key; and in response the audio capable portal (2901) arranges the connection to the advertiser (2911) using the reference.

In another embodiment, the audio capable portal (2901) presents the reference to the customer (2907) to allow the customer (2907) to make the request to the connection provider/tracker (2909) directly, or indirectly via the audio capable portal (2901), for a connection to the advertiser (2911).

In one embodiment, the advertisement may be presented according to a general category query. A customer may ask for a "florist in San Francisco" without supplying a particular name of a florist. In this case the system connects the end user with the highest-bidding florist in the desired geography.

In one embodiment, the audio capable portal (2901) receives the advertisement (2903) and then provides the advertisement to the customer (2907). For example, the audio capable portal (2901) can buffer the entire audio advertisement and then play the audio advertisement to the customer after the entire audio advertisement is received. In another example, the audio capable portal (2901) buffers a portion of the audio advertisement and then start to play the audio advertisement to the customer while receiving the remaining portion of the audio advertisement from the advertisement provider. Thus, there is a delay between receiving the audio advertisement from an advertisement provider and presenting the audio advertisement to the customer.

Figure 30:
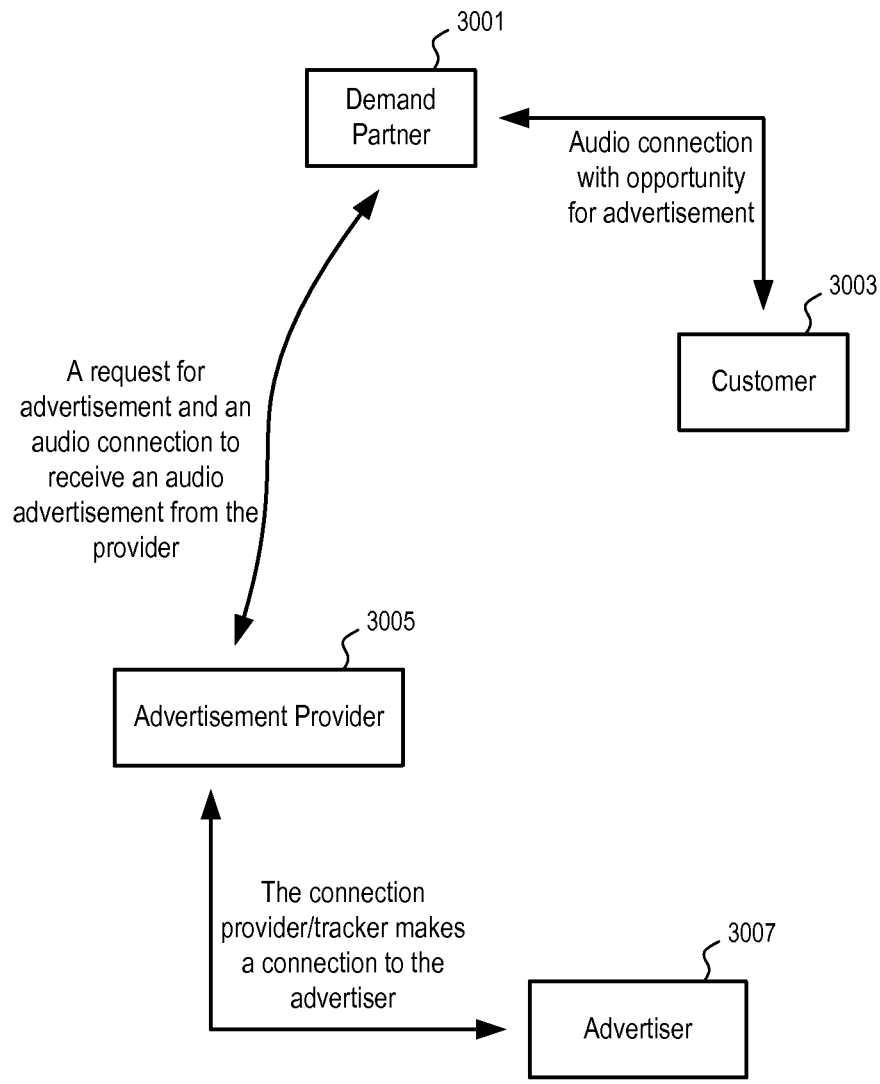
FIG. 30 illustrates a way to provide an advertisement and to connect a customer and an advertiser according to embodiments of the present invention.

In one embodiment, the audio capable portal may use a connection between the customer and the connection provider/tracker to facilitate the transmission of the audio advertisement to the customer, as illustrated in FIG. 30.

In general, when the type of the connection between the customer and the demand partner (3001) is compatible with the connection that may be requested by the customer to advertiser (3007), the process as illustrated in FIG. 30 can be used.

FIG. 30 illustrates a way to provide an advertisement and to connect a customer and an advertiser according to embodiments of the present invention. In FIG. 30, a demand partner (3001) establishes an audio connection with the customer (3003) and determines an opportunity for advertisement. When there is an opportunity to present an advertisement through the audio connection, which may also through text, data, video, etc., the demand partner (3001) connects the audio connection to the advertisement provider (3005).

For example, the demand partner (3001) can make a separate connection to the advertisement provider (3005) to request the advertisement and then bridge or conference the two connections to connection the advertisement provider (3005) and the customer (3003) for the presentation of the advertisement. The demand partner (3001) does not need to buffer the advertisement; and the advertisement can be transmitted from the advertisement provider to the customer in real time without delay.

In another example, the demand partner (3001) can forward (e.g., temporarily) the connection with the customer (3003) to the advertisement provider for the presentation of the advertisement. The demand partner (3001) can hand shake with the advertisement provider (3005) to forward the connection with a request for the advertisement that is formulated by the demand partner (e.g., at least one criterion for the search of the advertisement is specified by the demand partner). In one embodiment, advertisement provider (3005) can subsequently forward the connection back to the demand partner (3001) (e.g., according to the request from the customer).

For example, after the advertisement is presented to the customer and the customer does not wish to be further connected to the advertiser (3007), the advertisement provider (3005) can forward the connection back to the demand partner (3001) for further communications between the demand partner (3001) and the customer (3003). If the customer indicates the desire to talk to the advertiser (3007), in response to the advertisement, the advertisement provider (3005) can further connect the connection to the advertiser (3007) (e.g., through bridging, conferencing, forwarding, etc.) In one embodiment, after the conversation between the customer (3003) and the advertiser (3007), the advertisement provider (3005) can disconnect the advertiser (3007) and forward the connection with the customer (3003) back to the demand partner (3001).

In one embodiment, the demand partner (3001) and the advertisement provider (3005) are the same entity. For example, the advertisement provider (3005) may operate its own audio portal to seek advertisement opportunities over audio connections. Alternatively, the demand partner (3001) and the advertisement provider (3005) can be separate, cooperative entities.

In one embodiment according to FIG. 30, the advertisement provider (3005) does not have to assign a communication reference to the advertiser, or to the advertisement, for the customer to call (e.g., request a connection with) the advertiser.

For example, the advertisement provider (3005) can track the contribution of the demand partner (3001) when the demand partner (3001) forwards, conferences or bridges the audio connection established with the customer to the advertisement provider (3005). For example, the demand partner (3001) can initiate a VoIP-based connection with the advertisement provider (3005); and the identity of the demand partner can be identified based on the source address of the connection. For example, the demand partner (3001) can call a telephone number of the advertisement provider (3005) to make a phone connection; and, the demand partner can be identified via an Automatic Number Identification (ANI) service. The advertisement provider (3005) can keep track of the audio channels that are used to delivered the advertisements; and when a request for a connection with the advertiser (3007) is detected in an audio channel, the contact information of the advertiser of the advertisement delivered in that audio channel can be looked up to make the connection to the advertiser (3007).

Alternatively or in combination, a communication reference can also be assigned to the advertiser and/or the advertisement. The communication reference can be embedded in the advertisement such that after the communication connection between the advertisement provider and the customer (3003) is disconnected, the customer (3003) can still use the communication reference, which is presented with the advertisement, to request a connection with the advertiser (3007).

Figure 31:
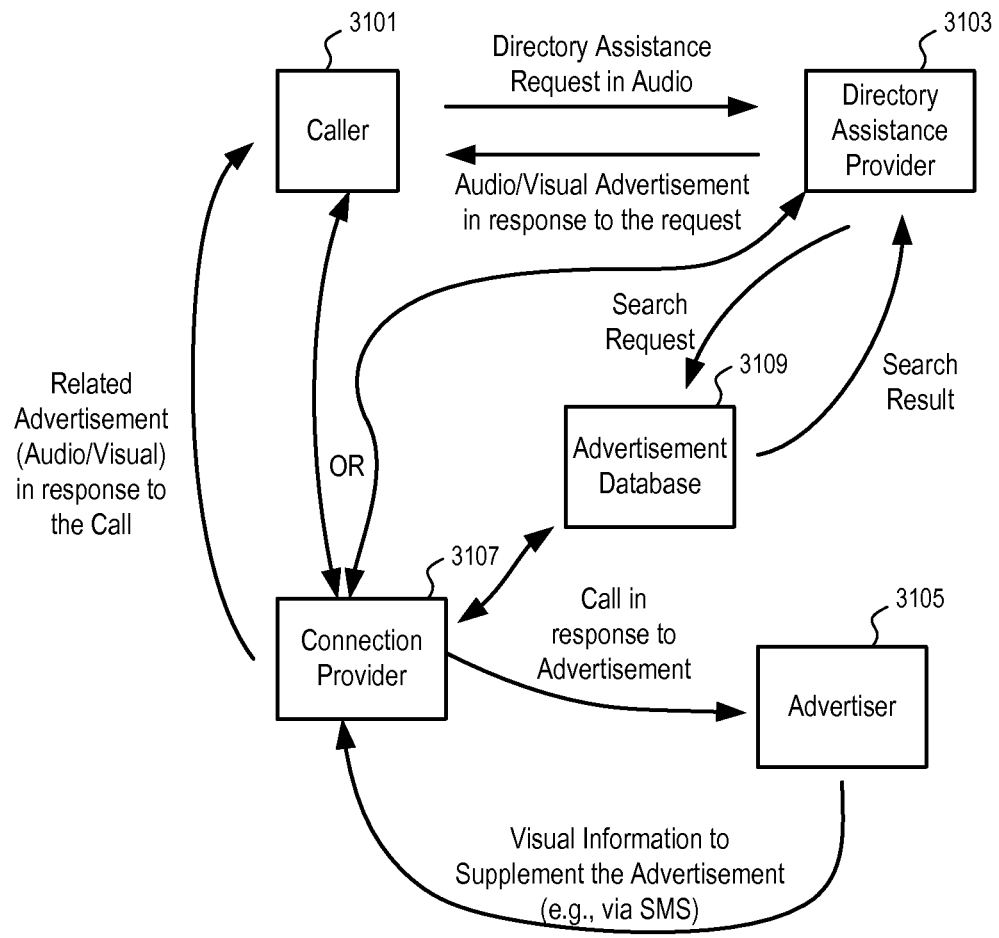
FIG. 31 illustrates an example of connecting a caller and an advertiser according to one embodiment.

FIG. 31 illustrates an example of connecting a caller and an advertiser according to one embodiment. In FIG. 31, a call is placed from a caller (3101) to a directory assistance provider (3103) (e.g., using a traditional telephone, a mobile phone, a cellular phone, a software-based phone, a USB phone, etc). The directory assistance request is made in an audio format (e.g., via voice communications over a telephone connection). The service of directory assistance can be provided via a live operator or via an interactive voice response system. Based on the service request received from the caller (e.g., received from a mobile device, such as a cell phone), an advertisement can be provided to the caller in an audio form and/or in a visual form.

For example, when the caller asks for a car rental company during a directory assistance call, directory assistance information (e.g., the telephone number of the car rental company) can be provided to the caller via playing an audio clip, synthesizing a voice message from a text message, reading a text message by a human operator, or sending as SMS message by the directory assistance provider (3103). The directory assistance provider may query the advertisement database (3109) via a search request and receive the advertisement as a search result. After the advertisement is received from the advertisement database (3109), the directory assistance provider (3109) presents the advertisement to the caller (3101) via the phone connection with the caller (3101). Alternatively, the directory assistance provider (3103) may buffer the data stream for the advertisement and start to presenting the advertisement when a sufficient portion of the advertisement is buffered. In one embodiment, the directory assistance provider (3103) can pre-fetch a set of advertisements (e.g., based on statistics of query requests, or categories of advertisements) so that the audio advertisements can be cached for enhanced performance. For example, the sound files for the audio advertisements and/or other data, such as bid price, yield potential, etc., can be cached for improved performance in reducing data traffic between the directory assistance provider (3103) and the advertisement database (3109) and for improved performance in reducing the time needed to select an advertisement for presentation.

Alternatively, to provide the advertisement to the caller (3101), the phone call from the caller (3101) can be further connected to the connection provider (3107). For example, the directory assistance provider (3103) can make a separate connection to the connection provider (3107) and bridge or conference the connection with the caller (3101) and the connection with the connection provider (3107) to allow the advertisement to be delivered in real time from the connection provider (3107) to the caller (3101). Alternatively, the directory assistance provider (3103) may forward the call from the caller (3101) to the connection provider (3107) to allow the connection provider (3107) to present the advertisement to the caller (3101) directly.

In one embodiment, the search request for the advertisement is submitted to the connection provider via the phone connection between the connection provider (3107) and the directory assistance provider (3103). For example, the search request may be by the presented directory assistance provider (3103) as a string of audio signals (e.g., in DTMF) using the phone connection between the connection provider (3107) and the directory assistance provider. For example, the connection provider may use an IVR system or a human operator to obtain the search request from the directory assistance provider (3103). In one embodiment, the phone connection between the connection provider (3107) and the directory assistance provider (3103) also supports data transmission (e.g., in a VoIP call, or a multi-media session via an instant messaging network, or a custom network connection); and the search request can be submitted to the connection provider (3107) via digital data communications.

In one embodiment, the connection provider (3107) selects an advertisement according to the search request received from the directory assistance provider (3103) and the presents the advertisement to the caller (3101) via the connection arranged by the directory assistance provider (3103).

In one embodiment, the directory assistance provider (3103) monitors the presentation of the advertisement to the caller (3101) and any responses from the caller (3101). If the directory assistance provider (3103) detects that the caller (3101) provides a response to the advertisement to request a connection to the advertiser (3105), the directory assistance provider (3103) may hand the call completely over to the connection provider and disconnect from the call. For example, the directory assistance provider (3103) may leave the phone conference with the caller and the connection provider and/or forward the call to the connection provider (3107) which then further connects the caller to the advertiser (3105). If the directory assistance provider (3103) determines that the caller (3101) does not want to connect to the advertiser (3105), the directory assistance provider (3103) may disconnect the connection provider (3107) from the caller (3101) and continue with the directory assistance service.

In one embodiment, after the caller (3101) is connected to the directory assistance provider (3103), the directory assistance provider (3103) conferences the connection provider (3107) into the call to allow the connection provider to receive a portion of the communications from the caller (3101). Based on the portion of the communications received from the caller (3101) (e.g., the directory assistance request submitted by the caller 3101), an advertisement can be selected for presentation to the caller (3101) (e.g., via the conference call with the caller), while the directory assistance provider (3103) works on the directory assistance request from the caller.

Thus, in one embodiment, the directory assistance provider (3103) can work on the directory assistance request, while an advertisement provider (not shown in FIG. 31 in general, but could be the same entity as the connection provider in one embodiment) who is connected to the connection provider (3107) can work in parallel on the directory assistance request to select a advertisement (e.g., to supplement the directory assistance). The advertisement provider may determine a context of the call and provide an advertisement that is relevant to the directory assistance call.

The directory assistance provider (3103) and the advertisement provider may communicate with each other (e.g., via the phone connection between the connection provider 3107 and the directory assistance provider 3103, or via a separate connect) to coordinate the advertisement services and the directory assistance services.

For example, the advertisement provider may monitor the conversation between the caller (3101) and the directory assistance provider (3103) to determine an opportunity for advertisement and select an appropriate advertisement based on the monitored conversation. The conversation may be monitored by a speech-recognition system, "listening" for keywords that will, in turn, help determine which advertisements should be played either on this call or subsequent interactions. When an advertisement is selected by the advertisement provider, the advertisement provider may signal to the directory assistance provider (3103) to request an arrangement for the presentation of the advertisement. When the directory assistance provider (3103) finds an appropriate time instance for the presentation the advertisement, the directory assistance provider (3103) then signals the advertisement provider to start presenting the advertisement.

For example, during a non-advertisement period, the advertisement provider is connected to the caller (3101) in a half-duplex mode, in which the advertisement provider can listen to what the caller says but not talk to the caller (3101). When the advertisement is ready for presentation, the directory assistance provider (3103) can switch the connection into a full-duplex mode for an advertisement period, during which the advertisement provider and the caller (3101) can communicate with each other in full-duplex.

Alternatively, the directory assistance provider (3103) may buffer the voice input from the caller and transmit the buffered voice input to the advertisement provider to allow the advertisement provider to select an advertisement. In one embodiment, the directory assistance provider (3103) converts the voice input from the caller into text via speech recognition and provide the text to the advertisement provider to search for a matching advertisement.

In one embodiment, the directory assistance provider (3103) maintains an audio connection with the connection provider (3107) to receive the audio advertisement; and a separate data channel to the advertisement database (3109) is used to request the audio advertisement. For example, the search request can be submitted to the advertisement database (3109) via a web site to request that an audio advertisement be presented in the audio channel between the connection provider (3107) and the directory assistance provider (3103). The directory assistance provider (3103) then mixes the audio signals received from the connection provider into the phone connection between the caller (3101) and the directory assistance provider (3103). The connection between the connection provider (3107) and the directory assistance provider (3103) may be at least partially packet switched and/or at least partially circuit switched.

In one embodiment, the advertisement is provided to the caller (3105) in an audio form. For example, in addition to the directory assistance, an advertisement, such as a pay per call advertisement, is delivered to the caller, in voice by a human operator or via an IVR system. The directory assistance provider (3103) sends a search request based on the directory assistance request. An advertisement database (3109) is searched to obtain one or more advertisements that satisfy the search request. In one embodiment, the advertisement is maintained by an entity separate from the directory assistance provider (3103); and the directory assistance provider (3103) uses an application programming interface (API) to invoke a method to perform the search. Alternatively or in combination, the directory assistance provider (3103) may search an advertisement database that is maintained by the directory assistance provider (3103). In one embodiment, an API returning the advertisement search results in an audio form is used. In one embodiment, the advertisement is retrieved in a text format (e.g., via an XML file) and converted into an audio format (e.g., via a data processing system using a text to speech technique, or via an operator).

In one embodiment, the audio advertisement is delivered to the caller (3101) in the phone connection in which the directory assistance request is received (e.g., before the answer to the directory assistance request is received). When the caller (3101) selects to call the advertiser, the directory assistance provider (3101) forwards the call to the connection provider (3107) who further connects the caller and the advertiser (3105) (e.g., by bridging the call from the caller and a separate call to the advertiser (3105). In one embodiment, the call is forwarded to the connection provider (3107) at a phone number (e.g., a traditional phone number with or without an extension, or a SIP address for VoIP) that is assigned to the advertiser. The connection provider (3107) identifies the advertiser based on the phone number at which the forwarded call is received. After the call is forwarded, the directory assistance provider (3101) is no longer on the phone line with the caller. Alternatively, the directory assistance provider (3101) may make a separate call to the connection provider, or to the advertiser (3105) directly, to connect the caller (3101) and the advertiser (3105).

In another embodiment, the advertisement is provided to the caller in a visual form. For example, an advertisement can be delivered to the caller via SMS, email, WAP, or web, or other types of communications for visual presentation to the caller. In one embodiment, the advertisement is delivered to the caller for visual presentation at the cell phone. In one embodiment, advertisements can be delivered in a combined visual and audio form. For example, a short audio advertisement can be delivered with a more detailed visual advertisement for an advertiser. For example, an audio advertisement can be delivered to the caller for one advertiser; and a visual advertisement can be delivered to the caller for another advertiser.

In one embodiment, a short version of the advertisement is presented in the audio communication channel in which the directory assistance request is received; and a full version of the advertisement is transmitted in a separate channel for visual presentation to the caller. In one embodiment, the visual version is transmitted after the audio version is presented (e.g., after the caller indicates that the caller is interest in the visual advertisement based on the audio advertisement.)

In one embodiment, the advertisement delivered to the caller is relevant to the directory assistance request received from the caller. For example, an advertisement of the car rental company requested by the caller or an advertisement of another car rental company can be presented. For example, an advertisement for a travel agency can be presented. Alternatively, a randomly selected advertisement may be delivered to the caller.

In one embodiment, an identity of the caller or the device used by the caller (e.g., the cell phone) is identified based on the connection the caller used to submit the directory assistance request. For example, based on the call received from the caller (3101), the telephone number of the cell phone of the caller can be identified. Based on the identified telephone number, a channel to deliver the advertisement for visual presentation can be determined.

For example, a short message service (SMS) message can be sent to the cell phone once the telephone number of the cell phone is determined. The SMS message may include the advertisement, or include a link to, or a URL of, a web/WAP page that contains the advertisement. Alternatively, the telephone number can be used to look up an email address of the caller from a preference database to send the advertisement via email. Other communication channels such as instant message, multimedia messaging service (MMS) message, etc., can also be used to deliver the advertisement.

In one embodiment, the advertisement is delivered for presentation on the same device that the caller (3101) used to make the directory assistance request in audio. Alternatively, the advertisement is delivered for presentation on a separate device according to a preference of the caller. For example, during the directory assistance call, the caller may be prompted to provide a communication reference at which the caller wants to receive the advertisement. For example, after receiving the directory assistance request, the caller may be presented with the option to receive an advertisement on the mobile phone via an SMS message, or at a different address (e.g., at an email address, at instant messaging user ID, etc.). The user may provide the answer via voice or via key pad input.

In one embodiment, the communication connection used for receiving the directory assistance request may support communications in a multi-media format. For example, a VoIP based telephony device may be used by the caller to request the directory assistance. The communication connection made by the VoIP based telephony device allows not only the audio communications between the caller (3101) and the directory assistance provider (3103) but also visual communications for the presentation of the advertisement.

In one embodiment, the advertisement can be presented as a text message, an image, a web/WAP page, a video stream, an audio clip, etc. In one embodiment, a custom application running on the device of the caller is used to receive and present the advertisement at least partially in a visual form and/or at least partially in an audio form.

In one embodiment, the advertisement is sent from the directory assistance provider (3103) during the directory assistance call. Alternatively, the advertisement may be sent at least partially after the directory assistance call (e.g., after the user selects a link in an SMS or email message). The advertisement may be sent via a real time communication, or a non-real time communication.

In one embodiment, the visual advertisement includes a communication reference which can be used to request a connection provider (3107) to provide a real time communication connection between the caller (3101) and the advertiser (3105) of the advertisement. Further, in one embodiment, the visual advertisement includes a communication reference which can be used by a connection provider (3107) to further deliver visual content to the caller (3101) (e.g., to deliver the visual content in the same way as the advertisement is delivered to the caller). In one embodiment, a communication reference can be used by the connection provider (3107) to identify both the caller (3101) and the advertiser (3105).

In one embodiment, when a call is placed as a response to a pay per call advertisement that is presented to the caller (3101) in a visual format (e.g., in an SMS message, an email, a WAP or web page) on a mobile device (e.g., a PDA, a cellular phone, a mobile phone, etc.) or other devices, additional visual information can be presented to the caller (3101).

For example, using the communication reference embedded in the advertisement, the caller (3101) can request the connection provider (3107) to make a real time communication connection with the advertiser (3105). The connection provider (3107) can identify the advertiser (3105) based on the communication reference used to make the request and connect the call to the advertiser accordingly.

The communication reference can be one of the phone numbers of the connection provider (3107), which is assigned to the advertiser. When the connection provider (3107) received a phone call at the phone number that is assigned to the advertiser, the connection provider (3107) can further connect the call to the advertiser. Alternatively, the communication reference may be one of the Session Initiation Protocol (SIP) addresses of the connection provider (3107), which can be used by the caller to call the connection provider (3107) via VoIP to request the phone connection to the advertiser. In one embodiment, the communication reference includes a link which when selected causes the connection provider to present an interface (e.g., a web page) to collect information for the connection provider (3107) to call back the caller (3101), call the advertiser (3105) separately, and join the separate connections to connect the caller (3101) and the advertiser (3105).

In one embodiment, the communication connection provided between the caller (3101) and the advertiser (3105) supports multi-media communications. For example, in addition to real time audio communications between the caller (3101) and the advertiser (3105), the communication connection can also support visual communications, such as text, image, video, shared application, common whiteboarding, file transfer/sharing, etc. Thus, the advertiser (3105) can use the communication connection to provide visual information that supplements the advertisement. For example, the advertiser (3105) can provide electronic coupons, special promotions, electronic brochures, etc. to the caller (3101).

In one embodiment, the communication connection provided between the caller (3101) and the advertiser (3105) supports audio communications. A separate communication channel is used to provide the visual information to supplement the advertisement. For example, the advertiser (3105) may provide the supplemental information via an SMS message, an email message, an instant message, a web/WAP page, and/or a message for presentation by a custom application program, etc.

In one embodiment, the advertisement includes multiple communication references which allow the caller (3101) to request the connection provider (3107) to provide multiple types of communication connects to the advertiser (3105) for multi-media communications (e.g., one for two-way real time audio, one for video conferencing, one for instant messaging, etc).

In one embodiment, when the connection provider (3107) makes a connection to the advertiser (3105), a communication reference is sent to the advertiser (3105) to allow the advertiser (3105) to send visual information to the caller.

For example, the connection provider (3107) may send an audio message to inform the advertiser about the communication reference, such as a phone number, a SIP address, an email address, an instant messaging user ID, a URL, a reference number, etc. The communication reference can be used to request the connection provider to communicate the supplied visual information to the caller (3101).

Alternatively or in combination, the connection provider (3107) can also provide the advertiser an email, an SMS message, an MMS message, an instant message, etc., to inform the advertiser about the communication reference for the caller (3101).

For example, the connection provider (3107) may provide an SMS message to the advertiser (3105) with a return address that is assigned to the caller (3101). When the advertiser replies to the SMS message to the return address, the connection provider (3107) receives the SMS message and delivers the message to the caller (3101).

For example, the connection provider (3107) may provide an email message to the advertiser (3105) with a return address that is assigned to the caller (3101). The advertiser (3105) can email the caller (3101) via the connection provider (3107) using the return address. In one embodiment, the return address is an email address of the connection provider (3107), which when receives an email message retransmits the message to the caller (3101) based on an association relation between the return address and the caller (3101). In one embodiment, the association relation is stored in a database of the connection provider (3107) and is generally kept in confidence from any third party.

For example, the connection provider (3107) may provide an email message to the advertiser (3105) with a link to a web page. The link includes a reference that can be used by the connection provider (3107) to identify the caller (and the advertiser in one embodiment). Using the web page gateway, the advertiser (3105) can submit visual information to the connection provider (3107) which can further transmit the information to the caller (3101). For example, the connection provider (3107) may transmit the visual information to the caller via an SMS message, an email, a web/WAP page, and/or a message to a custom application, etc.

In one embodiment, the connection provider (3107) can receive visual information from the advertiser (3105) in one format and provide the information to the caller (3101) in another format (e.g., based on the preference of the caller and/or the advertiser). For example, the connection provider may receive the visual information via a web gateway and transmit the visual information via an SMS message, an email, a web/WAP page, or a combination of these. For example, the connection provider may receive the visual information via an email and transmit the visual information to the caller via SMS.

In one embodiment, when the connection provider (3107) receives the request for a real time communication connection with the advertiser (3105), the connection provider (3107) automatically determines a communication reference to provide visual information to the caller (e.g., based on the phone number from which the connection provider receives the request, a SIP address of the caller, etc.).

In one embodiment, when the connection provider (3107) provides a web page to the caller (3101) to request for a call back phone number for a connection to the advertiser (3105), the connection provider (3107) also collects one or more communication references for the caller (3101) to receive visual communications from the connection provider (3107).

In one embodiment, the advertisement is for a paid phone call, such as computer help at $19.99 for 15 minutes. If the caller selects this advertisement, payment can be collected from the caller; and the caller is then subsequently connected to the available computer help advertiser who would be earning fees from the payment made by the caller.

Visual communications from the connection provider (3107) can be used by the connection provider to provide step-to-step help information to guide the caller through the process of connecting to the advertiser (3105). For example, the visual communications may further include a call graph to show the current status of the connection, the current availability of the advertiser, etc. Further, visual communications may include supplemental information forwarded from the advertiser.

In one embodiment, the caller (3101) requests the real time communication connection with the advertiser (3105) via audio communications (e.g., by call a telephone communication reference that is assigned to the advertiser (3105)). The connection provider (3107) prompts the caller for one or more other communication references at which the caller will accept visual communications. The caller may provide the visual communication references via voice input or key pad input.

In one embodiment, when the connection provider (3107) connects the caller (3101) to the advertiser (3105), the connection provider (3107) also provides to the advertiser (3105) the information on the types of different media communications the caller accepts or prefers. Thus, the advertiser (3105) may use appropriate multi-media communications to optimize the communication effort with the caller (3101).

In one embodiment, the connection provider (3107) may also presents to the caller (3101) the list of different media types that are acceptable to the advertiser (3105). Thus, the caller (3101) may prepare the communication device for optimized communication with the advertiser.

In one embodiment, the caller can also be presented with communication references to provide visual information to the advertiser (3105), in a way similar to that described above for the advertiser (3105) to provide supplemental information to the caller (3101).

In one embodiment, the communication reference provided to the advertiser (3105) by the connection provider (3107) is valid for sending visual information within a limited time period, such as within the time period of the real time communication connection between the caller (3101) and the advertiser (3105), or before the expiration of a pre-determined time period after the real time communication connection between the caller (3101) and the advertiser (3105). In one embodiment, after the limited time period, the visual information submitted from the advertiser (3105) to the connection provider (3107) is not forwarded to the caller (3101). In one embodiment, the time period is customizable by the caller (3101) during the request for the real time communication connection between the caller (3101) and the advertiser (3105).

In one embodiment, the connection provider (3107) may also send additional advertisement information to the caller (3101), in response to the caller (3101) requesting a real time communication connection with the advertiser (3105).

For example, the connection provider (3107) may provide supplemental information that is part of the advertisement. The supplemental information is designed to be delivered after the caller (3101) indicates that the caller (3101) is interested in the advertisement (e.g., by calling the communication reference embedded in the advertisement). Alternatively, a separate advertisement can be selected and delivered to the caller (3101) based on the indication that the caller (3101) is interested in the advertisement that the caller (3101) is calling.

In one embodiment, the directory assistance provider (3103) and connection provider (3107) are separate entities. Alternatively, the directory assistance provider (3103) and connection provider (3107) may be the same entity.

In one embodiment, the advertiser may answer live or answer with an IVR system; and the advertiser may send visual response (e.g., supplemental information, special promotion, electronic coupon, etc.) to the caller based on the telephone connection from the caller. The visual response can be sent via SMS, email, WAP or web pages via the connection provider. Alternatively, the connection provider may provide communication references to the advertiser (3105) to allow the advertiser (3105) to subsequently send visual responses to the caller (3101) without going through connection provider (3107).

Figure 32:
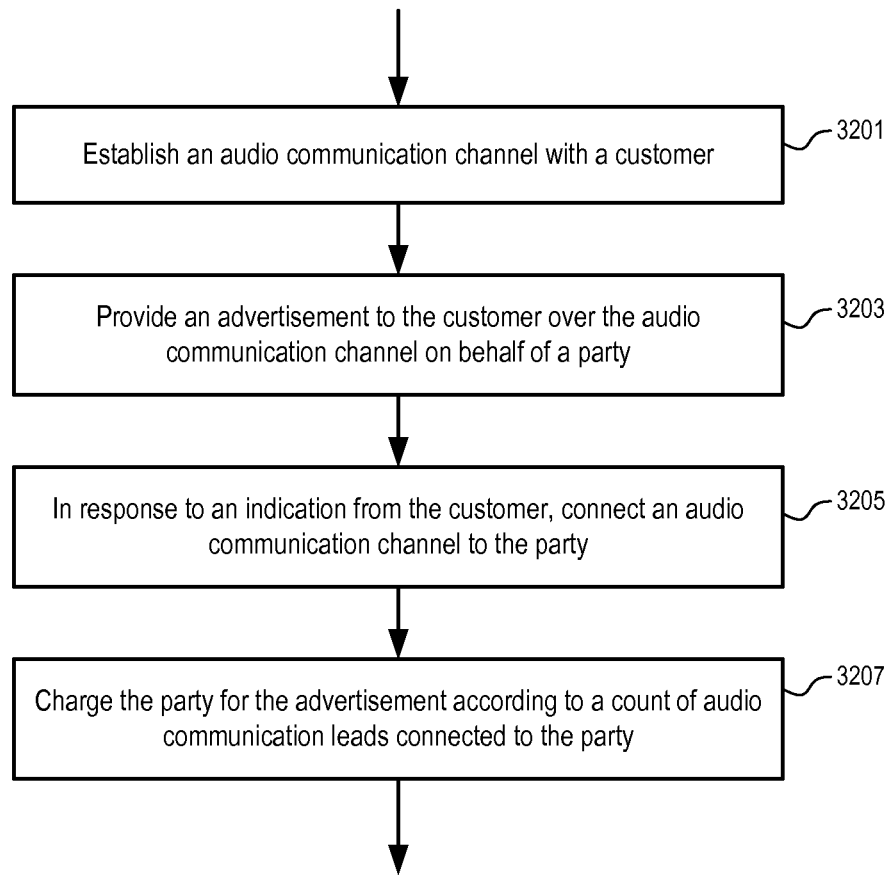
FIG. 32 illustrates a process to advertise according to one embodiment of the present invention.

FIG. 32 illustrates a process to advertise according to one embodiment of the present invention. In FIG. 32, an audio communication channel is established (3201) with a customer. The audio communication channel may be a two-way, full-duplex, real time communication channel, such as a telephone connection, or a one way communication channel, such as a radio broadcasting system or a television system. The audio communication channel may be established directly to an advertisement provider, or indirectly to an advertisement provider via a partner, such as a directory assistance service provider, a voice portal, etc.

In FIG. 32, an advertisement is provided (3203) to the customer over the audio communication channel on behalf of an advertising party (e.g., an advertiser). The advertisement may be presented entirely in an audio format, or partially in an audio format. For example, a pre-recorded audio clip can be played to presented the audio part of the advertisement. For example, a human operator may read a text version of the advertisement to present the audio advertisement. For example, a text-to-speech synthesizer can be used to convert a text version of the advertisement into the audio advertisement in real time for presentation.

In FIG. 32, an audio communication channel is connected (3205) to the advertising party in response to an indication from the customer. For example, the audio communication channel that is used to provide the audio advertisement can be forwarded, conferenced, or bridged to the advertising party to allow two-way, full-duplex, real time communications between the customer and the advertising party (e.g., an operator of the advertising party, or an agent or representative of the advertising party). For example, a separate audio communication channel can be established with the customer (e.g., via a callback to the customer) to connect the customer and the advertising party. For example, a voice message of the customer can be recorded and delivered to the advertising party.

Alternatively or in combination, the advertisement can be used to generate other types of communication leads, such as an email message from the customer to the advertiser, an instant message, a voice mail, an SMS message, etc. In one embodiment, the advertisement includes a reference such that communication leads resulting from the advertisement are received at a connection provider/tracker, which forwards or connects the communication leads to the advertiser.

In one embodiment, the advertising party is charged for the advertisement according to a count of audio communication leads connected to the advertising party. A communication lead can be a telephone call, or other types of calls for a communication connection, such as an initiation of the communication session (e.g., via SIP or other types of communication protocols). A communication lead may also be an email, a voice mail, an SMS message, etc.

Figure 33:
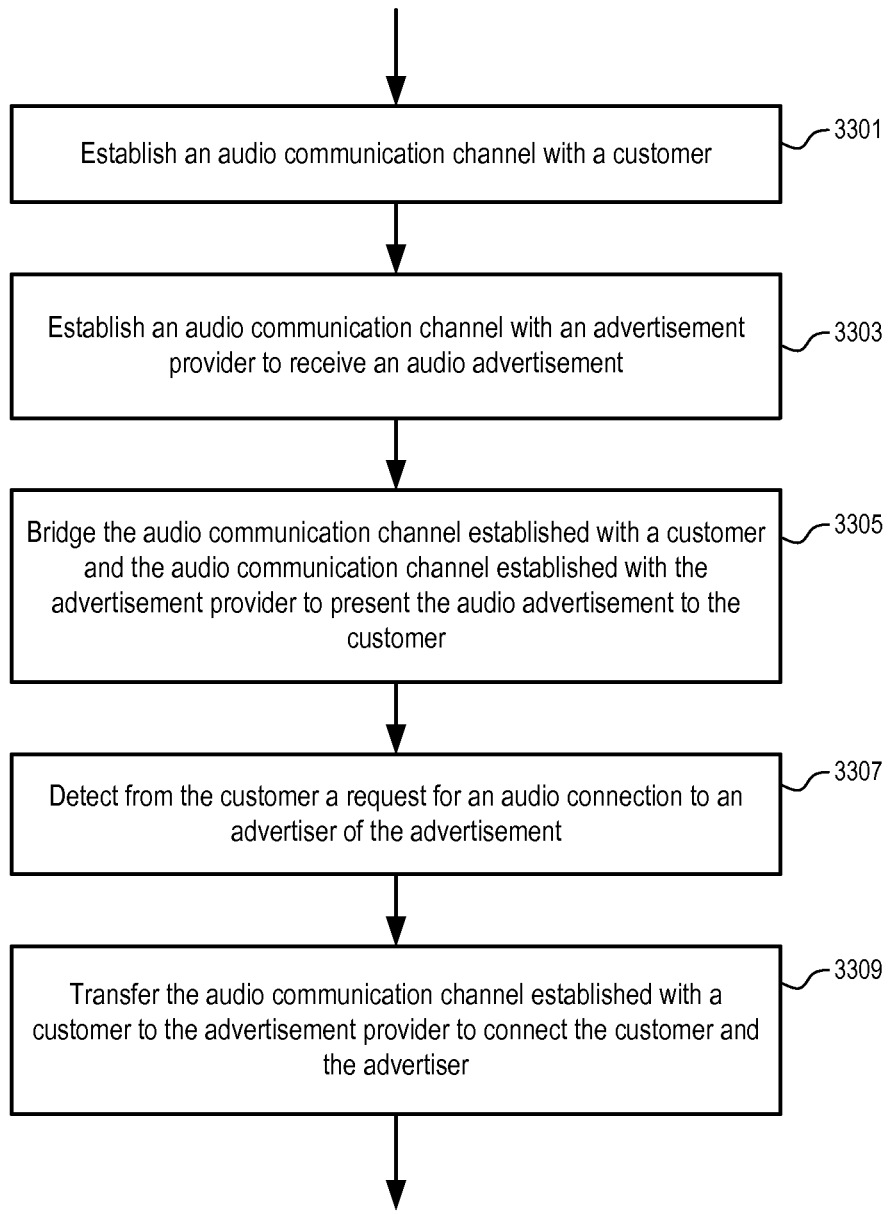
FIG. 33 illustrates another process to advertise according to one embodiment of the present invention.

FIG. 33 illustrates another process to advertise according to one embodiment of the present invention. In FIG. 33, an audio communication channel is established (3301) with a customer; and another audio communication channel is established (3303) with an advertisement provider to receive an audio advertisement. The audio communication channel established with a customer and the audio communication channel established with the advertisement provider are bridged (3305) to present the audio advertisement to the customer.

After a request for an audio connection to an advertiser of the advertisement is detected (3307) from the customer, the audio communication channel established with a customer is transferred (3309) to the advertisement provider to connect the customer and the advertiser. In one embodiment, if no request for an audio connection to the advertiser is received/determined as a response of the advertisement, the advertisement provider is then disconnected from the customer.

In one embodiment, an audio advertisement is generated by converting a text version of an advertisement into an audio message. For example, the content of the advertisement can be created and submitted by the advertiser, or by a copywriter on behalf of the advertiser (e.g., based on the information submitted from the advertiser).

For example, an existing pay-per-call advertisements can be read by a voice actor to create the corresponding audio advertisement. For example, the content of the advertisement can be submitted to the advertisement database in text; and a data processing system can be used to convert the text into an audio message via a text-to speech synthesizer; alternatively, a human can read the content on behalf of the advertiser to generate an audio recording.

In one embodiment, an advertiser can make an arrangement to record an audio advertisement in an audio files, which is then uploaded into the advertisement database (e.g., via a web server, a file server, or via email attachment or via a multi-media message, etc.). In one embodiment, the advertiser may make an audio connection with the system to allow the system to record a voice message over the audio connection as the audio advertisement (e.g., recording over a phone connection between the system and the advertiser).

FIG. 34 illustrates a user interface for the creation of an advertisement according to one embodiment of the present invention. In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer) when the audio advertisement is needed. In one embodiment, the machine synthesized audio recording are stored in the database for a period of time and deleted if not used after a predetermined period of time, or when the usage of the audio advertisement is lower than a threshold.

FIG. 34 illustrates an interface (3401) which allows the advertiser to describe an offer (or a switch pitch, or a cross sell, or some advertising content). The advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation— limited time," and "Call now and save 10%."

In one embodiment, a short audio advertisement is based on the concise marketing message (e.g., two sentences, each having a length limit, such as 35 characters). The concise marketing message can be read by a human to generated a recorded audio file for the short audio advertisement, or be converted into an audio message via a text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. The visual component of the advertisement can be sent to the customer via an SMS message (e.g., in response to a request from the customer), via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g., present an electronic coupon via an animation). For example, a Java applet can be downloaded into the browser of the user to facilitate VoIP-based phone communication and perform at least part of the text-to-speech operations to enable improved compression in transmitting audio advertisements.

In one embodiment, when an advertisement is presented to the user via a web, the short audio advertisement can also be included; and the audio advertisement is played automatically or after the user selects the advertisement.

In FIG. 34, the interface (3401) may be implemented as a web page. Alternatively, an advertisement may submit the advertising content via a custom client application, or via a message gateway (e.g., an instant message, an email, an SMS message, etc.).

In one embodiment, the advertisement is charged based on a count of communication leads (e.g., telephone calls, or communication sessions) generated from the advertisement. For example, the communications to the advertiser can be monitored to charge for the advertisement in a pay per call format.

Alternatively, the advertisement can be paid based on subscription, in which the advertiser subscribes to have their advertisements played in relevant environments. For example, a subscription can be offered to a movie studio for $10,000 per month to have a movie trailer audio advertisement played for the movie studio when customers are exploring a film category area in a media channel.

In one embodiment, the price for the subscription is based on past performance of the advertisement, or the past performance of advertisements in a particular categories; and the performance of the advertisement or advertisements can be determined based at least in part on the communication leads generated from the advertisement. In one embodiment, the subscription price can be changed periodically according to the most recent statistic data related to the performance of the advertisement.

In one embodiment, the subscription price is based on a range of anticipated performance of the advertisement. For example, the system may offer to deliver at least 100 calls, 200 calls, 300 calls, etc., for a subscription period (e.g., a week or a month); and an advertiser may select a level for 100 calls generated from the advertisement for subscription. The system then attempts to present advertisements in one or more media channels to generate at least 100 calls for the advertiser for the subscribed month. The subscription fee may be specified by the advertiser (e.g., as a price bid for the subscription), or specified by the system (e.g., based on a cost and revenue analysis).

In one embodiment, the actual subscription fee that is paid by the advertiser is determined after the subscription time period and based at least in part on the communication leads generated during the subscription period. For example, when the system failed to deliver the anticipated number of phone leads, the subscription fee may be reduced (e.g., according to a pre-determine schedule). Alternatively, the system may offer guaranteed performance of the subscription.

In one embodiment, the subscription fee for the advertisement is bundled with the subscription for the communication service. For example, a telephone number (e.g., a local phone number or a toll free number) may be assigned to the advertiser such that phone calls to the assigned phone number will be forwarded to a phone number of the advertiser, or connected directly to the advertiser's phone line. During the subscription period, the advertiser may also use the telephone number for other purposes other than advertising. Advertisements are then presented on behalf of the advertiser in a such way that the telephone calls generated in response to the advertisements are connected to the phone number of the advertiser, or connected directly to the advertiser's phone line. Thus, the subscription includes the advertising service and telecommunication service.

In one embodiment, the subscription fee is at least partially based upon the performance of the advertisement in terms of communication leads delivered. For example, a basic level of subscription may include telecommunication service without the advertising service; and a high level of subscription includes the telecommunication service and guaranteed delivery of an amount of communication leads generated through advertising on behalf of subscriber.

In one embodiment, the system may charge for the advertisements based on impression, in which the advertiser pays a price every time an advertisement is presented. The movie studio, for instance, may agree to pay $0.50 every time the movie trailer advertisement is played to a listener. In one embodiment, the price the advertiser pays for each presentation of the advertisement is based on the performance of the advertisement and/or the performance of advertisements the same category. For example, the conversion rate of the advertisement and an average pay per call bid (e.g., top 3 bids) for the advertisements of the same category can be used to compute a pay per presentation price for the advertisement of the movie studio; alternatively, the conversion rate of the advertisements of the same category can be used to determine the pay per presentation price. Alternatively, the pay per presentation price can be specified by the advertiser directly; and the system can convert the pay per presentation price into an equivalent pay per call price based on the conversion rate of the advertisement.

In one embodiment, the system may charge for the advertisements based on a proxy for calls. Using statistical methods, the system can estimate how many calls are connected between advertisers and end users. For example, the system may track the number of times a communication reference that is assigned to the advertiser is presented to a customer or being requested by a demand partner for presentation to the customer, to estimate the number of calls connected to the advertiser. Such a method is particularly useful if the exact count of calls is difficult to determine.

Figure 35:
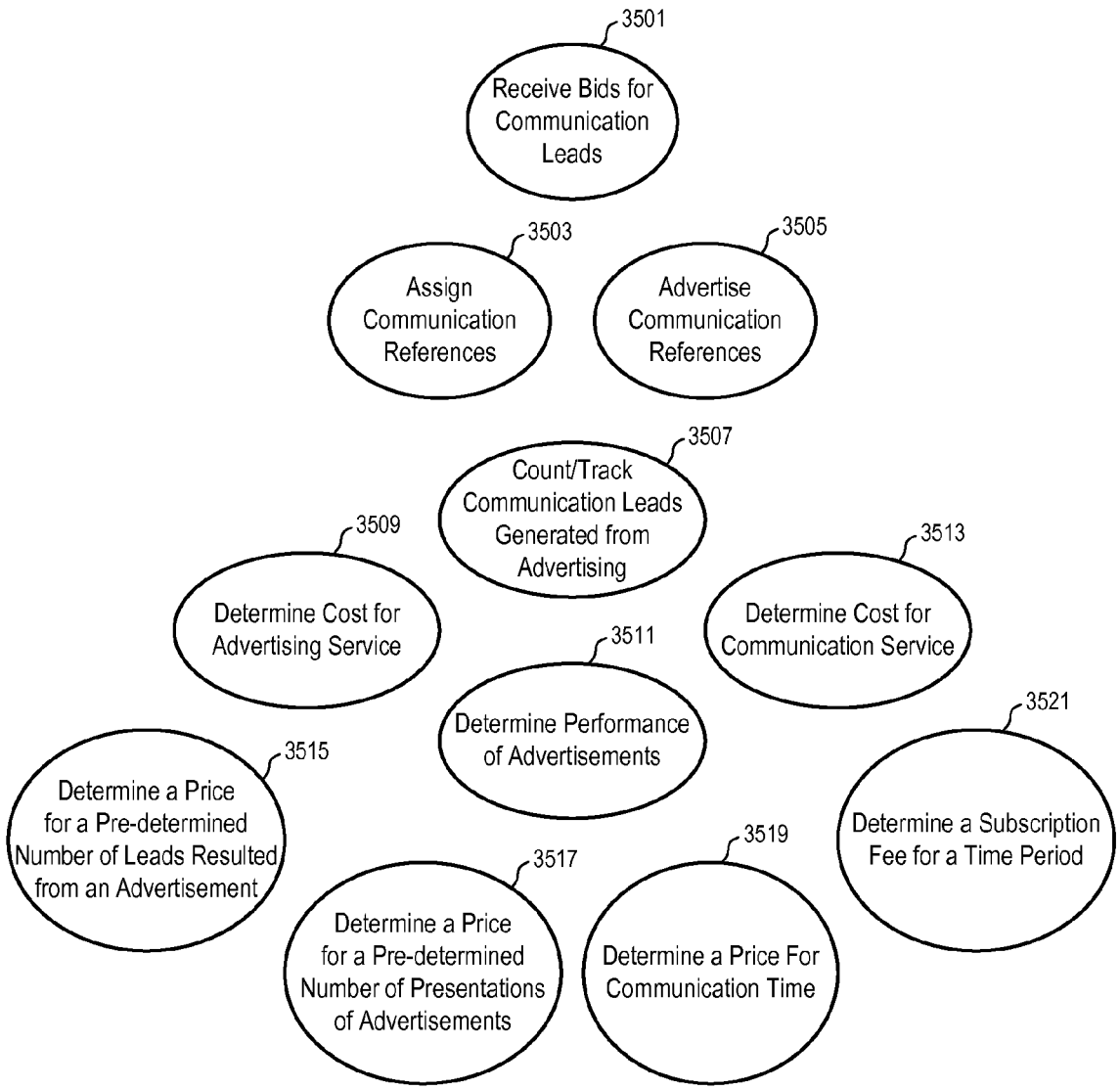
FIG. 35 illustrates advertising models according to embodiments of the present invention.

FIG. 35 illustrates advertising models according to embodiments of the present invention. In embodiment, the performance of advertisements are determined (3511) based on at least counting/tracking (3507) communication leads generated from advertising. The communication leads are counted/tracked (3507) through the use of the assigned communication references. The communication references are assigned (3503) such that the communication reference is associated with one or more parameters to be tracked and the communication reference used to request for a communication connection with an advertiser can be used to determine the parameters to be tracked. For example, the communication references can be telephone numbers with or without extensions, SIP URIs, instant messaging user identifiers, click-to-call references, etc. The communication references are advertised (3505) to customers. When the customers use the communication references to request real time communication connections with the advertisers, the communication leads can be identified as being associated with the parameters that are associated with the respective communication references.

In one embodiment, the advertisement is charged for on a pay per call basis, in which each communication lead generated from the advertisement is charged for according to a pre-determined price. In one embodiment, the pre-determined price can be specified and changed by the advertiser.

For example, the system may receive (3501) bids for communication leads and make advertisement presentations based at least partially on the price bids for communication leads. Thus, when the system delivers a communication lead to an advertiser, the system can charge the advertiser according to the current price bid specified by the advertiser. Alternatively, the system can also tracked the price bid for the advertisement presented; when the system delivers a communication lead to an advertiser, the system can charge the advertiser according to the price bid that is specified by the advertiser at a time when the system decides to present the advertisement for the advertiser.

In one embodiment, the system specifies a minimum fee for a delivered communication lead and allows advertiser to bid above but not below the minimum fee. In another embodiment, the system specifies the price for each communication lead without offering the advertiser an opportunity to bid for communication leads.

In one embodiment, the cost for advertising service is determined (3509); and the cost is used to determine a price for advertising service. The cost may include the cost for preparing advertisement, the cost for presenting advertisements on a media channel of a demand partner, and/or the cost for maintaining a media channel (e.g., a web site, a radio station, a billboard, etc.) for presenting advertisements, etc. The cost may or may not be proportional to the income generated from the advertisement. For example, one demand partner may charge for the advertisement for each presentation of an advertisement; one demand partner may charge for the advertisement for each customer's selection of a link presented in the advertisement; one demand partner may charge for a fixed amount for opportunities to present advertisements on a media channel; and one demand partner may charge for the advertisement as a percentage of what the advertiser pays for each communication lead.

Further, the cost for communication service (3513) can also be determined (3513) in determining a price for advertising service and/or communication service. The cost may include the cost for maintaining communication references such as local telephone numbers or toll free telephone numbers, the cost for maintaining communication equipments, the cost for Internet access for providing communication connection view Internet, and/or the cost for making communication connections between the customers and the advertisers. For example, a telephone carrier may charge for the communication based on a per minute fee when the system provides the connection through calling the advertiser and/or calling back the customer; the system may pay a subscription fee to a telephone carrier to use a pool of telephone numbers as communication references for the receiving, delivering and tracking of communication leads generated from advertisements; the system may pay a subscription fee for Internet access; the system may maintain at least a portion of telecommunication facility used for facilitating communication connections between the customers and the advertisers.

In one embodiment, based on the counting/tracking of the communication leads generated from advertising, the system may offer the advertising service with a bundled price, which may be determined by the system, or specified by the advertiser (e.g., as a price bid).

For example, the system can determine (3515) a price for a pre-determined number of communication leads resulted from an advertisement. As a volume bundle, the system can offer to generate multiple calls from advertising for the advertiser for a particular price; the advertiser can be charged at the time the offered package is purchased, or after the communication leads are delivered to the advertiser. The price for the volume bundle may be determined and offered by the system (e.g., based on an estimated advertising cost and communication cost), or be specified by the advertiser as a price bid. The price for the volume bundle can be divided by the number of communication leads included in the package and converted into an equivalent price per communication lead.

For example, the system can determine (3521) a subscription fee for a pre-determined time period (e.g., a week or a month of service). The subscription may include the advertising service and/or communication service. For example, the system may provide a telephone number to the advertiser, allowing the advertiser to receive phone calls at the telephone number and to further receive communication leads generated from advertising at the telephone number. The system may directly advertise the telephone number that is provided to the advertiser; alternatively, the system may use a separate communication reference to track the phone leads generated from advertising. The advertiser may limit the use of the telephone number to receiving phone leads generated from the advertising service provided by the system; alternatively, the advertiser may also give out the telephone number to receive other communications. In one embodiment, the subscription fee is determined based on the cost for advertising service, the cost for communication service, and/or the performance of advertisements (e.g., the performance of similar advertisements, or the past performance of the advertisement for the advertiser).

For example, in a subscription bundle, the advertising service is charged for as a premium over the basic communication service provided to the advertiser. A high subscription fee can be justified based on the performance of the advertisement (e.g., in terms of number of communication leads generated for the advertiser). In one embodiment, a subscription may include an offer (e.g., a promise or guarantee) to advertise for the advertiser and generate a stated level of communication leads for the advertiser in the time period. In one embodiment, the subscription fee is based on the actual level of communication leads generated from advertising. For example, when the delivered communication leads are less than a target level, the subscription fee is reduced to the price for the achieved level (e.g., according to a pre-determined schedule).

In one embodiment, the subscription is primarily for the advertising service; and the advertiser does not receive a communication reference for telecommunication service (or the advertiser reserves the assigned communication reference primarily for the receiving of communication leads generated from advertising). For example, communication services can be offered to promote the use of advertising services. In another embodiment, the subscription is primarily for the telecommunication service; and the advertisement service allows the system to charge a premium in additional to the telecommunication service. For example, advertising services can be offered to promote the use of communication services.

In one embodiment, a price for a pre-determined number of presentations of advertisements can be determined (3517) based on the tracking/counting of communication leads generated from advertising. For example, the system may offer to present an advertisement multiple times for a price which is justified based on the performance of the advertisement based on the communication leads generated from advertising. For example, based on the past performance of the advertisement, or the performance of similar advertisements, the price for a pre-determined number of presentations can be converted into an equivalent price for a pre-determined number of communication leads. Based on the conversion rate, a pay per communication lead price can also be converted into an equivalent pay per presentation price.

In one embodiment, the charge for advertising service is bundled with the charge for telecommunication time. For example, a price for communication time is determined (3519) for the advertising service and the communication service. Based on the performance of the advertising service, the telecommunication time for communication made via an assigned communication reference (e.g., a local or toll free telephone number) can be charged for at a high rate justified based on the value of the advertising service. For example, tiers of communication leads delivered to the advertiser can be used to promote the use of the communication service offered at tiers of prices for communication time. For example, the system can track the communication leads generated from advertising on behalf of the advertiser and charge the advertiser different rates for communication time for connections made via the advertisement and for other connections. For example, the system can classify telephone calls as calls in response to the advertisement and calls not generated from advertisements presented on behalf of the advertiser; and the advertiser is charged a higher rate for calls in response to the advertisement than for calls not generated from advertisements presented on behalf of the advertiser.

The advertisement charge can be bundled with the charge for communication time. For example, based on the statistic data related to the monitored durations of communications resulted from advertising, the average price per communication lead can be converted into the average additional fee for communication time, which can be used to determine the tiers of prices for communication time. The additional fee charged for communication time can also be converted into an equivalent pay per call price to promote the use of the communication service that is enhanced with the advertising service.

In one embodiment, the customer pays for the time communicating with the advertiser for the services received from the advertiser over the communication connection between the customer and the advertiser (e.g., for entertainment, information, or advice). The system charges the customer for the service rendered by the advertiser based on the duration of the communication connection and the charge the advertiser for the bundled communication service and advertising service. In one embodiment, the advertiser is charged a percentage of the fees the system collected from the customer for the advertiser. In one embodiment, the advertiser specifies a price bid for a communication lead which is separate from a rate for communication time provided to connect the advertiser and the customer. In one embodiment, an initial communication time between the customer and the advertiser is free of charge to the customer; the initial period can be used by the advertiser to convince the customer to purchase the service from the advertiser; after the customer indicates the acceptance of the offer by the advertiser, the communication time period chargeable to the customer starts. In one embodiment, the initial communication period is free of charge to the customer but not to the advertiser; and the system charges the advertiser for the communication time regardless of the fee status to the customer. Alternatively, the system may not charge both the customer and the advertiser for the initial communication period.

For example, the advertiser may charge the customer at a rate of $5.00 per minute, pay the system at a price of $1.00 per minute for the communication connection provided by the system, and pay the system for a price bid of $3.00 per communication lead generated from advertising. In this example, the advertiser may provide an initial free consultation period (e.g., up to 5 minutes), while the system can charge the advertiser $1.00 per minute even during the consultation period. Alternatively, for example, the advertiser may charge the customer at a rate of $5.00 per minute and pay the system for the communication service and advertising service at a bundled price of 25% ($1.25 per minute) of what the customer is charged.

Figure 36:
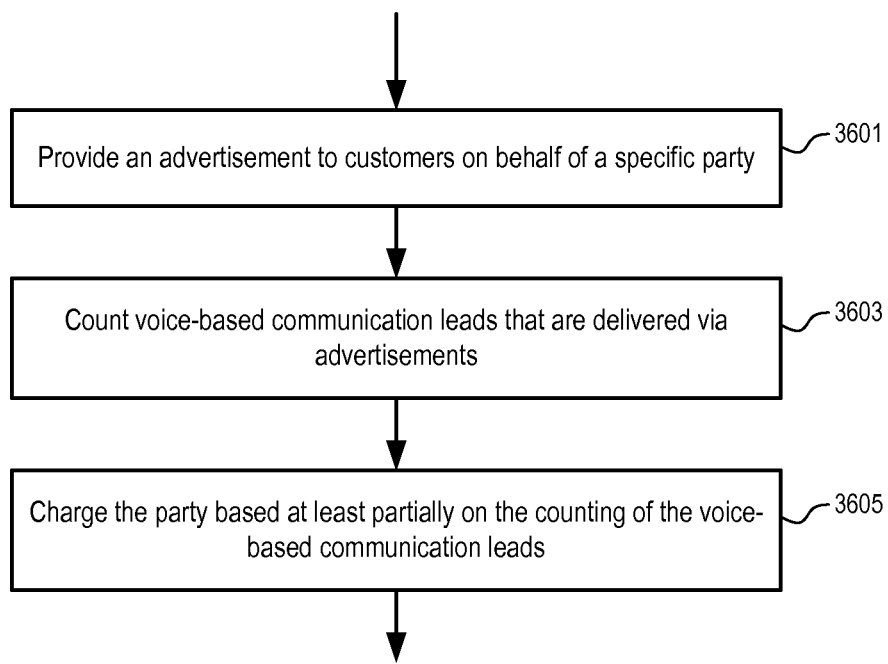
FIG. 36 shows an advertising method according to one embodiment of the present invention.

FIG. 36 shows an advertising method according to one embodiment of the present invention. In FIG. 36, an advertisement is provided (3601) to customers on behalf of a specific party. Voice-based communication leads that are delivered via advertisements are counted (3603). The specific party is charged (3605) based at least partially on the counting of the voice-based communication leads.

In one embodiment, a communication reference is assigned to the specific party; and voice-based communication leads are delivered to the specific party via the communication reference, which may be a phone number that is toll free to callers for calls initiated within a region specified by the specific party. In one embodiment, the advertisement includes the communication reference.

Alternatively, the advertisement includes a separate communication reference; and a communication lead received via the separate communication reference is delivered to the specific party at the communication reference assigned to the specific party. In one embodiment, to count the voice-based communication leads, voice-based communication leads generated from the advertisement are tracked via the separate communication reference. The separate communication reference can be a phone number without an extension, a phone number with an extension, a uniform resource identifier, or a click-to-call reference.

In one embodiment, counting the voice-based communication leads is based on a proxy event of a voice communication from a customer.

In one embodiment, the specific party is charged a price specified by the party, in response to each communication lead delivered to the party as a result of the advertisement.

Alternatively, the specific party can be charged a subscription fee for a pre-determined time period, where the subscription fee is determined based on at least partially on the counting of the communication leads generated from the advertisement. In one embodiment, the subscription fee is associated with an offer to deliver a pre-determined number of communication leads to the specific party via advertising within the time period. For example, the subscription fee can be determined based on an estimate of cost for presenting the advertisement and an estimate of cost for facilitating communications resulted from the advertisement, according to the counting of communication leads.

In one embodiment, the specific party is charged a price for a pre-determined number of communication leads delivered to the party via the advertisement, or a price for a pre-determined number of presentations of the advertisement, and/or a price for a period of communication time.

In one embodiment, the advertising charge can also be bundle with other services, such offering a platform for online marketplace, web services, Internet access, etc.

Figure 37:
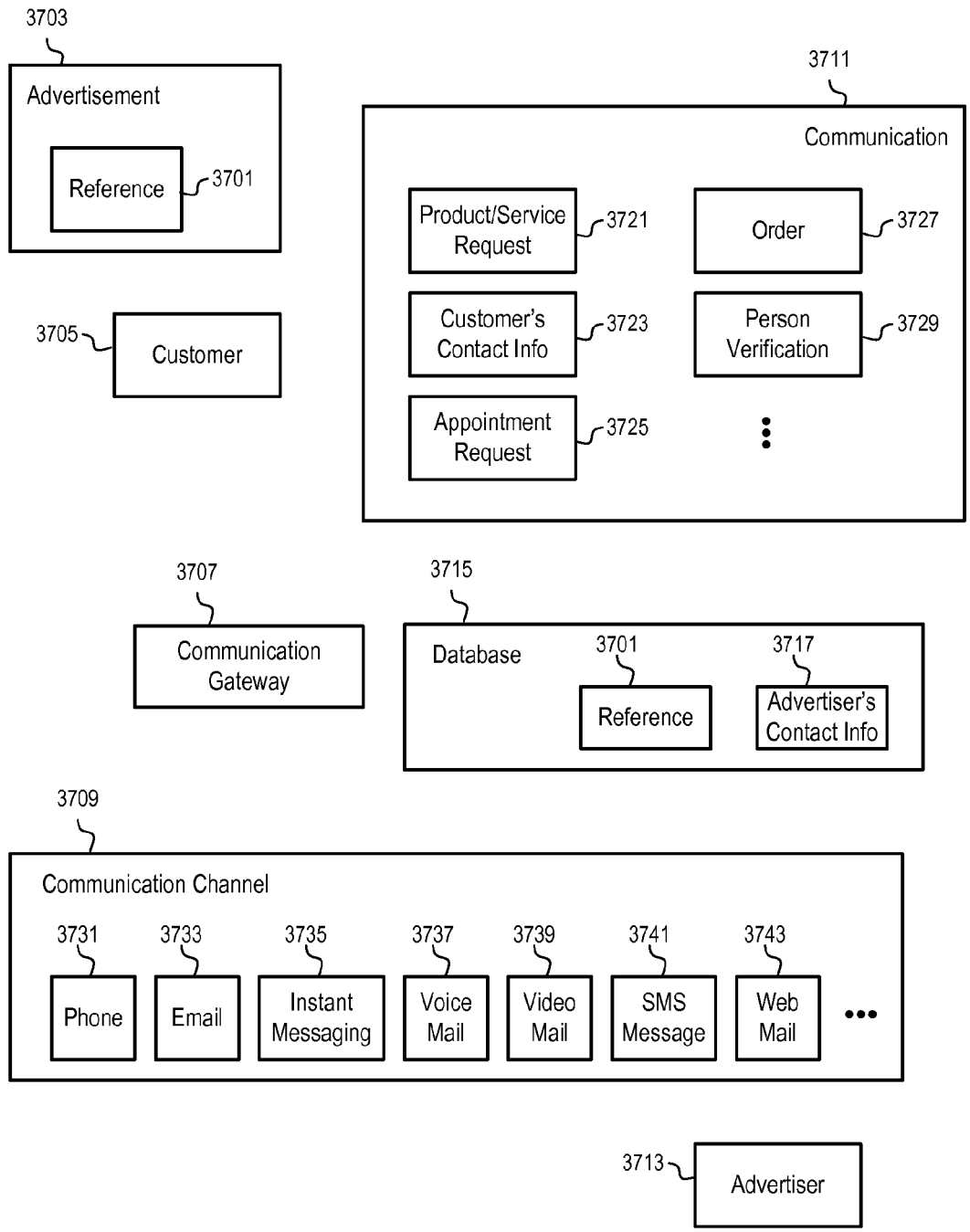
FIG. 37 shows examples of delivering communication leads according to embodiments of the present invention.

FIG. 37 shows examples of delivering communication leads according to embodiments of the present invention. In FIG. 37, an advertisement (3703) is provided, on behalf of the advertiser (3713), to the customer (3705) together with a reference (3701) which is used to facilitate the tracking of communication leads generated via the advertisement (3703). In one embodiment, the advertisement is specific for the advertiser (3713); and the identity of the advertiser (3713) is presented in the advertisement.

In one embodiment, the advertisement is exclusively for the advertiser (3713); alternatively, the advertisement explicitly includes the identities of one or more advertisers.

In one embodiment, the communication (3711) that is responsive to the advertisement (3703) is transmitted from the customer (3705) to the advertiser (3713) via the communication gateway (3707). Since the communication request is made via the reference (3701), the communication gateway (3707) can look up advertiser's contact info (3717) from the database (3715) based on the reference (3701) to facilitate the transmission of the communication to the advertiser (3713).

Alternatively, the reference (3701) may include an encoded or encrypted version of the advertiser's contact info, which can be decoded or decrypted without having to perform lookup from a database.

In one embodiment, the reference (3701) is at least part of a phone number (e.g., a toll free number, a local number, a phone extension, a SIP URI (Universal Resource Identifier), a VoIP address, etc.), which can be used to request a phone connection. In other embodiments, the reference (3701) may be a portion of a parameter for an HTML link which can be selected to request the arrangement of a communication with the advertiser, a portion of an email for requesting a communication with the advertiser via email, a portion of an instant messaging identifier for requesting a communication with the advertiser via instant messaging, etc. In one embodiment, multiple references are provided in the advertisement to allow the customer (3705) to select a communication media for reaching the advertiser (3713).

In one embodiment, a communication lead includes the delivery of the communication (3711) from the customer (3705) to the advertiser (3713). When the communication (3711) is delivered from a distinct customer (3705) to the advertiser (3713), the communication lead is considered being delivered to the advertiser (3713); and the advertiser (3713) can be charged a fee for the advertisement (e.g., according to a price bid on communication lead).

In one embodiment, a communication lead includes a communication connection provided to facilitate the communication between the customer (3705) and the advertiser (3713). In one embodiment, when the communication connection is readily available to the advertiser (3713), the communication lead is considered being delivered to the advertiser (3713); and the advertiser (3713) can be charged a fee for the advertisement (e.g., according to a price bid on communication lead). For example, after the connection between the communication gateway (3707) and the customer (3705) is established and the advertiser (3713) is contacted for the completion of the connection between the communication gateway (3707) and the advertiser (3713), the communication connection between the customer (3705) and the advertiser (3713) can be considered being readily available to the advertiser (3713). In another embodiment, a communication lead is considered being delivered to the advertiser (3713) after the communication connection is established between the customer (3705) and the advertiser (3713).

In one embodiment, a connection for transmitting and receiving communications in real time is provided to facilitate the communication between the customer (3705) and the advertiser (3713). The connection may support full duplex, voice communication, video communication and/or text communication.

In one embodiment, the transmitting of the communication (3711) from the customer and the receiving of the communication (3711) at the advertiser (3713) may not be in real time. The communication (3711) may be stored or queued and then forwarded to or retrieved by the advertiser (3713). In one embodiment, no connection is provided to support full duplex, real time communication; and the delivery of the initial communication (3705) from the customer is considered as the communication lead.

In one embodiment, the advertisement (3703) is charged for based on the delivery of a lead to a customer who has sufficient interest in the advertisement to initiate a request for an in person communication with the advertiser. Such a customer is more interested in the advertisement than a person who is simply browsing for information. Such leads can be more valuable than forwarding a web visitor to a web site of the customer.

In one embodiment, the customer (3705) makes the request for an in person communication via a communication channel that is typically used for in person communications, such as a real time communication that supports voice. For example, the customer (3705) may request a phone connection with the advertiser (3713). For example, the customer (3705) may request an instant messaging session with the advertiser (3713). For example, the customer (3705) may request for a video conference session, or a shared application session (e.g., common whiteboarding). For example, the customer (3705) may request to send an email, instant message, voice mail, video mail, SMS message, web mail, etc., to contact the advertiser (3713).

In one embodiment, the customer (3705) makes the request for an in person communication via providing information that is specific to the customer and that is typically not apparent to a web site that is being visited. The provided information may or may not be forward to the advertiser (3713).

For example, the customer may provide the customer's contact information (3723) to request that the customer be contacted by the advertiser (3713) via the communication gateway (3707). The customer's contact information (3723) may be used by the communication gateway to establish a connection between the customer (3705) and the communication gateway, or be provided to the advertiser (3713) who may then initiate the connection directly with the customer (3705). The customer's contact information may be used by the communication gateway in receiving the initial communication from the customer and/or in delivering the initial communication to the advertiser (3713).

For example, the customer can provide the phone number of the customer to request the communication gateway (3707) to establish a phone connection with the advertiser (3713) without providing the phone number of the customer to the advertiser (3713). For example, the customer can provide an email address to request communications with the advertiser (3713) via email without revealing the email address to the advertiser (3713). For example, the customer may provide a postal address to request communications via postal services. For example, the customer (3705) may send an appointment request (3725), a product/service request (3721), a purchase order (3727), etc., to the advertiser (3713) in the initial communication to the advertiser (3713). Alternatively, the customer (3705) may provide the phone number, email address, or the postal address to the advertiser (3713) via the communication gateway (3707) such that the advertiser (3713) can subsequently contact the customer (3705) without the communication gateway (3707).

In one embodiment, the customer (3705) is verified as being a person before the communication gateway (3707) allows a communication flow between the customer (3705) and the advertiser (3713). For example, a human operator may talk to the customer to receive the customer's request and determine whether the communication is from a person. For example, the customer may be required to provide person verification information (3729) so that the communication gateway (3707) can determine whether the communication request is indeed from a viable customer. In one embodiment, the customer (3705) is required to be authenticated as a registered member of the system. In one embodiment, the communication gateway uses Completely Automated Public Turing test to tell Computers and Humans Apart (CAPTCHA) to make a determination on whether there is a human behind the communication request. In one embodiment, a CAPTCHA test is designed such that most human users can pass the test, but it is very difficult to design a software program to pass the test. Since the system made the attempt to verify that there is a viable customer behind the communication request, the lead is valuable to the advertiser (3713).

In one embodiment, the customer (3705) makes the request for an in person communication via a communication in a form that is typically used for in person communication, such as voice communication. For example, the communication may include audio, video, image and/and text messages.

In one embodiment, the customer (3705) makes the request for an in person communication via particularly requesting a communication contact of the advertiser. For example, a hidden portion of a communication reference is revealed when a request from the customer (3705) is received; and the user interface is specifically designed to allow the user to specifically request the communication reference such that a majority of users would perform the action to request the communication reference only when specifically interested in the initiation of the communication with the advertiser. For example, a graphical user interface button or link may be designed to state "click here to see the phone number of this advertiser".

In one embodiment, the information provided by the customer (3705) in making the request for an in person communication with the advertiser (3713) is used by the communication gateway (3707) to forward responsive communications obtained from the advertiser (3713) to the customer (3705).

In one embodiment, the information provided by the customer (3705) is provided to the advertiser (3713) without expecting an in person response from the advertiser (3713). For example, a purchase order, an appointment or reservation request can be sent to the advertiser (3713) without an in person reply from the advertiser (3713). For example, the communication gateway (3707) can use the data collected from the customer (e.g., via a web page) to file a request with the advertiser (3713); and the request can be filed by the communication gateway (3707) on behalf of the customer, via a web form, a voice message, an email, or an application program interface, etc.

In one embodiment, the communication channel used between the communication gateway (3707) and the customer (3705) has the same type as the communication channel used between the communication gateway (3707) and the advertiser (3713). The communications are relayed/forwarded by the communication gateway (3713). Alternatively, the communication gateway (3707) may perform format conversion; and thus, the communication channel used by the customer to provide the communications to the communication gateway (3707) may not be the same as the communication channel the communication gateway (3707) used to provide the communication to the advertiser (3713). For example, the communication gateway may receive a requesting communication via a web page and transmit the request to the advertiser (3713) via instant messaging, voice mail, email, a phone call, etc.

A communication channel (3709) used for the delivery of the communication lead may be phone (3731), email (3733), instant messaging (3735), voice mail (3737), video mail (3739), SMS message (3741), web mail (3743), and/or other known types of communication channels.

Figure 38:
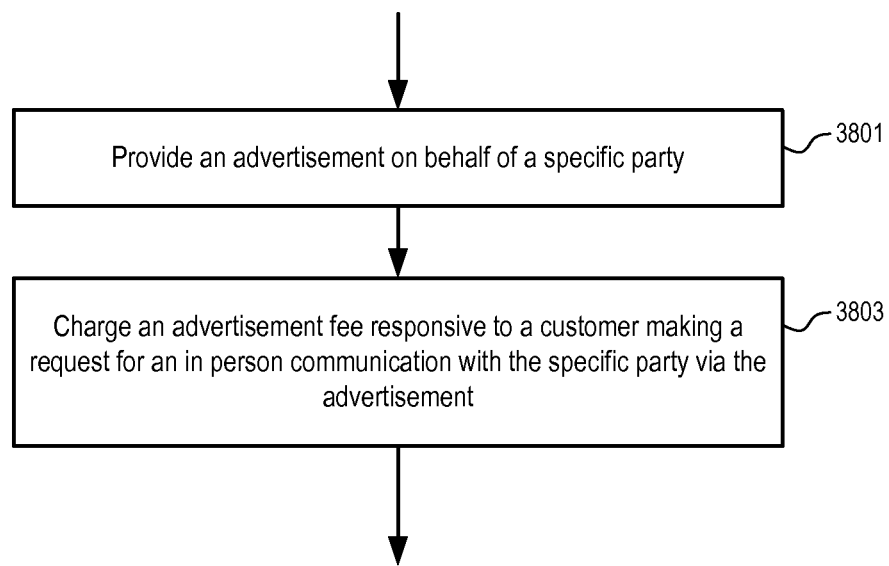
FIG. 38 shows an advertising process according to one embodiment of the present invention.

FIG. 38 shows an advertising process according to one embodiment of the present invention. In FIG. 38, an advertisement is provided (3801) on behalf of a specific party. An advertisement fee is charged (3803) responsive to a customer making a request for an in person communication with the specific party via the advertisement. The in person communication can be a telephone conversation with the specific party, instant messaging with the specific party, an electronic mail message from the customer, a voice message from the customer, a video message from the customer, a short message service (SMS) message from the customer, or a request of the customer.

In one embodiment, the customer requesting a connection for real time communications, such as a connection that allows full duplex communications between the customer and the specific party (e.g., for voice, audio, video, and/or text communications).

In one embodiment, a reference is assigned to the specific party and embedded in the advertisement. Requests for communications with the specific party resulted from the advertisement are tracked via the reference embedded in the advertisement.

The customer may make the request via particularly requesting to reveal contact information of the specific party, via providing contact information for calling back to the customer, via requesting an appointment, via initiating a communication session (e.g., forwarding/conferencing/connecting the current communication session for communication with the specific party, or initiating a new communication session).

In one embodiment, the system facilitates the in person communication between the customer and the specific party via a reference embedded in the advertisement to allow the tracking of requests for communications that are resulted from the advertisement. In one embodiment, the system verifies that the customer is available for communication in person with the specific party.

One embodiment of the disclosure provides a pay per deal advertisement process in which advertisers pay an advertising network when a communication lead (e.g., a phone call) delivered by the advertising network results in a "deal" for the advertiser. A deal may be related to acquisition, purchase, exchange, auction, survey, delivery of a message, obtain an answer, etc. In a deal an acquisition or purchase may be made by the advertiser, or by the customer, for digital and/or physical goods, and/or for advice, entertainment, amusement, information or services delivered over the communication connection of the communication lead and/or offline, etc.

In one embodiment, the deal can be defined by the advertiser based on the purpose of the advertisement. For example, the advertiser may define an event that indicates the close of the deal for the advertisement. The system can then provide the advertisement and detect the occurrence of the event to charge the advertisement fee when the advertisement results in a deal as defined by the advertiser.

In one embodiment, the advertisement fee is charged when the pre-identified agreement between the customer and the advertiser is reached as the result of the advertisement. Thus, the advertisement fee correlates with the desired result of the advertisement, as defined by the advertiser, reducing or eliminating the uncertainty for the advertiser investing in the advertisement. In one embodiment, an interface is provided to an advertiser to facilitate the selecting or defining what the advertiser considers as a deal to be achieved via the advertisement; and the system monitors or detects the completion of the deal (or transaction) to charge for the advertisement fee.

In one embodiment, advertisements are presented to generate communication leads and allow the advertisers to close the deals via the communication leads. Various types of communication leads described above can be used. In one embodiment, a communication connection between a customer and an advertiser is provided via a connection provider to deliver and track the communication lead; and the communication connection is also provided to facilitate the communications needed to close the deal.

For example, a communication lead can be a phone call received via a dynamic number generated and displayed in an advertisement on websites, search results, banners, etc. In one embodiment, the phone connection is provided to facilitate the discussion between the customer and the advertiser to reach a deal; and the advertiser is charged for the advertisement when the customer and the advertiser reach a deal via the phone connection. In one embodiment, the advertiser is not charged a fee for the communication lead if there is no deal after the communication between the customer and the advertiser. In another example, a communication lead and connection is provided via a phone call received using a softphone (software phone); and the call results from a customer selecting a click-to-call icon of an advertisement presented in websites, search results, etc. A phone lead and connection can be provided via a phone call received at a phone number that is assigned to the advertiser/advertisement and presented in a media channel such as a static or dynamic billboard, Yellow Pages, magazine, newspaper, television, radio broadcasting, etc. The phone lead may be received via a directory assistance call. The communication lead and connection for real time communications can also be provided via instant messaging for communications in text, voice/audio, and/or video. The communication lead and the connection may also be provided via non-real time communications, such as voice mail, email, SMS, etc.

The advertisement fee that is to be paid for each deal can be a fixed price offered by the advertising network, a share of revenue received by the advertiser or a percentage of the payment made by the advertiser to the customer, and/or a specific lump sum bid price specified by the advertiser.

In one embodiment, the advertisement fee is to be charged for a deal in addition to a separate advertisement fee for the communication lead and/or other fees. Alternatively, the advertiser is charged the advertisement fee for the deal and not charged a separate fee for the communication lead. For example, when there is no deal following a communication lead, the advertiser is not charged for the communication lead; and thus, the advertiser is not charged for the leads that do not result in deals.

In one embodiment, a deal is arranged to be concluded or processed via the communication connection provided via the advertisement. For example, the payment or the delivery of the goods, service or information can be made via a communication over the communication connection provided via the advertisement; and the system can monitor the provided communication connection to detect the deal.

In another embodiment, the deal can be reached outside the communication connection provided via the advertisement. However, at least a portion of the deal is carried out via the system such that the system can tracked the completion of the deal to bill for the advertisement fee. For example, the system may facilitate the payment processing, delivering of goods or services, and/or the book keeping of records (e.g., via communications through an Application Programming Interface (API) provided by the system). The system can correlate the deal made via the system and the communication connection provided via the advertisement to charge the advertisement fees for deals that have been made with the help of the communication connections provided via the advertisement.

For example, the customer can be identified via a communication reference of the customer used in the communication lead. For example, the telephone number of the customer can be identified (e.g., via an ANI service, or as the callback number provided by the customer); and the telephone number of the customer can be used in a system (e.g., a Customer Relationship Management (CRM) system) that handles the transactions between the customer and the advertiser to identify the deals that are the result of the phone connections provided via the advertisement. For example, the Internet Protocol (IP) address of the customer can be used to correlate the communication connection (e.g., IP telephony or instant messaging) provided as a response to the advertisement and the deal made between the customer and the advertiser.

In one embodiment, after the communication connection is provided between the customer and the advertiser, a user interface is provided to the customer to carry out a transaction between the customer and the advertiser; and the user interface includes a reference to the communication connection to track the deal made via the communication connection.

Alternatively, the advertisement fee can be charged for a deal without having to check whether there is a communication connection provided for the deal. In one embodiment, a separate fee is charged if it cannot be determined whether a communication connection has been provided to assist the deal.

In one embodiment, a data communication channel is provided by the system to facilitate the conclusion of the deal while the customer and the advertiser communicate over the real time communication connection. For example, when a customer calls an advertiser via the connection provider, a user interface is provided on the softphone of the customer or a web browser to receive input from the customer. In one embodiment, the connection provider receives the user interface from the advertiser, relays the user interface to the customer, obtains the customer's input to the user interface, and relays the input to the user interface of the advertiser. In one embodiment, the connection provider provides an interface to the customer to complete the required actions for the deal and presents a mirrored version of the interface to the advertiser to assist the advertiser in communication with the customer. For example, the advertiser can walk the customer through the user interface and provide answers to questions raised by the customer to complete the required actions over the user interface (e.g., filling out a purchase order form, or a survey form, or placing a bid on an item offered by the customer, etc.).

Since the data communication channel is provided with the real time communication connection, a deal detected in the data communication channel can be attributed to the provision of the real time communication connection that is a result of the advertisement.

In one embodiment, after a real time communication connection is provided as a result of the advertisement, a user interface provided to the same customer for a transaction between the customer and the advertiser is modified to include a reference to the real time communication connection. Thus, the deals concluded as a result of the real time communication connection provided via the advertisement can be tracked.

In one embodiment, an arrangement is made to allow an advertiser to report a deal in the real time communication connection provided via the advertisement, or via a separate data connection. For example, in the phone connection to the customer made via the advertisement, the advertiser can dial a sequence (e.g., "#" or "*76") to indicate that there is a deal resulting from the communication lead. Alternatively, the advertiser can visit a web page to view recent phone calls received via the advertisement and mark the phone calls that resulted in deals. The advertiser may visit the web pages periodically after the phone leads, or mark the phone calls while the conversations resulting from the phone leads are in progress.

In one embodiment, the advertiser pays a subscription fee to receive communication leads, a fee based on the duration of the communication connections, and/or a separate advertisement fee for the deal when the deal is completed.

Figure 39:
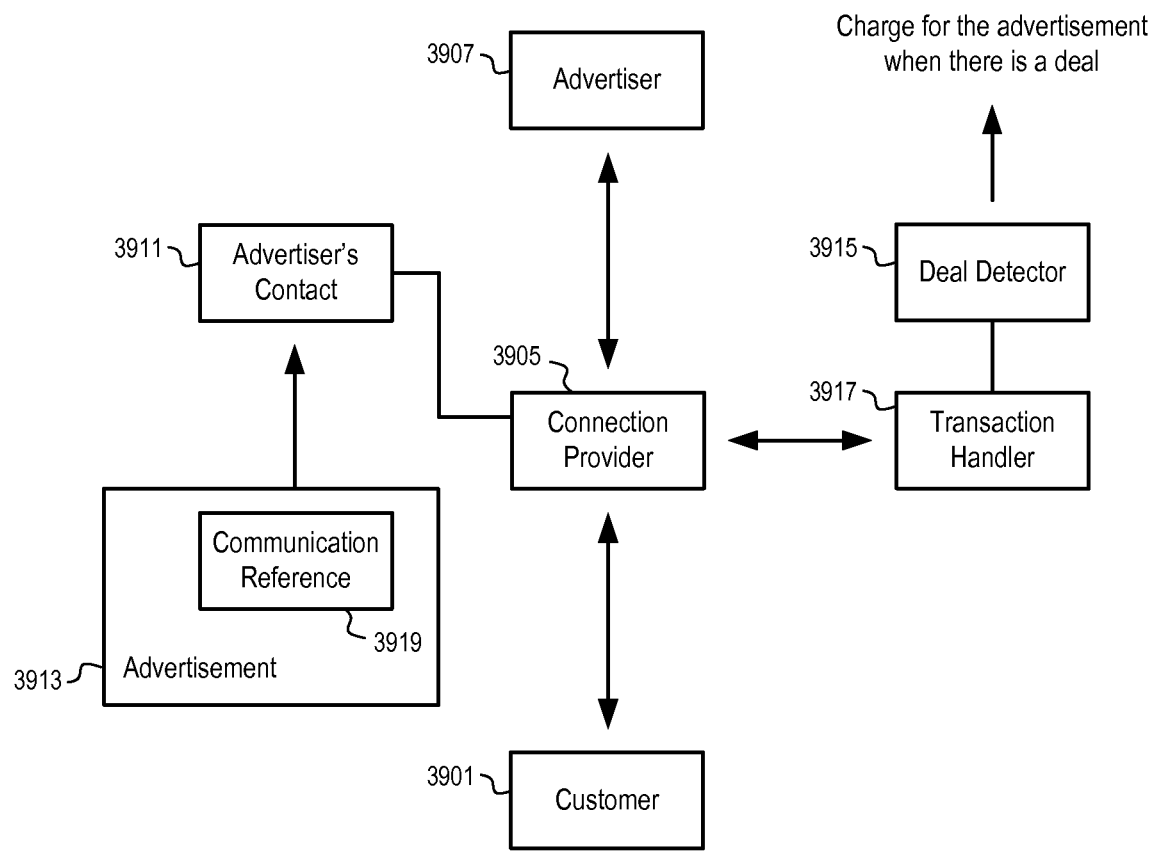
FIG. 39 shows a pay per deal advertisement process according to one embodiment.

FIG. 39 shows a pay per deal advertisement process according to one embodiment. In FIG. 39, a communication reference (3919) is provided with the advertisement (3913) to the customer (3901). The customer (3901) can response to the advertisement by using the communication reference (3919) to request the connection provider (3905) to provide a communication connection between the advertiser (3907) and the customer (3901). Based on the communication reference (3919) used in the request, the connection provider (3905) can determine the advertiser's contact (3911) (e.g., through decoding/decrypting the communication reference or looking up the advertiser's contact using the communication reference as a key).

In FIG. 39, the connection provider (3905) bridges the communications between the advertiser (3907) and the customer (3901). The connection provider (3905) can monitor the communications to facilitate the transaction between the advertiser (3907) and the customer (3901). For example, the connection provider can provide the communications to a transaction handler (3917) which performances the transaction on behalf of the customer (3901) and/or the advertiser (3907) based on the communications between the advertiser (3907) and the customer (3901).

For example, the advertisement (3913) may present an offer from the advertiser to sell an item or service. Since the communication reference (3919) can be used to request a voice connection to the advertiser (3907) via the connection provider, the customer (3901) can request a voice connection to talk to the advertiser (3907) regarding the offer. After talking to the advertiser (3907), the customer may decide to accept the offer. The customer can be instructed to provide a signal over the voice connection to indicate the acceptance of the offer. For example, the customer can press a key (e.g., "#") or dial a sequence (e.g., "*11") to indicate the acceptance, or provide a voice command (e.g., "accept" or "deal") after a voice prompt is provided by the transaction handler (3917) via the connection provider (3905) to the customer (3901). The transaction handler (3917) is configured to carry out the requests or deals made over the communication connection provided by the connection provider (3905).

In FIG. 39, a deal detector (3915) is coupled to the transaction handler (3917) to detect a deal that is made via the communication connection provided by the connection provider (3905) as a result of the advertisement (3913). When there is a deal, the advertiser (3907) is charged an advertisement fee for the advertisement (3913).

In one embodiment, when there is no deal, the advertiser (3907) is not charged an advertisement fee for the advertisement (3913). For example, the connection provider (3905) may charge the advertiser (3907) for a communication service fee for the cost of the communication session between the customer (3901) and the advertiser (3907), regardless the result of the communication. The communication service fee may be based on the duration of the communication and/or the locations of the advertiser (3907) and the customer (3901). Alternatively, the communication service fee may be a monthly subscription fee, or a flat fee per communication session, or a flat fee per communication session having a duration less than a predetermined time limit (e.g., 3 minutes or 10 minutes). When there is a deal, the advertiser (3907) is further charged an advertisement fee, according to a bid price of the advertiser or a flat fee price offered by the advertising network.

Alternatively, the communication service fee may be waive; and the advertising network may cover the communication cost using the advertisement revenue.

In one embodiment, the connection provider (3905) includes a telecommunication service provider. The telecommunication service provider and the advertising network may share the advertisement income and/or the communication service fee.

For example, in one embodiment, the telecommunication service provider may charge the customer and/or the advertiser for a communication service fee for the connection made via the telecommunication service. The advertisement (3913) can be presented to allow the customer (3901) to particularly request the telecommunication service provide to provide the connection for the real time communications between the advertiser (3907) and the customer (3901). The advertising network and the telecommunication service provider can then share the revenue by compensating the advertisement network using a portion of the communication service fees resulted from the advertisements.

For example, when the advertisement is displayed on a mobile device of the customer (3901) (e.g., a cellular phone), the advertisement can be presented in a format which allows the customer (3901) to click on a link or icon to dial a number via the mobile device (e.g., the cellular phone) such that the phone call is made through a cellular communication network. For example, the advertisement can be presented in a format which allows the customer (3901) to click on a link or icon to request the telecommunication service provider to call back the customer (3901) for a connection to the advertiser (3907). For example, the advertisement may present a telephone number dynamically assigned by the telecommunication service provider to the advertisement so that when the customer (3901) call the dynamically assigned telephone number, the telecommunication service provider further connects the phone call to the advertiser (3907).

Alternatively, the advertising network and the telecommunication service provider can share the revenue by compensating the telecommunication service provider using a portion of the advertisement fees resulted from the advertisements. For example, the telecommunication service provider may charge neither the customer nor the advertiser directly. Instead, the telecommunication service provider may charge the advertising network for the communication service; or the advertising network provides a percentage of the advertisement fee to the telecommunication service provider.

In one embodiment, the telecommunication service provider charges the customer and/or the advertiser for a communication service fee; and the advertising network charges the advertiser an advertisement fee. The advertising network compensates the telecommunication service provider by providing a portion of the advertisement fee to the telecommunication service provider; and the telecommunication service provider provides a portion of the communication service fee to the advertising network to compensate the advertising network for leading the customer to the services of the telecommunication service provider.

In one embodiment, the communication service fee is not charged; and the advertisement fee collected from the advertiser (3907) is shared between the telecommunication service provider and the advertising network. In another embodiment, the advertisement fee is not charged; and the communication service fee collected from the customer (3901) and/or the advertiser (3907) is shared between the telecommunication service provider and the advertising network.

In one embodiment, the advertising network may instruct the telecommunication service provider to charge the advertisement fee. In one embodiment, the advertising network may instruct the telecommunication service provider to charge and/or credit the advertiser (3907) and/or the customer (3901) for the transaction made over the communication connection between the advertiser (3907) and the customer (3901). In one embodiment, the telecommunication service provider charges or credit the advertiser (3907) and the customer (3901) via credit card accounts (or other types of electronic payment methods). In one embodiment, the telecommunication service provider charges the advertisement fee via the telephone bill of the advertiser (3907).

In FIG. 39, the transaction between the advertiser (3907) and the customer (3901) is facilitated via the transaction handler (3917). For example, the transaction handler (3917) may be configured to process payment from the customer (3901) to the advertiser (3907) for purchases made by the customer (3901), to process payment from the advertiser (3907) to the customer (3901) for acquisition made by the advertiser (3907), to process delivery of goods, information, etc. The customer (3901) and/or the advertiser (3907) can be instructed or guided to provide instructions to the transaction handler (3917) over the communication connections provided via the connection provider (3905).

For example, the transaction handler (3917) may include an interactive voice response system, which may include business processing logic for conducting the transaction. When the advertiser and the customer reach an agreement, the advertiser and/or the customer may request the transaction handler to capture the agreement. For example, if the customer is ready to make the purchase, the advertiser (3907) may request the transaction handle to take over the conversation with the customer (3901), confirm the purchase price and payment information, and conclude the deal. For example, if the customer is ready to visit the advertiser (3907), the advertiser (3907) may request the transaction handler (3917) to present a direction to the business location of the advertiser (3907).

Alternatively or in combination, the advertiser (3907) may be instructed to provide an indication of a deal to or via the connection provider whenever the advertiser (3907) gets a deal from the communication connection provided by the connection provider (3905).

In one embodiment, the advice, entertainment, information purchased or acquired in the deal is delivered via the communication channel provided by the connection provider. Alternatively, the purchased or acquired goods and/or services can be delivered without going through the connection provider (3905) and/or the transaction handler (3917).

In one embodiment, the advertisement (3913) is delivered to the customer (3901) before a communication connection between the connection provider (3905) and the customer (3901) is established; and the customer (3901) requests the communication connection between the connection provider (3905) and the customer (3901) via the advertisement (3913). For example, the customer (3901) may perform a search on a mobile device using a web browser, a WAP application, or an SMS message (or an instant message); and the advertisement (3913) is provided with the search result. For example, the customer (3901) may enter or leave an geographic region (e.g., a commercial district or the vicinity of a business); and in response to a determination of the position of the customer (3901) (e.g., via a GPS unit or a cellular position determination system) the mobile device carried with the customer can receive an advertisement (3913) that is location sensitive.

In one embodiment, the advertisement (3913) is delivered to the customer (3901) over the communication connection between the connection provider (3905) and the customer (3901). For example, the connection provider (3905) may also provide directory assistance service; and the advertisement (3913) may be provided in response to a directory assistance request received from the customer (3901) over the communication connection between the connection provider (3905) and the customer (3901). For example, the advertisement (3913) may be provided in an audio format to the customer over the phone connection, or in a visual format to the customer's devices that is also capable to receive data, such as a cellular phone, a smart phone, a PDA, a portable computer, etc.

In one embodiment, the directory assistance provider is an entity separate from the connection provider; and the directory assistance provider forwards or bridges the connection to the connection provider for a connection to the advertiser (3907) if the customer (3901) responses to the advertisement (3913).

Figure 40:
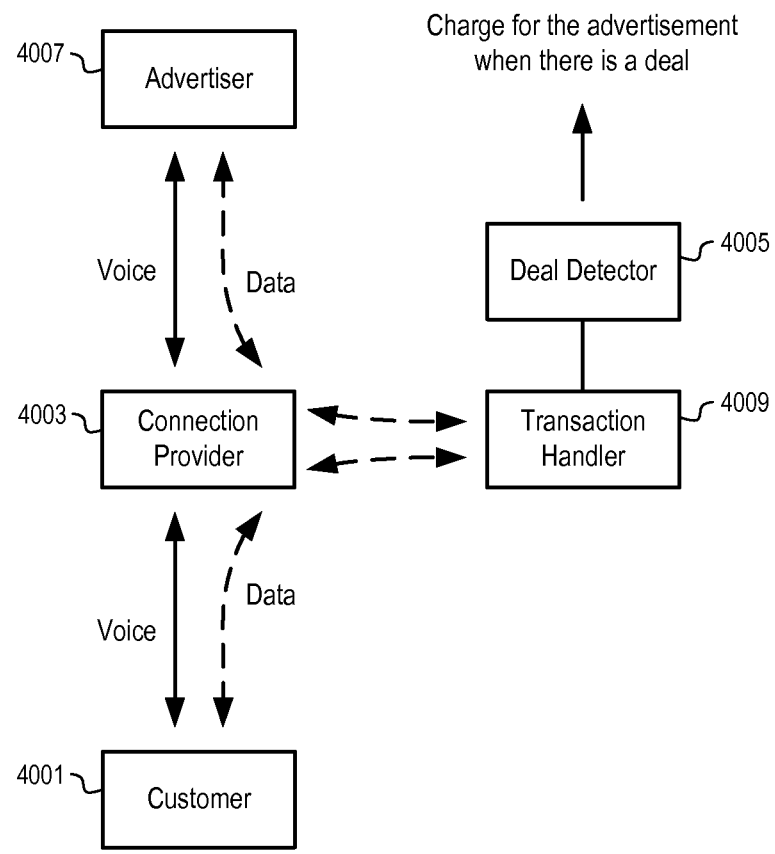
FIG. 40 shows a method to track a deal resulting from a real time communication connection provided in response to an advertisement according to one embodiment.

FIG. 40 shows a method to track a deal resulting from a real time communication connection provided in response to an advertisement according to one embodiment. In FIG. 40, the connection provider (4003) provides both a voice connection between the advertiser (4007) and the customer (4001) and a data connection between the advertiser (4007) and the customer (4001). The voice connection allows a real time communication in person between the advertiser (4007) and the customer (4001); and the data communication connection is provided to facilitate the business transaction between the advertiser (4007) and the customer (4001).

In FIG. 40, the data connection goes through the transaction handler (4009) which can monitor the data communications for the detection of a deal. An advertisement fee can be charged where a deal is detected.

For example, the transaction handler (4009) may provide an application programming interface to facilitate the exchange of data between the transaction handler (4009) and the advertiser (4007). For example, when the customer (4001) requests the voice connection to the advertiser (4007), the transaction handler (4009) can determine the advertisement to which the customer is responding and present information identifying the advertisement and/or information related to the customer (e.g., whether the customer is a repeated customer, statistics of prior purchases, prior calls, etc.). In one embodiment, the transaction handler (4009) can further facilitates electronic commerce and presents the items to be sold via the advertisement to the advertiser to facilitate the voice communication with the customer. With the help of the voice communication connection with the customer (4001), the advertiser can take the purchase order from the customer and conclude a deal.

In one embodiment, while the advertiser (4007) is filling the purchase order, the transaction handler (4009) can also present the relevant order data to the customer (4001) via the data connection between the transaction handler (4009) and the customer (4001). When the deal is ready, the customer (4001) can be asked to confirm the deal via the data connection (or via the voice connection). Further, during the process of filling the purchase order, the customer may also provide input via the data connection to directly modify or specify the purchase order.

For example, an application sharing session may be provided via the data connection to allow both the advertiser and the customer to walk through a common user interface to reach a deal.

In some embodiments, the data connection is provided between the advertiser (4007) and the transaction handler (4009) but not to the customer (4001). In some embodiments, the data connection is provided between the customer (4001) and the transaction handler (4009) but not to the advertiser (4007). In one embodiments, different types of data connections are provided to the advertiser (4007) and to the customer (4001); and the transaction handler (4009) provides data information to the advertiser (4007) and/or to the customer (4001) based on pre-determined rules.

In one embodiment, the data connections are provided to facilitate the deal while voice communication connection between the advertiser (4007) and the customer (4001) is maintained. The data connection and the voice connection are maintained concurrently. Alternatively, the voice connection and the data connection may be provided in a way that is partially overlapping in time, or in a way that has no overlapping in time. For example, the data connection may be provided when the customer (4001) and/or the advertiser (4007) requests for the data connection. In one embodiment, when the data connection is provided, the customer (4001) and/or the advertiser (4007) is asked to identify the voice connection (e.g., based on time of the voice connection, a reference number provided in the voice communication channel, and/or an identification of the advertisement, etc.) Once the voice connection is identified, the context of the voice communication can be used to set up the data presentation in the data connection; and the deal detected by the deal detector (4005) in the data connection can be attributed to the voice communication connection.

Alternatively, the data connection may be derived from the voice connection. For example, when the voice connection is provided via softphone or instant messaging session, the data connection can be added based on the voice connection. Alternatively, the voice connection may be derived from the data connection. For example, during the processing of conducting business transaction via the data connection, the customer may feel the need for a voice communication and thus requests the voice connection.

In one embodiment, when the customer (4001) requests the data connection, the association relation between the voice connection and the data connection can be automatically identified based on the identity of the customer (4001), the identity of the advertiser (4007) and/or the identity of the advertisement.

In one embodiment, the data channel between the customer (4001) and the connection provider (4009) and/or the data channel between the advertiser (4007) and the connection provider (4009) may be the same or different ones of web/WAP, SMS, email, instant messaging, and a custom application/protocol.

For example, when the connection provider (4003) detects that the communication device (e.g., a mobile phone, such as a cellular phone) has the data communication capability (e.g., web/WAP, SMS, instant messaging, etc.), the connection provider (4003) can present a visual user interface to the customer (4001) over the data connection to guide the customer (4001) through the transaction and/or the confirmation of the deal between the customer (4001) and the advertiser (4007). For example, the connection provider (4003) can send an SMS message to the cellular phone of the customer (4001) to request a confirmation of the agreement made between the customer (4001) and the advertiser (4007); and the confirmation may be provided by the customer via a replying SMS message to the connection provider (4003).

Figure 41:
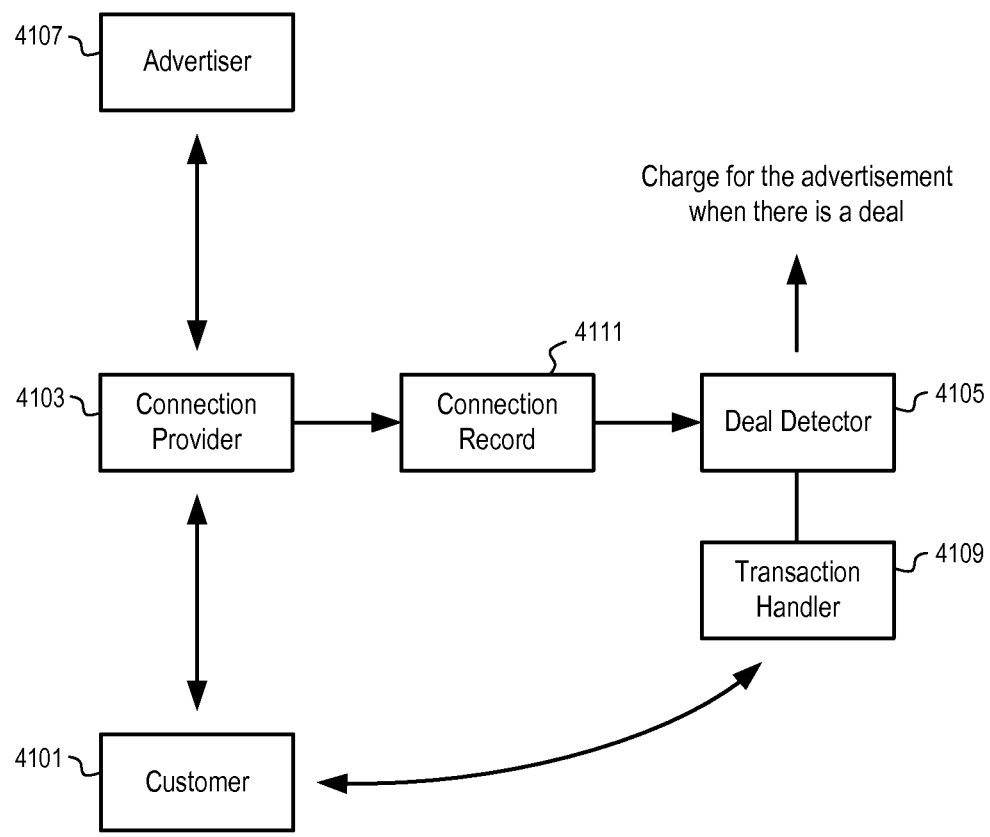
FIG. 41 shows another method to track a deal resulting from a real time communication connection provided in response to an advertisement according to one embodiment.

FIG. 41 shows another method to track a deal resulting from a real time communication connection provided in response to an advertisement according to one embodiment. In FIG. 41, the connection provider (4103) provides a communication channel for real time communication communications between the advertiser (4107) and the customer (4101) via an advertisement. The customer (4101) interacts with the transaction handler (4109) separately to carry out a deal that is a result of the advertisement.

In FIG. 41, the connection provider (4103) generates a connection record (4111) which may include identification information of the customer (e.g., the IP address of the customer, the phone number of the customer, a user name of the customer, a credit card number of the customer, etc.), identification information of the advertiser (e.g., the advertisement for which the customer called, the phone number of the advertiser, an ID of the advertiser, etc.), the starting and ending time of the connection, etc. When the customer interacts with the transaction handler (4109), the transaction handler (4109) determines information about the transaction, such as identification information of the customer and identification information of the advertiser/advertisement. The information collected for the transaction can be matched against the connection record (4111) by the deal detector (4105) to determine whether the transaction is helped by any communication connections provided via the advertisement. In one embodiment, the matching process is further based on the time window of the transaction. For example, if there is overlap in time between the communication connection provided via the advertisement and the transaction, the communication connection may be credited for the deal. For example, if the transaction is performed before the expiration of a time window following the communication connection, the communication connection can be credited for the deal.

FIG. 41 illustrates an example in which the customer (4101) interacts with the transaction handler (4109) to close a deal. In other examples, the advertiser (4107) may interact with the transaction handler (4109) to close the deal. In further examples, both the advertiser (4107) and the customer (4101) may interact with the transaction handler (4109) to close a deal.

FIG. 42 shows an example of a user interface (4201) which allows an advertiser to define a deal for a pay per deal advertisement process according to one embodiment. In FIG. 42, the advertiser can define the "deal event". The occurrence of the deal event indicates that a deal, for the purpose of the advertisement, is closed; and the advertiser can be charged an advertisement fee for the deal achieved via the advertisement and/or the communication connection.

In FIG. 42, the advertiser may define the deal event as "the customer agrees to pay". For example, the system may provide payment processing for the advertiser. When the advertiser and the customer reaches an agreement over a phone connection, the advertiser can hand over the connection to the IVR system to process payment; and the IVR system may ask the customer for the payment information, such a credit card number, a bank account, a member ID, etc., and as the customer to confirm the acceptance of the charge. If the customer accepts the charge, the deal event "the customer agrees to pay" occurs; and the advertiser can be charged an advertisement fee for the deal delivered via the advertisement and/or the communication connection.

Alternatively, the advertiser may specify that the deal event occurs when the customer places an order, or the customer places a bid.

In one embodiment, the advertiser may specify that the deal event occurs when the customer visits a web page at an URL specified by the advertiser. The system may present a link (e.g., in the advertisement or in a web page presented to guide the customer through the connection process and/or the business transaction related to the advertisement) to direct the customer to the web page specified by the advertiser. Alternatively, the system may require the advertiser to place a code in the web page at the specified URL to allow the tracking of the visits to the URL. For example, the code may include a link to the server of the system, which when receives a request made via the link forwards the link to the original server of the web page. For example, in response to a user selection/interaction, the code may make a remote procedure call to a server of the system to report the user selection/interaction.

In one embodiment, the advertiser may specify that the deal event occurs when the customer presses the submit button in the web page at the URL. The system can request the advertiser replaces a submit button provided by the system to allow the tracking of the customer selection of the submit button. For example, the submit button provided by the system can visit the web server of the system to report the selection of the customer and then forward data submitted with the selection of the submit button to the advertiser. In one embodiment, the system can provide an application programming interface to forward the data to the advertiser. In another embodiment, the web server redirects the web request resulting from the selection of the submit button to an URL specified by the advertiser (e.g., the original target URL of submit button of the web page).

In one embodiment, in response to the advertiser specifying the deal event as the customer pressing the submit button in the web page, the system may visit the web page the URL specified by the advertiser, determine the target URL of the submit button of the web page, and provide a replacement submit button to replace the submit button in the web page the URL specified by the advertiser.

In one embodiment, the advertiser may specify that the deal event occurs when the customer agrees to provide an address to the advertiser. For example, the system can collect the address information from the customers; when the address of the customer is needed to close the deal, the system may prompt the customer to authorize the release of the customer's address information to the advertiser. When the customer agrees to release his/her address, the system detects a deal; in response to the deal, the system can charge the advertiser a fee for the advertisement.

In one embodiment, the advertiser may specify that the deal event occurs when the customer agrees to provide answers to certain question (e.g., an advertisement for a survey). For example, the system may conduct the survey on behalf of the advertiser, while allowing the advertiser to supervise, monitor, or assist the survey process via the communication connection between the customer and the advertiser. The system closes a deal when the customer provides answers to a set of questions specified by the advertiser.

In one embodiment, the advertiser can specify that the deal event occurs when the advertiser is satisfied and dial a sequence specified by the advertiser to indicate there is a deal.

In one embodiment, when the advertiser specifies the deal event, the system arranges the detection of the deal event such that the advertisement can be charged according to the deals detected according to the deal event defined by the advertiser. In one embodiment, the system is designed to have the capability to detect a variety of events; and the advertiser can select one types of events or a combination of events as the deal event.

In one embodiment, the options for the definition of deal events can be offered based on the types of advertisements, or the category of advertisements, and/or the services provided by the system to assist the business transaction. For example, an advertisement may involve an auction, an acquisition, selling physical goods or digital goods, etc. Different types/categories of advertisements may be offered different choices for defining what the advertiser deems as a deal.

FIG. 43 shows an example of a user interface (4301) which allows an advertiser to specify an offer of an advertisement fee for a pay per deal advertisement process according to one embodiment. In FIG. 43, the advertiser can specify the advertisement fee as a percentage of what the customer pays for a purchase made by the customer, a lump sum for each deal, and/or a percentage of what the advertiser pays the customer for an acquisition made by the advertiser, etc.

In one embodiment, the advertiser can group deals for the payment of advertisement fees. For example, the advertiser may offer to pay a subscription fee of a pre-defined amount per month under the condition that the system delivers at least a pre-defined number of deals via the advertisement. In one embodiment, the advertiser may specify subscription fees for a number different levels of deal amounts realized via the advertisement; and the system charges the subscription based on the actual level of deal amounts. For example, the advertiser may specify a first subscription when the deals resulting from the advertisement is below a first number, a second subscription when the deals resulting from the advertisement is between the first number and a second number, etc. In one embodiment, the advertiser may offer a basic subscription to the advertising network and an additional amount for deals achieved in a given increment (e.g., each deal, or each ten deals or each dozen of deal, etc.).

In one embodiment, the advertiser may specify the price for the advertisement fee as a maximum bid price; and the system can automatically determine the actual bid price based on the bid prices of the competitors of the advertiser.

In one embodiment, the advertiser may specify the price for the advertisement fee as a function of a bid price of the customer for the information, service, digital or physical products, or ownership interest offered by the advertiser. For example, the advertiser can offer information, service, digital or physical goods for sell via an auction; and the advertisement may be used to provide communication connections for communications between the advertiser and customers. When the auction is closed, the advertisement fee may be determined based on the largest bid price of the customers who have placed bids via the advertisement (or via the communication connections provided through the advertisement). Alternatively, the advertisement fee can be determined based on the winning bid independent of whether the winning bid is placed via a communication connection provided through the advertisement. Alternatively or in combination, the advertisement fee may also be charged for each distinct bid (or the highest bid from each distinct customer) received via the communication connection provided through the advertisement. In one embodiment, the advertisement fee can also be a function of the number of bids received over the communication connections provided via the advertisement, the level of the bid prices, and/or the quantities purchased by the customer. The function may be a continuous function, or a discontinuous function on a sliding scale. For example, an advertisement fee may be specified as $1.00 if the winning bid is above $10 but less then $20 and $2.00 if the winning bid is above $20. For example, an advertisement may be used to advertise the auction of a stock; and the advertisement fee can be different depending upon the amount of the bid for each share, the number of shares involved in the transaction, etc. In one embodiment, other conditions for the transaction can also be included in the computation of the advertisement fee, such as whether the purchase is in blocks, or odd lots, etc.

Figure 44:
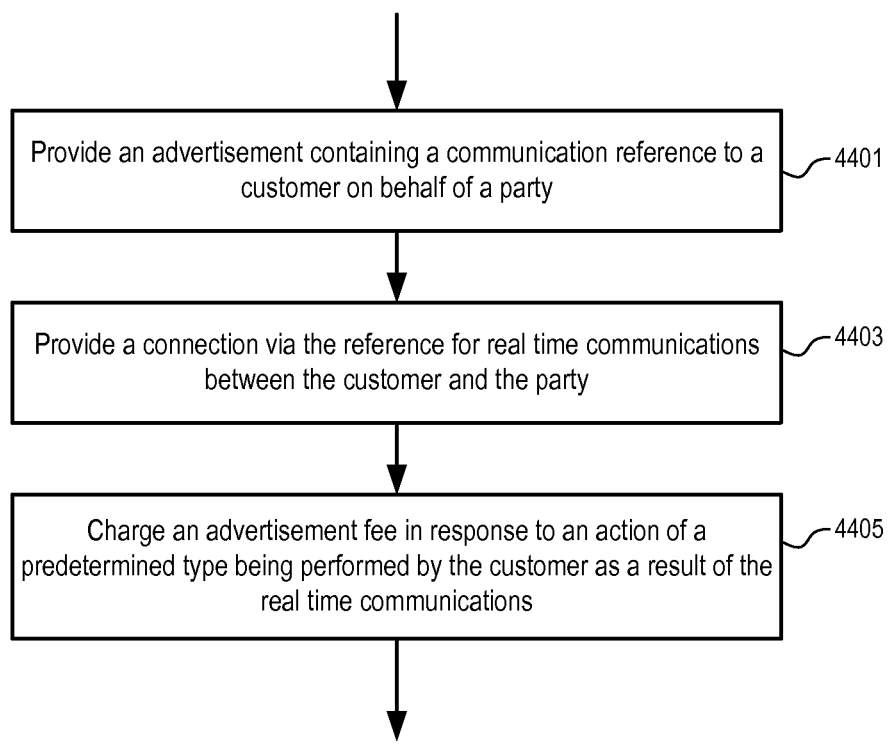
FIG. 44 shows a method to advertise according to one embodiment.

FIG. 44 shows a method to advertise according to one embodiment. In FIG. 44, an advertisement containing a communication reference is provided (4401) to a customer on behalf of a party. A connection is provided (4403) via the reference for real time communications (e.g., real time two-way voice communications) between the customer and the party. An advertisement fee is charged (4405) in response to an action of a predetermined type being performed by the customer as a result of the real time communications. In one embodiment, the advertisement fee is charged in response to an agreement of a predetermined type being reached between the customer and the party as a result of the real time communications.

In one embodiment, to provide the connection, a phone connection is established with the customer via the reference; the party is identified based on the reference via which the phone connection is established; and the phone connection is bridged to the party to provide the connection between the customer and the party.

The reference provided with the advertisement may be a phone number without an extension, a phone number with an extension, a SIP address, a member identifier of an instant messaging network, or a click-to-call reference. The advertisement can be provided via a web site, a search result, a banner, a billboard, a printed media, a broadcasting media, an electronic message, etc.

In one embodiment, the action includes a purchase request or order from the customer, a transaction, an electronic payment, a payment via an interactive voice response system, a payment via a wireless device, a consent of the customer to release information to the party, a submission of information from the customer, or a selection of a portion of a web page by the customer. In one embodiment, a user interface is provided to allow the party to specify the action as a condition for the advertisement fee.

In one embodiment, the advertisement fee is a predetermined fee independent of a duration of the connection. The advertisement fee may include a percentage of revenue generated from a transaction as a result of the action. In the transaction, the customer may pay the party an amount for a purchase resulted from the real time communications; or the party may pay the customer an amount for an acquisition of information, a product or a service resulted from the real time communications. In one embodiment, the advertisement fee is based on a bid price of the party and/or the bid price of one or more competitors of the party.

In one embodiment, the action is detected based on at least a portion of the real time communications between the customer and the party over the connection. For example, one or more Dual-Tone Multi Frequency (DTMF) signals from the customer, corresponding to pressing one or more keys on the phone of the customer, can be detected as indication of the action.

In one embodiment, information related to the action performed by the customer (e.g., the phone number of the customer, the Internet Protocol (IP) address of the customer, and the call time of the customer, etc.) is matched with a record of the connection to determine whether the action is a result of the real time communications.

In one embodiment, a separate data communication channel is further provided to facilitate a transaction between the customer and the party; and the predetermined action in the data communication channel is detected after the connection for the real time communications has been provided for a period of time (e.g., the deal event detected before the time instance may not be attributed to the communication connection). In one embodiment, the data communication channel is provided in response to a request for the connection for the real time communications.

In one embodiment, the party is charged at least a portion of the advertisement fee. In another embodiment, a telecommunication service provider provides the connection for real time communications between the customer and the party; and the telecommunication service provider is charged at least a portion of the advertisement fee.

In one embodiment, the advertisement is provided in response to a request from a mobile device (e.g., a cellular phone); and the communication reference is to be used to request the connection via the telecommunication service provider. The telecommunication service provider may be instructed to bill and/or credit the party (or the customer) a fee for a transaction resulting from the real time communications.

Figure 45:
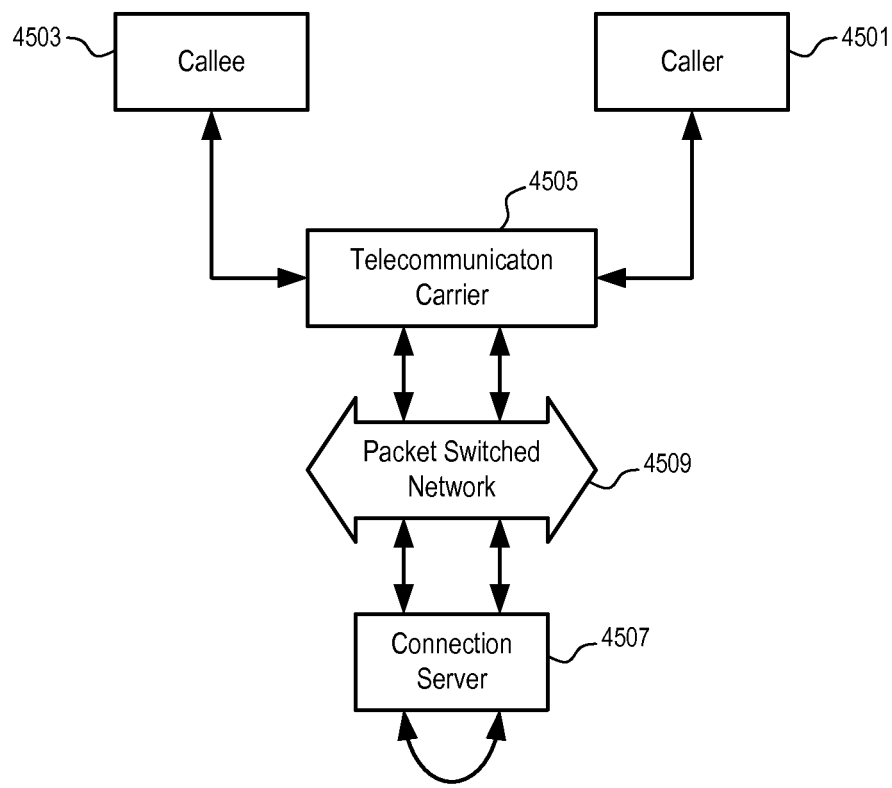
FIG. 45 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 45. In FIG. 45, the connection server (4507) receives and/or places telephone calls via the telecommunication carrier (4505) over the packet switched network (4509). The telecommunication carrier (4505) further routes the telephone communications towards the caller (4501) and the callee (4503).

Since the telecommunication carrier (4505) can route a call from a packet switched network to a variety of destinations (e.g., a traditional analog telephone set, a mobile phone, a cellular phone, a WiFi phone, a Bluetooth phone, a softphone running on a computer, etc.), the connection sever (4507) can use one type of communication connection with the telephone carrier (4505) to facilitate the communication connections with variety of devices used by the customers (e.g., callers and callees). Thus, the implementation of the connection server (4507) can be simplified. In one embodiment, the connection server (3307) can also place and/or receive direct VoIP calls to/from the caller (or callee).

For example, to make a voice connection in response to a click-to-call request, the connection server can place separate VoIP calls, via the telecommunication carrier (4505), to the caller (4501) (e.g., the requester of the click-to-call) and the callee (4503) (e.g., the destination of the click-to-call request).

If the caller (4501) (or the callee 4503) is on a public switched telephone network (PSTN), the telecommunication carrier (4505) bridges the packet switched the network and the public switched telephone network (PSTN). The telecommunication carrier (4505) routes the call from the packet switched network (4509) to the caller (4501) (or the callee 4503) on the circuit switched network. Thus, the caller (4501) (or the callee 4503) can use a telephone set to receive the call via a Plain Old Telephone Service (POTS). The connection server (4507) joins the separate calls that are placed via the packet switched network (4509) to connection the callee (4503) and the caller (4501).

In one embodiment, call signaling and media content may use different network paths. While call signaling is arranged to go through the packet switched network (4509) and the connection server (4507), the media stream does not have to go through the connection server (4507). For example, when the calls are joined, the media content may be redirected to flow over the communication carrier (4505) without going through the packet switched network (4509) to the connection server (4507) for improved performance and efficiency.

The connection server (4507) can release the control over the media stream to allow the media stream to flow through the shortest path, without going through the connection server, while maintaining control to the connection for the call by staying on the path for call signaling.

In another example, when the caller (4501) initiates a call over a PSTN to the connection server (4507), the telecommunication carrier (4505) converts the call for the packet switched network (4509) for the connection server (4507).

In one embodiment, virtual softphones on the telecommunication carrier (4505) are assigned to the caller (4501) and the callee (4503) for interfacing with the connection server (4507) over the packet switched network (4509). The virtual softphones encapsulates the devices and networks used by the caller (4501) and callee (4503) to access the connection server (4507); and the telecommunication carrier (4505) shields the connection server (4507) from the implementation details of the user devices and networks used by the caller (4501) and the callee (4503). The connection server (4507) calls (or receives calls from) and connects the virtual softphones on the telecommunication carrier (4505) to connect the caller (4501) and the callee (4503).

In FIG. 45, the telephone connection between the telecommunication carrier (4505) and the connection server (4507) is facilitated via a packet switched network (4509). Thus, the connection server (4507) can operate efficiently in a digital domain. The connection server (4507) interfaces with the telecommunication carrier (4505) using one type of Internet Telephony systems (e.g., SIP-based Internet telephony).

Alternatively, a connection server may include some or all of the functionality of the telecommunication carrier (4505). For example, the connection server may be configured to bridge a packet switched network and a circuit switched network. The connection server may support multiple, different types of Internet Telephony systems.

In one embodiment, the connection server (4507) and the telecommunication carrier (4505) are operated by different, separate entities. Alternatively, the connection server (4507) and the telecommunication carrier (4505) may be operated by the same entity. In another embodiment, the telecommunication carrier (4505) includes a set of facilities operated by a number of separate entities.

In one embodiment, the caller (4501) and/or the callee (4503) may also place/receive calls via a packet switched network. The telecommunication carrier (4505) may route the calls between the caller (4501) and the callee (4503) without using a PSTN. In one embodiment, caller (4501) and/or the callee (4503) may place calls to or receive calls from the connection server (4507) via Internet.

Figure 46:
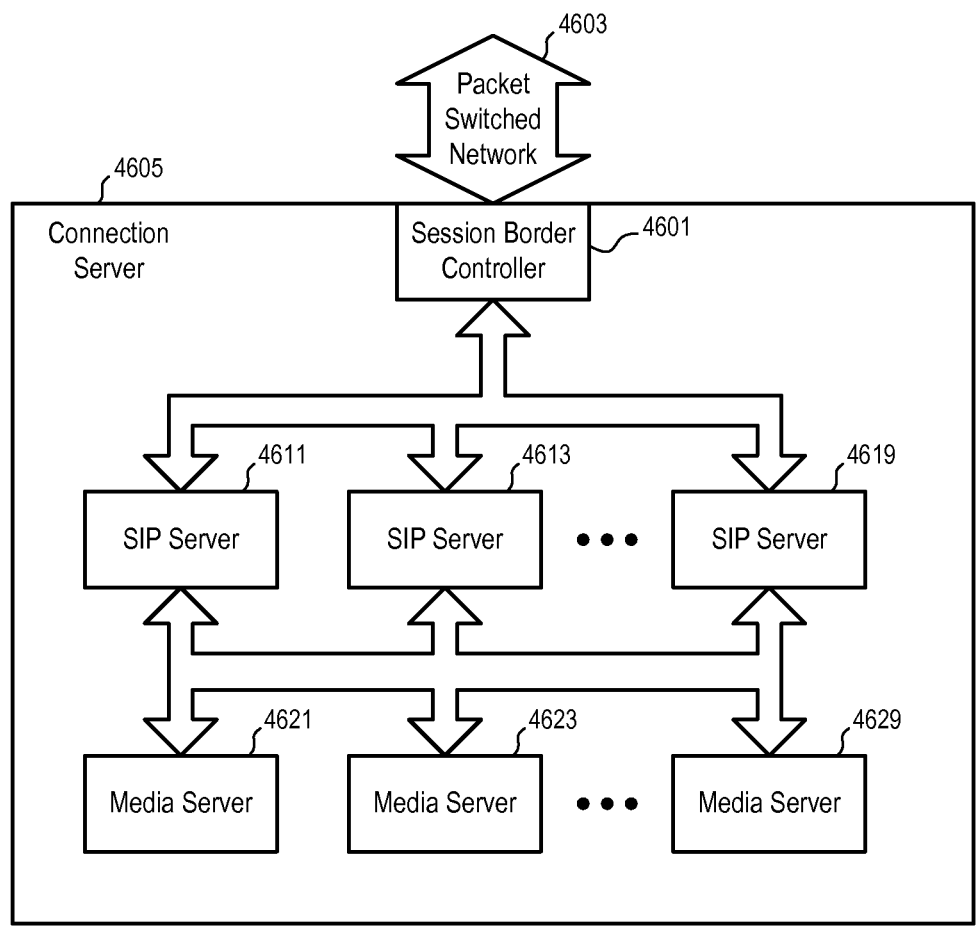
FIG. 46 shows a connection server according to one embodiment.

FIG. 46 shows a connection server according to one embodiment. In FIG. 46, the connection server (4506) is configured to place and/or receive VoIP calls using Session Initiation Protocol (SIP). A session border controller (4601) is used to interface with the packet switched network (4603) and control the types of network traffic related to VoIP calls that might go into the connection server (4605).

In one embodiment, the session border controller (4506) is configured to control the signaling and media stream during the setting up, conducting and tearing down of VoIP calls to or from the connection server (4605). In some embodiments, the session border controller (4506) may pick up the call that comes to the session border controller (4506), places a separate call from the session border controller (4506), and joins the received call and the placed call to control both the signaling and media stream. In some embodiments, the session border controller (4506) may perform signaling/encoding translation to allow the connection server (4605) to process the VoIP calls in one standard, while receiving VoIP calls in a variety of standards (e.g., SIP, H.323, etc.). In one embodiment, the session border controller (4506) is configured to perform one or more firewall functionalities, such as denial of service protection, call filtering, bandwidth management, etc.

In one embodiment, the session border controller (4506) is configured to perform media releasing operation. When the session border controller (4506) determines that the source and destination of a media stream is on the same side of the session border controller (4506) (e.g., both the source and the destination of the media stream is outside the connection server 4605), the session border controller (4506) can release the hairpining of the media stream and allow the media stream to flow without going through the session border controller (4506).

In FIG. 46, a set of SIP servers (e.g., 4611, 4613, ..., 4619) are networked to the session border controller (4601) to receive messages for incoming calls and to initiate outgoing calls. The session border controller (4601) is configured to evenly distribute the calls for processing by the SIP servers.

For example, when an incoming message for the initiation of a call is received (e.g., a SIP INVITE message from the telecommunication carrier 4505), the session border controller (4601) may route it to a SIP server (e.g., 4611) for processing. The INVITE message includes the phone number dialed by the caller and the contact information about the caller (e.g., the phone number of the caller 4501 and/or the identity of the virtual SIP phone at the telecommunication carrier 4505).

The SIP server may determine whether the phone number dialed by the caller (4503) is sufficient to determine the phone number of the callee (e.g., 4503). If the phone number of the callee (e.g., 4503) can be determined from the phone number dialed by the caller (4503) (e.g., via decoding the phone number dialed by the callee, or looking up the phone number of the callee from a table using the phone number dialed by the caller as a key), the SIP server can place a separate SIP call to the callee via the packet switched network (4603) and then connect the caller and the callee. Alternatively, the SIP server can further route the SIP INVITE message (e.g., to the telecommunication carrier (4505) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identifies a media server (4621) (or a virtual softphone on SIP server) as the initiator for a separate call. The SIP server then connects the calls for the media stream.

In one embodiment, the caller is first connected to a media server (e.g., 4621, 4623, or 4629). For example, the SIP server may forward the SIP INVITE message to one or more of the media servers for answering the call. When a media server (e.g., 4621) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (4603) (e.g., by sending a SIP INVITE message to the telecommunication carrier 4505, which further bridges the call to the callee 4503). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (4601) into the connection server (4605). For example, the media stream can go through the telecommunication carrier (4505) in FIG. 45 without going to the connection server (4507) after the SIP server connects the caller and the callee.

However, the SIP server stays on the signaling path to monitor the progress and termination of the call. The SIP server can also break the connection between the caller and the callee, or force the media stream to come through the connection serve (4605). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (4603) for a connection to the caller. The SIP call may be bridged onto a circuit switched network (e.g., by a telecommunication carrier 4505). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (4611, 4613, ..., 4619) and media servers (4621, 4623, ..., 4629) are implemented on separate computers connected via a local area network (and/or intranet or Internet). Alternatively, at least the some of the servers can be implemented on a same computer. In one embodiment, the SIP servers and the media servers are also integrated with the session border controller (4601) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (4605) may further include a database server (4605) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
   providing, by a computing device, an advertisement to a customer on behalf of an advertising party, the advertisement comprising a communication reference;
   establishing, by the computing device via the communication reference presented in the advertisement, a connection for real time communications between the customer and the advertising party;
   monitoring, by the computing device, at least a portion of the real time communications between the customer and the advertising party transmitted via the connection established via the communication reference presented in the advertisement;
   determining, by the computing device based on at least the portion of the real time communications between the customer and the advertising party that is monitored by the computing device, whether or not a deal between the customer and the advertising party has been reached; and
   in response to a determination that the deal between the customer and the advertising party has been reached based on at least the portion of the real time communications between the customer and the advertising party over the connection, charging, by the computing device, the advertising party an advertisement fee for the advertisement to the customer.

2. The method of claim 1, wherein the connection comprises a connection for real time two-way voice communications.

3. The method of claim 2, wherein the communication reference comprises at least one of a phone number without an extension, a phone number with an extension, a session initiation protocol address, a member identifier of an instant messaging network, and/or a click-to-call reference.

4. The method of claim 2, further comprising:
   establishing, via a communication network, a phone connection with the customer through the communication reference;
   identifying, via the computing device, the advertising party based on the communication reference through which the phone connection is established; and
   bridging, via the communication network, the phone connection to the advertising party.

5. The method of claim 4, wherein establishing the phone connection comprises a connection provider communicating with the advertising party in voice over Internet protocol for the phone connection with the customer.

6. The method of claim 5, wherein bridging the phone connection to the advertising party further comprises:
   the connection provider communicating, via the communication network, with a third party in voice over Internet protocol for a separate call to the advertising party to which the phone connection is bridged.

7. The method of claim 6, wherein a first virtual softphone at the third party corresponds to the customer; a second virtual softphone at the third party corresponds to the advertising party to which the phone connection is bridged; and
   bridging the phone connection to the advertising party further comprises:
   directing, via the communication network, the first and second virtual softphones to establish a media connection wherein call signaling between the first and second virtual softphones goes through the connection provider only after bridging the phone connection to the advertising party.

8. The method of claim 1, wherein providing the advertisement comprises providing, via the computing device, the advertisement using one of a web site, a search result, a banner, a billboard, a printed medium, a broadcasting medium, or an electronic message.

9. The method of claim 1, wherein a deal comprises at least one of a purchase request from the customer, an order from the customer, a transaction, an electronic payment, a payment via an interactive voice response system, a payment via a wireless device, a consent of the customer to release information to the advertising party, a submission of information from the customer, and a selection of a portion of a web page by the customer.

10. The method of claim 1, wherein the advertisement fee is a predetermined fee independent of a duration of the connection.

11. The method of claim 1, wherein the advertisement fee comprises a percentage of revenue generated from a transaction as a result of the deal.

12. The method of claim 11, wherein the deal comprises the customer paying the advertising party an amount for a purchase resulting from the real time communications.

13. The method of claim 11, wherein the transaction comprises the advertising party paying the customer an amount for an acquisition of one of information, a product or a service resulting from the real time communications.

14. The method of claim 1, wherein the advertisement fee is based on a bid price of one of the advertising party or the customer.

15. The method of claim 1, wherein the portion of the real time communications comprises at least one dual-tone multi frequency signal from the customer.

16. The method of claim 1, wherein the charging the advertisement fee comprises charging the advertising party at least a portion of the advertisement fee.

17. The method of claim 1, wherein a telecommunication service provider provides the connection for real time communications between the customer and the advertising party; and the charging the advertisement fee comprises charging the telecommunication service provider at least a portion of the advertisement fee.

18. The method of claim 17, wherein the advertisement is provided in response to a request from a mobile device; and the communication reference is used to request the connection through the telecommunication service provider.

19. The method of claim 18, further comprising:
instructing, via the computing device, the telecommunication service provider to bill one of the advertising party or the customer a fee for a transaction as a result of the real time communications.

20. The method of claim 18, further comprising:
instructing, via the computing device, the telecommunication service provider to credit one of the advertising party or the customer a fee for a transaction as a result of the real time communications.

21. The method of claim 18, wherein the mobile device comprises a cellular phone.

22. A non-transitory machine readable medium tangibly storing instructions that, when executed by a computing device, cause the computing device to perform a method, the method comprising:
providing, by the computing device, an advertisement to a customer on behalf of an advertising party, the advertisement comprising a communication reference;
establishing, by the computing device via the communication reference presented in the advertisement, a connection for real time communications between the customer and the advertising party;
monitoring, by the computing device, at least a portion of the real time communications between the customer and the advertising party transmitted via the connection established via the communication reference presented in the advertisement;
determining, by the computing device based on at least the portion of the real time communications between the customer and the advertising party that is monitored by the computing device, whether or not a deal between the customer and the advertising party has been reached; and
in response to a determination that the deal between the customer and the advertising party has been reached based on at least the portion of the real time communications between the customer and the advertising party over the connection, charging by the computing device, the advertising party an advertisement fee for the advertisement to the customer.

23. A system, comprising:
at least one processor; and
memory storing instructions configured to instruct the at least one processor to:
provide an advertisement to a customer on behalf of an advertising party, the advertisement comprising a communication reference;
establish, using the communication reference presented in the advertisement, a connection for real time communications between the customer and the advertising party;
monitor, by the computing device, at least a portion of the real time communications between the customer and the advertising party transmitted via the connection established via the communication reference presented in the advertisement;
determine, by the computing device based on at least the portion of the real time communications between the customer and the advertising party that is monitored by the computing device, whether or not a deal between the customer and the advertising party has been reached; and
in response to a determination that the deal between the customer and the advertising party has been reached based on at least the portion of the real time communications between the customer and the advertising party over the connection, charge the advertising party an advertisement fee for the advertisement to the customer.

* * * * *